(12) United States Patent
Ameloot et al.

(10) Patent No.: US 11,002,679 B2
(45) Date of Patent: May 11, 2021

(54) METHOD FOR DETECTING OR QUANTIFYING CARBON BLACK AND/OR BLACK CARBON PARTICLES

(71) Applicants: KATHOLIEKE UNIVERSITEIT LEUVEN KU LEUVEN RESEARCH & DEVELOPMENT, Leuven (BE); UNIVERSITEIT HASSELT, Hasselt (BE)

(72) Inventors: Marcel Ameloot, Diepenbeek (BE); Hannelore Bové, Neerpelt (BE); Tim Nawrot, Kasterlee (BE); Maarten Roeffaers, Rotselaar (BE); Christian Steuwe, Leuven (BE); Martin Vandeven, Diepenbeek (BE)

(73) Assignees: Katholieke Universiteit Leuven, Leuven (BE); Universiteit Hasselt, Hasselt (BE)

( * ) Notice: Subject to any disclaimer, the term of this patent is extended or adjusted under 35 U.S.C. 154(b) by 237 days.

(21) Appl. No.: 16/069,281

(22) PCT Filed: Jan. 12, 2017

(86) PCT No.: PCT/BE2017/000009
§ 371 (c)(1),
(2) Date: Jul. 11, 2018

(87) PCT Pub. No.: WO2017/120647
PCT Pub. Date: Jul. 20, 2017

(65) Prior Publication Data
US 2019/0025215 A1    Jan. 24, 2019

(30) Foreign Application Priority Data

Jan. 12, 2016 (GB) .................................... 1600564
Apr. 15, 2016 (GB) .................................... 1606611

(51) Int. Cl.
*G01N 21/64* (2006.01)
*G01N 21/63* (2006.01)
(Continued)

(52) U.S. Cl.
CPC .......... *G01N 21/6486* (2013.01); *B82Y 15/00* (2013.01); *G01J 1/58* (2013.01);
(Continued)

(58) Field of Classification Search
CPC ............... G01N 21/6486; G01N 21/63; G01N 2015/0038; G01N 2015/0693;
(Continued)

(56) References Cited

U.S. PATENT DOCUMENTS

| 2004/0052489 A1* | 3/2004 | Duveneck | G01N 21/774 385/130 |
| 2007/0013910 A1* | 1/2007 | Jiang | G01N 15/0205 356/336 |

(Continued)

OTHER PUBLICATIONS

Arnal, et al.; "Experimental and Kinetic Study of the Interaction of a Commercial Soot with no at High Temperature"; Combust. Sci. Technol., 184; 2012; pp. 1191-1206.
(Continued)

*Primary Examiner* — Kiho Kim
(74) *Attorney, Agent, or Firm* — Dinsmore & Shohl LLP

(57) ABSTRACT

A method for detecting the presence of or quantification of carbon black and/or black carbon in a sample or carrier medium. The method includes providing the sample or carrier medium without labelling or pre-treatment of the carbon black and/or black carbon particles; illuminating the sample or carrier medium at a temperature below 90° C. by a pulsed light with a pulse duration below 500 femtoseconds, a repetition rate above 1 MHz with an average power below 20 mW, and a wavelength of a femtosecond laser
(Continued)

pulse ranging from 700 to 1200 nm, to generate non-incandescence related light emission from the carbon black and/or black carbon particles; and analysis of the light emission.

15 Claims, 35 Drawing Sheets

(51) Int. Cl.
  *G01J 1/58* (2006.01)
  *B82Y 15/00* (2011.01)
  *G01N 15/00* (2006.01)
  *G01N 15/06* (2006.01)

(52) U.S. Cl.
  CPC ......... *G01N 21/63* (2013.01); *G01N 21/6428* (2013.01); *G01N 21/6458* (2013.01); *G01N 15/06* (2013.01); *G01N 2015/0038* (2013.01); *G01N 2015/0693* (2013.01); *G01N 2201/0697* (2013.01)

(58) Field of Classification Search
  CPC ........... G01N 15/06; G01N 2201/0697; G01N 21/6428; G01N 21/6458; G01J 5/18; G01J 1/58; B82Y 15/00
  See application file for complete search history.

(56) References Cited

U.S. PATENT DOCUMENTS

| | | | |
|---|---|---|---|
| 2009/0061473 A1 | 3/2009 | Saxena et al. | |
| 2010/0248034 A1* | 9/2010 | Oki | H01M 4/364 429/231.8 |
| 2011/0189702 A1 | 8/2011 | Sun | |
| 2012/0142111 A1* | 6/2012 | Tour | B82Y 30/00 436/27 |
| 2015/0148428 A1* | 5/2015 | Choi | A61K 31/122 514/680 |

OTHER PUBLICATIONS

Marcel Ameloot; "StandardTerminology Relating to Carbon Black"; ASTM International Designation: D3053-13a; 2013; pp. 1-4.
Belousova, et al.; "The investigation of nonlinear optical limiting by aqueous suspensions of carbon nanoparticles"; Science Direct; Optics Communications 235; 2004; pp. 445-452.
Castro, et al.; "Carbonaceous aerosol in urban and rural European atmospheres: estimation of secondary organic carbon concentrations"; Atmospheric Environment 33; 1999; pp. 2772-2781.
Chow, et al.; "Aerosol light absorption, black carbon, and elemental carbon at the Fresno Supersite, California"; Atmospheric Research 93; 2009; pp. 874-887.
Esteves, et al.; "Analyitcal and bioanalytical applications of carbon dots"; Trends in Analytical Chemistry; vol. 30, No. 8; 2011; pp. 1327-1336.
Ferrari, et al.; "Raman Spectrum of Graphene and Graphene Layers"; Physical Review Letters; The American Physical Society; 2006; 97; 187401 pp. 1-4.
Fougeanet, et al.; "Nonlinear Mechanisms in Carbon-Black Suspension in a Limiting Geometry"; Mat. Res. Soc. Symp. Proc.; vol. 479; 1997; pp. 293-298.
Ghosh, et al.; "Photoluminescence of Carbon Nanodots: Dipole Emission Centers and Electron-Phonon Coupling"; Nano Letters; American Chemical Society; 2014; pp. 5656-5661.
Hamilton, et al.; "White Light Emission from C60 Molecules Confined in Molecular Cage Materials"; Advanced Materials; 1993; 5; No. 7/8; pp. 583-585.
Imholt, et al.; "Nanotubes in Microwave Fields: Light Emission, Intense Heat, Outgassing, and Reconstruction"; Chem. Mater.; 2003; American Chemical Society; 15; pp. 3969-3970.
Li, et al.; "Carbon Nanodots: Synthesis, Properties and Applications"; Journal of Materials Chemistry; 2012; 22; pp. 24230-23253.
Li, et al.; "Photoluminescent Carbon Dots as Biocompatible Nanoprobes for Targeting Cancer Cells in Vitro"; J. Phys. Chem. C; 2010; 114; pp. 12062-12068.
Nemmar, et al.; "Passage of Inhaled Particles into the Blood Circulation in Humans"; Brief Rapid Communications; American Heart Association, Inc.; 2002; 105; pp. 411-414.
Rulik, et al.; "Laser-Induced Incandescence in Aqueous Carbon Black Suspensions: The Role of Particle Vaporization"; Semiconductor Physics; quantum Electronics & Optoelectronics; 2017; V. 10; n. 2; pp. 6-10.
Strek, et al.; "Laser-Induced White-Light Emission from Graphene Ceramics—Opening a Band Gap in Graphene"; Light: Science & Applications; 2015; 4; pp. 1-8.
Usman, et al.; "Optical Trapping of Nanoparticles by Ultrashort Laser Pulses"; Science Progress; 2013; 96(1); pp. 1-18.
Usman, et al.; "Femtosecond Trapping Efficiency Enhanced for Nano-Sized Silica Spheres"; Optical Trapping and Optical Micromanipulatio IX; Proc. of SPIE; vol. 8458; pp. 845833 1-7, Oct. 2012.
Rong Wang; "Global Emission Inventory and Atmospheric Transport of Black Carbon: Evaluation of the Associated Exposure"; Springer Theses: Beijing, China, 2015; pp. 1-160.
European Patent Office Search Report dated May 16, 2017 in reference to International Application No. PCT/BE2017/000009 filed Jan. 12, 2017.
Schulz, et al.; "Laser-Induced Incandescence: Recent Trends and Current Questions"; Applied Physics B: Lasers and Optics; vol. 83; No. 3; May 9, 2006; pp. 333-354.
S. E. Zelensky; "Laser-Induced Non-Linear Light Scattering in a Suspension of Black-Body Particles"; Semiconductor Physics, Quantum Electronics & Optoelectronics; 2004; V. 7; N. 2; pp. 190-194.
Hannelore Bové, et al.; "Biocompatible Label-Free Detection of Carbon Black Particles by Femtosecond Pulsed Laser Microscopy"; Nano Letters; American Chemical Society; 2016; 16; pp. 3173-3178.

* cited by examiner

METHOD FOR DETECTING OR QUANTIFYING CARBON BLACK AND/OR BLACK CARBON PARTICLES

FIELD OF INVENTION

The present invention relates to a label-free method to detect carbonaceous particles in liquids, cells and tissues of biological origin and carrier media of non-biological origin, in particular such non-biological environment with a fluorescent background, and an apparatus thereof, and more specifically for optically measuring and analyzing carbonaceous particles such as but not limited to carbon black and black carbon in fluids (e.g., waste water and urine) or tissues (e.g., placenta and leafs) with the use of a laser with femtosecond/sub-picosecond pulse durations triggering an instantaneous optical response without the emission of heat-induced sample incandescence.

BACKGROUND

Two forms of carbonaceous materials are carbon black and black carbon. Carbon black (CB) consists of or comprises aciniform aggregates of primary particles with an elemental carbon content greater than 97% (ASTM International, West Conshohocken, Pa., 2013). It is produced through well controlled incomplete combustion of organics like heavy petroleum or vegetable oil. This distinguishes CB from soot or black carbon (BC), the unwanted byproduct released during incomplete combustion processes such as in the exhausts of diesel engines and one of the main contributing factors to atmospheric particulate pollution (L. Castro et al., Atmos. Environm., 1999, 33, 2771). Nonetheless, due to the (physico)chemical similarity CB is widely used as a model compound for soot (C. Arnal et al., Combust. Sci. Technol., 2012, 184, 1191). The total global black carbon emission was estimated to be approximately 8.5 million tons after having constantly increased throughout the preceding decade (R. Wang, Global Emission Inventory and Atmospheric Transport of Black Carbon: Evaluation of the Associated Exposure, 2015, Springer Thesis: Beijing, China). As a consequence of the increasing environmental and occupational exposure to these carbonaceous particles, deeper insight into the (eco-) toxicological impact of these materials is of critical importance. Carbonaceous material or carbon (black material) is generally considered to have low solubility in water and weak fluorescence (J. C. G. Esteves da Silva and H. M. R. Goncalves, Trends Anal. Chem., 2011, 30, 1327). However carbon nanoparticles with a very limited well-defined size range below 10 nm can be made luminescent by laborious synthetic modifications yielding fluorescent nanosized carbon structures (H. T. Li et al J. Mat. Chem., 2012, 22, 24230). Examples are the photoluminescent C-dots (carbon nano-dots) that can be prepared from carbon precursors such as candle soot (H. T. Li et al J. Mat. Chem., 2012, 22, 24230). Such a post-modification cannot be performed directly in vivo experiments on a sample containing CB or BC or other non-fluorescent carbon nanoparticles.

State of the art measurements in polluted air (J. C. Chow et al., Atmos. Res., 2009, 93, 874) concern absorption photometry and laser induced incandescence (LII) to determine particle concentrations. Furthermore, alternative labeling methods have been explored such as the technetium-99-m radionuclide labeling in epidemiological studies and toxicology research (A. Nemmar et al., Circulation, 2002, 105, 411).

In LII, the emission from carbonaceous materials has been linked to black-body radiation from the severely heated CB particles (A. Ferrari et al., Phys. Rev. Lett., 2006, 97, 187401), i.e. incandescence. Already various models have been proposed to explain the origin of incandescence and its dependence on illumination power and pulse duration (I. Belousova et al., Opt. Commun., 2004, 235, 445; S. Zelensky, Semicon. Phys. Quantum. Optoelectron., 2004, 7, 190; J. J. Rulik et al., Semicon. Phys. Quantum. Optoelectron., 2007, 10, 6). Recently, substantial scientific efforts have focused on white light (WL) from carbonaceous materials including graphene (W. Strek et al., Light. Sci. Appl., 2015, 4, e237), fullerenes (B. Hamilton et al., Adv. Mater., 1993, 5, 583) and carbon nanotubes (T. Imholt et al., Chem. Mater., 2003, 15, 3969). Also for these materials the emitted radiation has been linked to incandescence.

However, incandescence induced visible emission from CB particles in solution and biological matter has so far not been widely explored, despite reports of CB suspensions serving as optical limiters and nonlinear scatterers due to their broadband and flat absorption. Such incandescence induced nonlinear light scattering efficiency decreases with pulse duration shortening (I. Belousova et al., Opt. Commun., 2004, 235, 445; S. Zelensky, Semicon. Phys. Quantum. Optoelectron., 2004, 7, 190). The interpretation of these effects is not straightforward as they strongly depend on the experimental conditions (F. Fougeanet and J.-C. Fabre, MRS Proceedings, 1997, Cambridge Univ. Press, 293). Moreover, incandescence induced visible emission of CB particles in aqueous environments would require higher laser intensities because of the improved heat transport with respect to gaseous environments, additionally in biological fluids, cells, and tissues this would denature this biological environment due to heating of the particles.

While adverse health effects of CB and/or BC exposure are generally accepted, a direct, label-free approach for detecting CB/BC particles in fluids and at the cellular level is still lacking Present invention provides methods that enable direct detection of carbonaceous particles, such as CB or BC, in relevant samples such as polluted liquids such as water and other solvents, body fluids and consumer products as well as exposed biological tissues and cells by means of non-incandescence related light detection and analysis under illumination with femtosecond/sub-picosecond pulse durations short enough to triggering an instantaneous optical response without the emission of heat-induced sample incandescence. In present invention we observed for four different CB species with diameters ranging from 13 to 500 nm, that this emission under femtosecond illumination is a general property of CB/BC particles.

A very distinguished character of the present invention, in contrast to C-dots which have a narrow emission band, is that CB or BC species under ultrafast femtosecond/sub-picosecond laser illumination show a broad spectral response spanning at least the whole visible range of wavelengths. A particular advantage is that when the ultrafast femtosecond laser is focused on the sample containing CB or BC species (for instance in urine or other liquid samples) the background emission coming from non-CB or non-BC species can be spectrally filtered out. For instance it is a particular embodiment of present invention that by varying the femtosecond/sub-picosecond illumination intensity and/or the femtosecond/sub-picosecond illumination wavelength the emission wavelengths can be fine-tuned into selected wavelength emission in the violet (380-450 nm), blue (450-500 nm), green (500-570 nm), yellow (570-590 nm), orange (560-620 nm) or red (620-750 nm) range. For instance in a particular embodiment of present invention when a sample comprising CB and/or BC species is illuminated by an ultrafast pulsed laser, for instance a femtosecond pulsed laser, the wavelength of the laser pulses can be changed within the 700 to 1200 nm range, preferably within the 750 to 950 nm range and/or the intensity of the femtosecond laser light can be changed, until the CB and/or BC species illumination distinguishes from any sample noise illumination. In an embodiment of present invention varying ultrafast laser intensity and/or varying ultrafast laser wavelength is used as a handle to separate noise, such as background emission and any other noise that interferes with the detection at BC/CB specific emission wavelengths, or any from CB and/or BC species emission. For instance, a 750 nm short pass dichroic filter can separate the visible emissions from the near infrared illumination of the CB and/or BC species.

In an embodiment of present invention after an emission signal is generated from CB and/or BC species by femtosecond/sub-picosecond pulsed laser illumination, the emission light signals are guided to a signal detection system for detecting the light signals from CB and/or BC species particles of interest. Input signals from different optical detectors, for instance two, that register photons of sufficiently separated spectral areas provide the input signal each to a separate digital multiplier, which is a combination of an amplifier and electronic filter. These signals are converted each into a binary signal stream by an analogue-to-digital converter (ADC). Consequently the signals, from the output of ADCs, are received as inputs to a digital multiplier. The digital multiplier can be implemented as a stand-alone digital hardware component, as a software program running on a computer processor, or as any other suitable mechanism for multiplying two signals. The output of the multiplier is a sampled, an analytical signal representing the (complex) product of the two signals. The output of the multiplier is provided to one or more integrators. Like the digital multiplier, the integrators can be implemented as digital hardware components, as a software program on a computer processor, or as any other suitable mechanism for summing the samples output from the multiplier. The integrator sums series of consecutive samples of the multiplier output to form the output signal. The length of each series of consecutive samples will depend on known or estimated properties of the signals of interest. Each signal train can have an associated start time related to the sample time of the first sample in the consecutive series. A particular advantage of this embodiment is that it allows to filter CB and/or BC species illuminations from sample or carrier medium illuminations.

In a particular embodiment the signal train is consequently transferred by output to auxiliary hardware such as a laser microscope, in particular such as a laser scanning microscope. In an alternative embodiment the signal train is provided to a search function for particle counting. This search function can be implemented as a digital signal processor, as a computer program operable in a data processing system, or as any other suitable signal processing means, including specialized digital hardware. The search function includes a threshold which can selectively pick a pulse which exceeds a certain signal magnitude. The search function counts these events.

In a particular embodiment of present invention, femtosecond/sub-picosecond pulsed illumination intensity and/or the femtosecond/sub-picosecond illumination wavelength on said CB and/or BC species or on said the sample which comprises CB and/or BC species is modulated to the near infrared emission excitation of said CB and/or BC species. A particular positive effect of this method is that this distinguishes the CB and/or BC species emission from background noise emission and this is particularly useful to filter out background autofluorescence or accidental sample medium autofluorescence. A particular embodiment of the present invention concerns modulation of the ultrafast femtosecond illumination of said BC and/or CB species in a urine sample until near infrared emission is reached. This is particular suitable to distinguish CB and/or BC particles from and any other noise that interferes with the detection at BC/CB specific emission wavelengths.

As the emitted radiation spreads over the whole visible spectrum, detection is straightforward and flexible. The unique property of the described light emission allows optical detection and unequivocal localization of CB/BC particles in (body) fluids as shown here using urine and in cellular environments while simultaneously co-localizing different cellular components using various specific fluorophores as shown here using human lung fibroblasts.

SUMMARY OF THE INVENTION

The invention is broadly drawn to a method of induction of white light emission from carbonaceous particles (e.g., carbon black (CB) and black carbon (BC) particles) illuminated by a laser with femtosecond/sub-picosecond pulse durations short enough for triggering an instantaneous optical response without inducing incandescence emission, and without the need for labelling or any other pretreatment of the carbonaceous particles. Another particular embodiment is broadly drawn to a method of induction of white light emission from ordinary carbonaceous particles (e.g., carbon black (CB) and black carbon (BC) particles) illuminated by a laser with femtosecond/sub-picosecond pulse durations short enough for triggering an instantaneous optical response without inducing incandescence emission, and without the need for labelling or any other pretreatment of the carbonaceous particles. Ordinary carbonaceous particles in the meaning of this invention are combustion derived carbonaceous particles without further functionalization or purification steps for instance such carbonaceous particles of environmental pollution.

Yet another particular embodiment of this invention is broadly drawn to a method of induction of light emission from CB particles or from BC particles illuminated by a laser with femtosecond/sub-picosecond pulse durations short enough for triggering an instantaneous optical response without inducing incandescence emission, and without the need for labelling or any other pretreatment of the carbonaceous particles.

In an embodiment of present invention, these hereinabove described methods are employed to analyse or relatively quantify these particles

- in liquids such as aqueous media (for instance such aqueous media at a temperature below 90° C., preferably between 1° C. and 80° C. and more preferably between 10° C. and 50° C.) where heat dissipation is taking place and heating of the carbonaceous particles resulting in incandescence is prevented such as but not limited to blood, plasma, saliva, sputum, urine or other contaminated liquids like wastewater;
- or in cells such as but not limited to human, animal and plant cells which are fixed or alive and have an intracellular water content higher than 40%, preferably between 40% and 95%, and more preferably between 50% and 70% so heat dissipation can take place;

or in complex environments such as biological tissues and carrier media of non-biological origin such as but not limited to human, animal and plant tissues and biopsy specimens which are fixed or alive in vitro or in vivo and consist out of cells which have an intracellular water content higher than 40%, preferably between 40% and 95%, and more preferably between 50% and 70% so heat dissipation can take place.

In the present invention the emission is not incandescent emission. Light absorbing particles such as carbonaceous particles were generally accepted to be non-luminescent or weakly luminescent because of efficient internal quenching of the excitation energy.

The present invention solves the problems of the related art of measuring and/or detecting carbonaceous particles in liquids at moderate temperatures where heat dissipation can take place and heating of the carbonaceous particles resulting in incandescence is prevented. White-light emission by dry carbonaceous particles is already known in literature, however in this case the emission is caused by incandescence i.e. the black-body emission from heated particles.

In particular, for carbon-based materials this means heating to thousands of degrees Celsius. This situation cannot easily be obtained in wet (aqueous) environments due to fast heat dissipation to the surrounding environment. Furthermore, incandescence emission is not instantaneous as the object keeps emitting light after the illumination pulse has ceased while cooling down. In addition, such heated emission is not suitable for heat sensitive, heat denaturation sensible or heat explosive sensible environments or samples.

In a particular embodiment, the present invention solves the problems of the related art in such a way that the imaging settings meaning the incident intensity, average power and wavelength at the sample of the femtosecond laser pulses required for the emission generation is compatible with living, heat sensitive, heat denaturation sensible and heat explosive sensible material or environments. Incandescence, known to the persons trained in the field, would not be considered since it would require unacceptably high laser powers applied for long time durations to induce the required heating of carbonaceous particles in aqueous environments leading to the destruction of surrounding materials by local heating and burning.

The intensity of the generated illumination by this method is sufficient to be detected by a photomultiplier, avalanche photodiode or any other sensor sensitive to visible or near infrared light and the intensity of the generated white-light is sufficient to be used in a state-of-the-art laser microscope, in particular such as a laser scanning microscope, or similar optical devices such as flow cytometry.

A particular embodiment of present invention concerns a method of induction of emission from carbonaceous particles, such as CB or BC, in measurement specimens such as liquids (for instance animal body fluid), cells (for instance animal cells), tissues of biological origin and carrier media of non-biological origin by delivering laser light, with femto-/subpicosecond pulse duration triggering an instantaneous optical response from the carbonaceous particles inside the said measurement specimen, and this without labelling and/or any pretreatment of the carbonaceous particles. Such analysis method is particularly suitable for analysing CB, BC and other ordinary carbonaceous particles such as combustion derived carbonaceous particles without further functionalization of the particles or such as carbonaceous particles from industrial or environmental pollution.

Another particular embodiment of present invention concerns an apparatus for analysing ordinary carbonaceous particles in liquids, cells and complex environments such as biological tissues and carrier media of non-biological origin, said apparatus comprising a measurement specimen distribution section for distributing a liquid control sample and a predefined aliquot of liquid sample or any other sample containing carbon nanoparticles suspended in liquid together with hydrodynamic focusing sheath fluid;

an optical illumination and detecting section comprising of a laser delivering pulses with femto-/subpicosecond pulse durations short enough to trigger an instantaneous non-incandescence related optical response;

a focusing element such as an objective or any other lens or focusing mirror with a numerical aperture preferably but not necessarily above one;

light receiving and detecting elements for detecting preferably light emitted from the specimen in the laser direction (forward);

a light receiving element for receiving and detecting backwardly emitted light; and a measurement section for measuring carbonaceous particles, such as CB or BC, in liquids, cells and tissues of biological and carrier media of non-biological origin, based on non-incandescence related emission detected by the optical detecting section.

In another aspect, the present invention provides a method of detection of CB and/or BC particles contamination residing in a eukaryotic organisms, such as plants and animals. It is in particular suitable for mammals, the method comprising: (i) collection of a sample of the eukaryotic organism; and (ii) analysis of the presence or the quantity of CB and/or BC particles in said eukaryotic organism by subjecting the sample to femtosecond/sub-picosecond laser pulses and analysing the light emission from the CB and/or BC particles in said sample. In yet another aspect, the present invention provides a method of detecting CB and/or BC particles in a biological sample, comprising: (a) radiating said biological sample with femtosecond/sub-picosecond laser pulses and (b) detecting the presence or absence of CB and/or BC particles in said sample by the visual light emitted. In yet another aspect, the present invention provides a method for analysis of presence or quantity of CB and/or BC particles in a sample, comprising the step of induction of visual light emission (e.g. white-light emission) from the CB and/or BC particles elicited by femtosecond/sub-picosecond laser pulses and analysis of the light emission. These embodiment of the invention advantageously distinguish emissions of CB and/or BC particles from background emission noise of the sample or carrying matrix. Some of the techniques described above may be embodied as the pulse duration is shorter than 1000 femtoseconds and preferentially below 500 femtoseconds. The repetition rate is above 1 kHz and preferentially above 1 MHz with an average power below 20 mW. Some of the techniques described above may be further embodied as the wavelength of the femtosecond laser pulses ranges from 750 to 950 nm and/or the wavelength of the femtosecond laser pulses ranges from 700 to 1200 nm. These embodiments of the invention advantageously comprise the CB and BC particles to be analysed or quantified in media at a temperature below 90° C. or the CB and BC particles to be analysed or quantified in media at a temperature between 1° C. and 80° C. or the CB and BC particles to be analysed or quantified are in media at a temperature between 10° C. and 50° C. By using an inventive system it is possible that the CB and BC particles to be analysed or quantified are in complex environments such as body fluids such as blood or urine or that the CB and BC particles to be analysed or quantified are in tissues such as ivy leaves or placenta. This invention can be furthermore in conjunction with the white light strength being detected by a photomultiplier or a laser microscope, in particular a laser scanning microscope, the carbon black (CB) and/or the black carbon (BC) particles are label-free, the carbon black (CB) and/or black carbon (BC) particles being without labelling or any pretreatment and/or the carbon black (CB) and/or black carbon (BC) particles remaining at moderate temperatures so that the emission is not caused by incandescence and therefore biocompatible.

In a further embodiment of the invention, a body fluid analyser for measuring carbon black (CB) and/or black carbon (BC) particles in body fluids, is configured such that the measurement of the carbon black and/or black carbon particles contamination is carried on said body fluid without labelling or functionalization of said contamination particles, whereby the body fluid analyser comprises: a femtosecond/sub-picosecond pulsed laser, a sampling mechanism for sampling a body fluid sample from a sample container or for receiving said sample container in order to carry out femtosecond/sub-picosecond laser pulses irradiations on the body fluid sample, a sensor mechanism in order to carry out visual light emission measurement for measuring the carbon black and/or black carbon contamination in said sample. Some of the techniques described above may be embodied as that the femtosecond/sub-picosecond pulsed laser of the apparatus comprises an ultrafast femtosecond laser, that the apparatus comprises a stationary or scanning beam delivery to focus the laser light on the sample. Some of the techniques described above may be embodied as that the femtosecond/sub-picosecond pulse laser mechanism of the apparatus is configured to generate pulses with wavelengths that range from 750 to 950 nm or the femtosecond/sub-picosecond pulse laser mechanism is configured to generate pulses with wavelengths that range of 700 to 1200 nm.

According to the present invention it is provided that the femtosecond/sub-picosecond pulsed laser mechanism in said apparatus is configured to generate pulses with durations shorter than 1000 femtoseconds and preferentially shorter than 500 femtoseconds, that the femtosecond pulse laser mechanism is configured to generate pulses with repetition rate preferentially above 1 MHz, that the femtosecond pulse laser is configured to generate illumination light with an average power of 4 to 6 mW and/or that the femtosecond pulse laser is configured to generate illumination light with an average power below 20 mW. Another aspect, of present invention provides the apparatus according to any of statements here above, comprising: a) a measurement specimen distribution section configured to distribute a liquid control sample and a predefined aliquot of liquid sample; b) an optical detecting section comprising: i.) the femtosecond/sub-picosecond pulsed laser mechanism, ii.) a forward light receiving element configured to detect forward light emitted from the specimen, and further configured to output a forward light output signal and iii.) a backward light receiving element configured to detect backward light emitted from the specimen, and further configured to output a backward light output signal. Furthermore this apparatus can be physically and functionally connected with a processing device comprising a processing unit (CPU) and a memory storing device. This can be a direct connection with a computer or a functional connection with a remote processing system unit including a computer executable program. Said computer executable program is configured to detect and analyse the signals from said forward light receiving element and backward light receiving element. In yet a particular embodiment the computer executable program is configured to compare the measurement signals with reference signals.

ILLUSTRATIVE EMBODIMENTS OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Several documents are cited throughout the text of this specification. Each of the documents herein (including any manufacturer's specifications, instructions etc.) are hereby incorporated by reference; however, there is no admission that any document cited is indeed prior art of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to the devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments. Similarly it should be appreciated that in the description of exemplary embodiments of the invention, various features of the invention are sometimes grouped together in a single embodiment, figure, or description thereof for the purpose of streamlining the disclosure and aiding the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details.

In other instances, well-known methods, structures and techniques have not been shown in detail in order not to obscure an understanding of this description.

Other embodiments of the invention will be apparent to those skilled in the art from consideration of the specification and practice of the invention disclosed herein.

It is intended that the specification and examples be considered as exemplary only.

Each and every claim is incorporated into the specification as an embodiment of the present invention. Thus, the claims are part of the description and are a further description and are in addition to the preferred embodiments of the present invention.

Each of the claims set out a particular embodiment of the invention.

The following terms are provided solely to aid in the understanding of the invention.

EXAMPLES

All chemicals were purchased from Sigma-Aldrich (Belgium) unless stated otherwise.

Example 1

Characterization of Carbon Black Particles

Four types of carbon black particles (CBs) were used in this study: ultrafine carbon black nanopowder (ufPL; PlasmaChem GmbH, Germany), ultrafine Printex 90 (ufP90; Orion Engineered Carbons, Germany), conductive carbon black nanopowder (CCB; US Research Nanomaterials, USA) and mesoporous fine carbon nanopowder (fCB; Sigma-Aldrich, Belgium). The mean aerodynamic diameters as determined by the manufactures are 13, 14, 150 and 300 nm for ufPL, ufP90, CCB and fCB, respectively (Table 2). The average primary particle sizes and aggregation levels of the CBs were confirmed by transmission electron microscopy (TEM; Tecnai $G^2$ spirit twin, FEI, the Netherlands), FIG. 23. Aqueous stock suspensions (2 mg/mL) were prepared, ultrasonicated for 30 min and stored at 4° C. in the dark until further use. Immediately before use, stock suspensions were ultrasonicated for 20 min prior to dilution in either water, phosphate buffered saline (PBS) or Iscove's Modified Dulbecco's Medium (IMDM; Life Technologies, Belgium) supplemented with 10% fetal bovine serum (FBS; Biochrom AG, Germany), 100 U/mL penicillin, and 100 µg/mL streptomycin. Hydrodynamic diameters of the particles suspended in ultrapure water and supplemented cell culture medium were measured by dynamic light scattering with a ZetaPALS particle analyzer (Brookhaven Instruments Corp., USA), Table 2. This instrument was also used for Zeta potential determination of the CBs in potassium chloride solution (KCl; 1 mM, pH 7.4) and supplemented cell culture medium.

Example 2

CB Imaging in Various Solutions, Air and Polydimethylsiloxane

CCB particles were dispersed at a concentration of 600 µg/mL in ultrapure water, ethanol (Ethanol absolute, VWR Chemicals, Belgium), glycerol (Glycerol BioXtra ≥99%, Sigma-Aldrich, Belgium), and microscope oil (Immersol™ 518 F, Carl Zeiss, Germany), and a 10:1 weight-ratio mixture of polydimethylsiloxane (PDMS) base polymer and curing agent (Dow Corning, Germany) degassed at 0.55 Bar and cured for 30 minutes at 70° C. The solutions were prepared using the same ultrasonication steps as described before and the dried sample was made by air drying a droplet of CCB in suspension onto a glass cover slide. The images were collected using a Zeiss LSM510 META NLO (Carl Zeiss, Germany) mounted on an Axiovert 200 M equipped with a femtosecond pulsed laser (810 nm, 150 fs, 80 MHz, MaiTai, Spectra Physics, USA) tuned to a central wavelength of 810 nm with a 5 or 10 mW radiant power at the sample position and using a 40×/1.1 water immersion objective (LD C-Apochromat 40×/1.1 W Korr UV-Vis-IR, Carl Zeiss). The resulting 1024×1024 images with a pixel size of 0.22 µm were recorded with a 1.6 µs pixel dwell time at room temperature.

Example 3

Absorption Spectra CBs

The absorption spectra of the CB suspension were measured with a Lambda 950 UV/Vis/NIR spectrometer (Perkin Elmer, USA) double beam, double monochromator, ratio recording UV/Vis/NIR spectrophotometer. The suspensions were prepared as described above and measured in a quartz cuvette (1 cm optical path length) immediately after preparation to minimize sedimentation. Single scans were recorded in the visible spectral range between 400 and 800 nm with a scanning speed of 0.25 nm/s and a slit width of 5 nm.

Example 4

Emission Spectra CBs

CB suspensions were contained in optical chambers fabricated by two glass cover slides held together by double sided adhesive tape (8153LE, 3M, Belgium) with a central punched hole of 5 mm. These CB suspensions or CB particles dried on a cover glass (FIG. 24) were excited with a conventional femtosecond titanium-sapphire laser (810 nm, 150 fs, 80 MHz, MaiTai, Spectra Physics, USA). The illumination power was set to 8 mW after a 60×/0.95 air objective (CFI Plan Apo Lambda 60×/0.95, Nikon, Japan). A 750 nm short pass dichroic filter was separating the visible emission from the near infrared illumination. The emitted light was focused onto a pinhole and then imaged onto a spectrograph with an attached EM-CCD camera (ImagEM Enhanced C9100-13, Hamamatsu, Japan). An additional short pass filter blocked any fundamental laser light. Integration times of 45 s were sufficient to generate spectra with high signal-to-noise ratio (>100).

Example 5

Time Correlated Single Photon Counting

Following femtosecond illumination (810 nm, 80 MHz, 5 mW) of CBs suspended in ultrapure water or dried on a cover glass, the temporal response of the emitted signal was detected using a GaAsP photomultiplier tube (PMT; 7422, Hamamatsu, Germany) after spectral filtering using a dichroic mirror KP 650, a KP 685 short-pass filter and a 450-650 band-pass (BP) filter. The PMT was connected to an SPC830 card (Becker and Hickl, Germany) which was synchronized to the pulse train of the laser. Recordings of the 256×256 pixel images with a pixel size of 0.11 μm were performed using a pixel dwell time of 6.4 μs.

Example 6

Raman Spectra CBs

Raman spectra were collected with a CCD camera (Newton, Andor, UK) equipped with a blazed grating monochromator (IHR320, Horiba, Japan) with a grating of 1200 l/mm. A 633 nm Helium Neon Laser with an average power at the sample of 15 mW was used (Research and Electro-Optics INC, USA). The Raman signal passed a 645 nm long pass filter after a 100 μm pinhole for confocal detection and the grating monochromator. The slit width was set to 2000 μm. Suspended CB samples were contained in optical chambers described above. The integration time was set to 10 s and averages of 6 scans are shown. Data were collected on a dry powder sample in air at room temperature. Raman spectra for all samples collected with 633 nm laser illumination displayed very broad D- and G-peaks typical of amorphous carbon

Example 7

Femtosecond Up-Conversion

An amplified femtosecond double optical parametric amplifier laser system was used as illumination source. The power of the laser was set to 150 μW (150 nJ/pulse) at the sample position and the emitted light from the sample was efficiently collected using an off-axis parabolic mirror. The emission was filtered using long pass filters for suppressing the scattered light, directed and overlapped with a gate pulse (810 nm, ca. 10 μJ) derived from the regenerative amplifier onto a lithium triborate crystal. By tuning the incident angle of these two beams relative to the crystal plane the sum frequency of the light and the gate pulse was generated. The time resolved traces were then recorded by detecting this sum frequency light while changing the relative delay of the gate pulse versus the sample illumination time. Fluorescence gating was done under magic angle conditions in time windows of 6, 50 and 250 ps.

Monochromatic detection in heterodyne mode was performed using a photomultiplier tube (R928, Hamamatsu, Japan) placed at the second exit of the spectrograph mounted behind a slit. Optical heterodyne detection is a highly sensitive technique to measure very weak changes in absorption induced by a frequency modulated pump beam. The electrical signal from the photomultiplier tube was gated by a boxcar averager (SR250, Stanford Research Systems, USA) and detected by a lock-in amplifier (SR830, Stanford Research Systems, USA).

An additional BP filter 260-380 nm was placed in front of the monochromator to reject light from the illumination and the gate pulse. The instrument response function (IRF) of this setup (including laser sources) was determined by detection of scattered light of the laser pulse under identical conditions and found to be approximately 120 fs (FWHM). This value was used in the analysis of all measurements for curve fitting using iterative reconvolution of the data sets while assuming a Gaussian shape for the IRF. The sample was prepared in a concentration that yielded an absorbance of ca. 0.4 per mm at the illumination wavelength and was contained in a quartz cuvette with an optical path length of 1 mm. To improve the signal to noise ratio, every measurement was averaged 15 times at 256 delay positions where a delay position is referred to as the time interval between the arrival of the pump and the gate pulses at the sample position.

Example 8

Cell Culture Conditions

Human fetal lung fibroblast (MRC-5 cell line, ATCC CCL-171, LGC Standards, France) cells were maintained (37° C., 5% $CO_2$) in Minimum Essential Medium (MEM) supplemented with 10% FBS, 100 U/mL penicillin, and 100 μg/mL streptomycin. When 80-90% confluency was reached, cells were routinely subcultured. Cells for imaging were seeded on 96-well culture plates at a density of 10,000 cells/well and incubated overnight to allow for cell adherence. After washing three times with PBS, cells were treated with 200 μL cell medium containing 5 μg/cm$^2$ CB particles. After the exposure for various time periods (4, 8 and 24 h), the cells were washed three times with IMDM before performing immunohistochemistry. Cells that did not undergo CB treatment were used as controls at the various time points.

Example 9

Immunohistochemistry

Cells were fixed using 4% paraformaldehyde containing 4% sucrose in PBS for 20 min. Permeabilization and blocking was performed for 2 h using 0.3% Triton X-100, 1% bovine serum albumin, and 10% goat serum (Merck Millipore, Belgium) in PBS containing 0.3 M glycine (VWR Chemicals, Belgium) and 5% sucrose. Antibodies were diluted in a blocking buffer consisting of 1% BSA and 0.1% Triton X-100 in PBS. The primary antibodies were monoclonal mouse anti-α-tubulin (1:1,000 for 1 h at room temperature, Sigma-Aldrich, Belgium), monoclonal rat anti-human vimentin (10 µg/mL for 3 h at room temperature, Bio-Techne, UK), and monoclonal rabbit anti-paxillin (1:100 overnight at 4° C., Abcam, UK). The secondary antibodies were donkey anti-mouse Alexa Fluor 488, goat anti-rat Alexa Fluor 555, and goat anti-rabbit Alexa Fluor 647 (1:250, 1 h, Life Technologies, Belgium). All washes were done three times with PBS for at least 5 min. Before confocal imaging, all wells were aspired and 200 µL Immu-Mount (Thermo Scientific Shandon™ Immu-Mount™, Thermo Fisher Scientific, Germany) was added.

Example 10

Laser Scanning Microscopy Imaging of CB Engulfed by MRC-5 Cells

All images were collected at room temperature using a Zeiss LSM510 META NLO scan head mounted on an inverted laser scanning microscope (Zeiss Axiovert 200 M, Germany) and a 40×/1.1 water immersion objective. CB particles were illuminated with a femtosecond laser pulse and 4 mW average laser power at the sample (810 nm, 150 fs, 80 MHz, MaiTai, Spectra Physics, USA). Emission of the particles in the non-descanned mode was observed after spectral separation and filtering of the signal and a 400-410 BP filter was used to additionally filter the emission light. In the descanned mode, the emitted signal was detected with a BP 650-710. The pinhole was opened completely. To avoid cross-talk with the CB white light emission when imaging fluorophore-labelled cellular structures sequential imaging was used.

For imaging the tubulin cytoskeleton of the cells, the microscope was coupled to a 30 mW air-cooled Argon ion laser (LASOS Lasertechnik GmbH, Germany) emitting at 488 nm (~3 µW maximum radiant power at the sample). The band-pass filter 500-530 was used for filtering the emission signal. For imaging both the actin cytoskeleton and the whole cell, excitation at 543 nm was performed using a 5 mW Helium Neon laser (LASOS Lasertechnik GmbH, Germany, ~3 µW maximum radiant power at the sample). The band-pass filter 565-615 was used for filtering the emission signal. The resulting 1024×1024 images with a pixel size of 0.06 µm were recorded using a pixel dwell time of 14.2 µs. A fixed pinhole size of 100 µm was used.

Example 11

Results

In this study a variety of carbonaceous particles, representative for those to which humans are typically exposed, is used ranging from powders used in copy machines to materials that are typically employed as model for soot. Information on the physico-chemical characteristics of these different commercial CB materials (ufPL, ufP90, CCB and fCB) can be found in Table 2. According to manufacturer's data, the aerodynamic diameter of the particles varies between 13 and 500 nm. Transmission electron microscopy (TEM) images (FIGS. 1B and 23) show the typical appearance of CB consisting of aciniform aggregates of primary carbon particles with arbitrary shape. These TEM images and the results from dynamic light scattering summarized in Table 2 show that CB particles aggregate when suspended in aqueous solutions, and absorb corona proteins from the complete medium onto their surface resulting in an increased hydrodynamic diameter and a zeta-potential corresponding to approximately −20 mV regardless of their native potential. In conclusion, the physico-chemical characteristics of the different CB particles in suspension are similar although when selecting the particles we aimed for as much difference as possible.

FIG. 1C displays CB suspended in ultrapure water, ethanol and glycerol illuminated with a femtosecond laser at 810 nm (150 fs, 80 MHz) and recorded using a commercial multiphoton laser-scanning microscope. Intense signals were detected with an emission band pass filter of 450 to 650 nm in front of the detector. Depending on the suspension medium, the laser power needs to be adjusted to generate similar emission intensity: in glycerol and immersion oil the illumination power was about twice that of the experiment in ethanol or water (FIG. 24). Note the horizontal smearing of the CB particles in FIG. 1C (pixel dwell time of 1.60 µs, pixel size of 220 nm). This phenomenon is observed at all combinations of scan speeds and zooms (data not shown), suggesting susceptibility of the particles to optical trapping under these conditions. This hypothesis is further supported by the absence of this smearing when CB particles are embedded in polydimethylsiloxane (FIG. 25). Trapping by femtosecond laser pulses has already been shown for other types of nanoparticles (A. Usman et al., Sci. Prog., 2013, 96, 1; A. Usman et al., Femtosecond trapping efficiency enhanced for nano-sized silica spheres, 2012, 845833).

Additional spectroscopic measurements were performed to rationalize the observed visible light emission under femtosecond near-infrared illumination.

Firstly, we rule out photoluminescence (PL) reported for very small carbonaceous particles (below 10 nanometer) (S. Ghosh et al., Nano Lett., 2014, 5656; Q. Li et al., J. Phys. Chem., 2010, 114, 12062) as a cause of the observed emission. Carbonaceous particles, in particular soot, consist of or comprise aggregated particles that are heterogeneous in nature and therefore contain multiple absorbing species possibly responsible for radiative transitions. The extinction spectra of aqueous suspensions of the CB particles considered here cover the whole visible range (FIG. 2A), presumably due to a continuum of electronic states in the amorphous carbon. The slight increase of the extinction towards lower wavelengths for the two smaller particles (ufPL and ufP90) is likely due to increased light scattering.

Two-dimensional single photon excitation-emission plots (FIG. 2B) of ufPL (similar plot for fCB: FIG. 26) however, show only weak emission; note in comparison the weak Raman line (red arrow) of water, the suspension medium.

Two-dimensional single photon excitation-emission plots (FIG. 2B) of ufPL (similar plot for fCB: FIG. 26), however, show only weak emission; note in comparison the weak Raman line (red arrow) of water, the suspension medium.

In contrast to single photon excitation, illumination with femtosecond pulsed near-infrared light (810 nm, 150 fs, 80 MHz) generates a strong, feature-less white light emission stretching the whole visible spectrum (FIGS. 3A and B). This observation was made for all four types of aqueous CB suspensions used in this study and even for dry particles (FIG. 28). This WL emission is independent of the illumination wavelength within the range of 780 to 900 nm for a constant average power of 8 mW at the sample (FIG. 3B, FIG. 29).

While PL as visible in FIG. 2B cannot explain the strong WL emission observed under femtosecond illumination (FIGS. 1C, 3A and B), time-resolved investigations are indicative. Using time correlated single photon equipment, an instantaneous nature of the WL radiation is noticed when looking at the picosecond timescale (FIG. 30). Also in femtosecond up-conversion experiments with a higher temporal resolution the emitted signal of the CB particles is witnessed to be instantaneous (FIG. 3C). On further note, illumination with 7 ps pulses results in a strongly reduced luminescence intensity (FIG. 31). The WL emission from the suspended CB particles is therefore only efficiently triggered by femtosecond illumination with high peak electromagnetic fields and once the femtosecond illumination pulse ceases, the WL emission terminates immediately.

The instantaneous nature of the observed signal confirms that we are not dealing with incandescence despite using laser illumination with fluences of about 0.05 J/cm$^2$ at 0.1 nJ pulse energy, similar to previous experiments.

The observed instantaneous WL emission is also not related to local refractive index changes in the CB nanoparticle environment upon pulse arrival. We can confirm that also the WL emission of CB displays a nonlinear, second order response with respect to the incident power (FIG. 32).

As a result of visible WL generation by carbon black particles under femtosecond pulsed near-infrared illumination, the signal of the particles can easily be combined with various conventional contrast-enhancing fluorophores used to visualize biological features. As shown in FIG. 4, the emitted WL can be probed at different wavelengths at laser powers compatible with life cell imaging. Hence, CB detection can be combined with simultaneous imaging of cellular compartments stained by different color-label fluorophores. This simultaneous detection enables unequivocally localization of the particles inside the cells and puts the CB location directly into its biological context.

To further illustrate the versatility of the technique in a biological setting, a co-localization study of the tubulin cytoskeleton of MRC-5 lung fibroblasts and engulfed carbon particles was performed (FIG. 5). The images show a clear impact of CCB on the architecture of the tubulin cytoskeleton of the cells for an incubation that exceeds four hours at 37° C. More specifically, the supporting cytoskeleton network evolves from the commonly observed fiber-like structure to a partial diffuse and holey configuration. The cytoskeletal alteration is also reflected in the overall morphology of the cells. Their appearance changed from the normal bipolar and stretched morphology to a smaller and more irregular shaped one, which is an indication of apoptosis (these biological findings are also true for the other smaller CB particles, for an additional example with ufP90, FIG. 33). These images do not only pinpoint the versatility in biological settings but also immediately indicate the social relevance and significance of this detection technique. Potential advantageous information arising from this simultaneous detection comprise the correlations that can be made between the location of the particles and the altered cellular structure (e.g., cytoskeleton and focal adhesions). This makes the observed WL emission an extremely interesting label-free detection mechanism for biomedical research including toxicology and epidemiology.

To conclude, femtosecond pulsed illumination of CB followed by detection of emitted WL is a straightforward approach without the need of particular sample pretreatment and which can easily be implemented in multiphoton imaging experiments. The nature of the signal makes it very versatile in terms of choice of additional fluorophores. The ease of the reported approach broadens the potential applicability in the fast growing field of nanotechnology. Additionally, it will advance epidemiological and toxicological studies since this is the first time a technique is described to directly detect carbon black in a biological setting without any additional treatment or labeling required. We anticipate that this technology will make it possible to screen human tissues and body fluids for the presence of CB owing to the multiphoton approach which results in inherent 3D sectioning and high imaging depths. This may eventually lead to valuable information about, for example, the actual uptake and clearance of CB particles by the human body.

Particular and preferred aspects of the invention are set out in the accompanying independent and dependent claims. Features from the dependent claims may be combined with features of the independent claims and with features of other dependent claims as appropriate and not merely as explicitly set out in the claims.

FIG. 6 gives a perspective view explaining one embodiment of an apparatus for analysing carbonaceous particles in fluids, cells or tissues of biological and carrier media of non-biological origin according to the present invention. In FIG. 6, a chassis for accommodating components of the apparatus for analysing carbonaceous particles in fluids and tissues is omitted in part to facilitate good understanding FIGS. 7A and 7B are drawings showing an outline of a functional composition of the fluid specimen distribution section 2 and part of the optical detecting section 3. In FIG. 7A, a rack table 21 transfers 23 a sample rack (test tube stand for fluids) 22. The fluid sample is contained in a disposable test tube 24 which is especially designed to fit the system and has a bar code label 25 that can be automatically scanned by the system for ID recognition (not shown). After stirring, the sample is sucked by a syringe pump 26 using a suction pipe and is dispensed to the liquid specimen aliquotation section 28 by microfluidic tubing 27 into the liquid sample vessel 284. The liquid specimen distribution section 28 in the present embodiment is composed of different exchangeable vessels containing sheath fluid (Sh) 281, rinse fluid (Ri) 282, calibration solution (C) 283, and the aliquot of liquid sample (S) to be analyzed 284, and a pump 285, and flow control valves 286. FIG. 7B shows additionally the waste collection 213 enabling rinsing of the sample vessel and tubing. The sample distribution section 28 introduces aliquots of quantified liquid sample via microfluidic tubing 287 into the optical detection section 3. The liquid sample creates a fine stream being wrapped by a temperature controlled sheath solution feeder 288 in a sheath flow cell 311 and laser light is irradiated thereto via an objective 33. These operations are carried out automatically by actuating driving units and valves (not shown), checked by flow and valve sensors (not shown), and controlled by a microcomputer 55 (control apparatus), which will be described hereafter.

FIG. 7C is a drawing explaining the fluid sample quantifying mechanism of the apparatus for analysing carbonaceous particles relating to the present embodiment. Under micro-computer 55 control a sampling valve 286, which is used regularly, is employed as the quantifying mechanism for distributing a predetermined amount of fluid sample to the sample vessel (S) 284. This sampling valve 286 includes two disk-like fixed elements and a movable element being sandwiched by the fixed elements, and the moveable element is turned by a motor (not shown). The sampling valve 286 is equipped with two discs 286a, 286b superimposed with each other. A flow path is formed inside the discs for circulation of the sample, the flow path is isolated when one disk 286*b* is turned around the centre axis thereof, thereby quantifying the sample. The liquid specimen vessel 284 is heated by heaters 289*a* and 289*b*, each composing a temperature regulation section. The temperature control is important for controlling the viscosity and thus flow velocity of the liquid sample. Depending on the type of fluid the temperature of the heaters can be controlled by the microcomputer 55 by ON-OFF control, based on the results of measurements thus obtained. This design is identical for the other vessels, namely the calibration solution vessel (C) 283, the rinse fluid vessel (Ri) 282, and the sheath fluid vessel (Sh) 281.

FIG. 8 is a drawing showing a composition of the optical detecting section 3. A beam splitter 32 reflects laser light irradiated from a femtosecond pulsed laser 34 through the objective 33 on the specimen holder 31. The specimen holder 31 is either a sheath flow cell 311 through which fluids will be directed or an optically transparent microscope cover slip 312 which can support carbonaceous powders, cells, and tissues which have been exposed to carbonaceous particles. A collecting lens 35 focuses forward emitted light of carbonaceous particles onto a detector 36, which can act as a forward light receiving element, containing a laser light blocking band-pass filter 37. Further, another collecting lens 38 focuses backward light through a laser light blocking band-pass filter onto a detector 39, which acts as a backward light receiving element. These optical signals are originating from the carbonaceous particles. The detector 36 and detector 39 convert optical signals to electric signals and generate each a forward light signal and backward light signal, respectively. After being amplified by a preamplifier (not shown), these outputs are subjected to the next processing. As for the laser source 34, a laser which generates pulses with a pulse duration sufficiently short to trigger an instantaneous response from carbonaceous particles. A stationary laser beam will be employed when detecting and analysing carbonaceous particles in air and fluids of biological or carrier media of non-biological origin, otherwise when detecting and analysing these particles in cells and tissues of biological or carrier media of non-biological origin a scanning laser beam or scanning stage which holds the microscope cover slide will be used. It is preferable to employ a repetition rate in the order of MHz. The wavelength of the pulses can be ranging from 750 to 950 nm or 700 to 1200 nm.

FIG. 9 is a block diagram showing a whole composition of the apparatus U for detecting and analysing carbonaceous particles in fluids, cells and tissues of biological or carrier media of non-biological origin. The apparatus U for detecting and analysing carbonaceous particles in air, fluids, cells and tissues of biological and carrier media of non-biological origin includes the above-mentioned fluid specimen distribution section 2 and optical detection section 3, an analog signal processing circuit 51 for executing amplification and filter processing of the output of the optical detecting section 3 for those detector signals being amplified by the preamplifier, an A/D converter 52 for converting the output of the analog signal processing circuit 51 to a digital signal, a digital signal processing circuit 53 for executing a predetermined waveform processing for digital signals, memory 54 connected to the digital signal processing circuit 53, the microcomputer 55 connected to the analog signal processing circuit 51 and the digital signal processing circuit 53, and a data transfer connection (e.g., LAN, USB or Wifi connection) 56 connected to the microcomputer 55. The personal computer 6 (analysis section) provided outside is connected via the data transfer 56 to the apparatus U for detecting carbonaceous particles in fluids, cells and tissues of biological and carrier media of non-biological origin, and analysis of data acquired by the apparatus. The analog signal processing circuit 51, A/D converter 52, digital signal processing circuit 53, and memory 54 compose a signal processing circuit 5 for electric signals being output by the optical detecting section 3.

FIG. 10 shows a composition of the battery and temperature controller section of the apparatus for detecting and analysing carbonaceous particles. Microcomputer 55 control of the apparatus power supply 41 with feedback to the computer 6 and backup battery block 42 safeguard to prevent data loss and to send a feedback signal to the apparatus U to turn into a standby or turn-off mode. Thermoelectric cooling control unit 43 of the detector units 36 and 39 to reduce noise and of the laser 34 to guarantee a stable laser beam.

FIG. 11 is a flowchart (first half) showing the analysis procedures using the apparatus for detecting and analysing particles in air, fluids, cells, and tissues of biological and carrier media of non-biological origin relating to one embodiment according to the present invention FIG. 12 is a flowchart (second half) showing the analysis procedures using the apparatus for detecting and analysing particles in fluids, cells, and tissues of biological and carrier media of non-biological origin relating to one embodiment according to the present invention;

Next, referring to flow charts shown in FIG. 11 and FIG. 12, the analysis procedures using the apparatus for detecting and analysing carbonaceous particles related to one embodiment according to the present invention will be explained.

First, specimen information such as sample number, patient information such as name, age, gender, and other speciality associated with the sample number, and measurement items can be inserted for a batch of specimens (Step S1). A measurement execution instruction is then given by input means such as a keyboard or a mouse of the personal computer 6 (Step S2). Upon receiving this instruction, an automated calibration procedure is conducted including rinsing of the tubing using rinsing fluid (Step S3), calibration using calibration fluid (Step S4), and rinsing again of the tubing using rinsing fluid (Step S5). During the calibration, feedback is given to the optical detection section 3, and the settings are adjusted accordingly.

For fluid samples, the following procedure applies:

After the calibration, the sample rack 22 in which are set test tubes each containing a liquid sample is transferred 23 by the rack table 21 to a predetermined suction position (Step S6). The test tube 24 on which a barcode 25 printed on the ID label is pasted (Step S7) 24 is being read. The sample number is then known, which is then verified with the sample information acquired in step S1, and measurement items of the sample can be identified. Then, the suction pipe 26 goes down, a front edge of the suction pipe 26 is inserted into the sample in the test tube 24, and the sample is lightly sucked and discharged repeatedly in this state so that the sample may be stirred (Step S8). After being stirred, a predetermined amount of the sample is sucked into the liquid specimen aliquotation section 28 and dispended via microfluidic tubing 27 into the liquid sample vessel 284 by the sampling valve 286 (Step S9). The liquid sample vessel 284 is heated by the heaters 289*a* and 289*b* to a predetermined temperature, and stirring of the specimen is carried out by a propeller type stirrer (not shown). Following this, a sheath solution from the sheath fluid vessel 281 is sent to the sheath flow cell 311 of the optical detection section 3 (Step S10), the fluid specimen for the measurement of carbonaceous particles is then introduced to the optical detection section 3, and a fine stream (sheath flow) wrapped by the sheath solution is formed in the sheath flow cell 311 (Step S11). Upon completion of the measurement (A), the liquid specimen is collected in a waste container after the measurement (Step S12) and the tubing and the liquid specimen vessel 284 are rinsed using rinsing fluid from the rinse fluid vessel 282 (Step S13).

When measuring air, cells, and tissues of biological and carrier media of non-biological origin, the steps S6 up to and including step S13 are skipped. This means that after the calibration steps (Step S3-Step S5) the samples are directly irradiated by the laser beam (Step S14). In the case of the liquid samples, the laser beam from the femtosecond laser 34 is irradiated to the sheath flow cell 311 (Step S14).

Forward and backward light of the carbonaceous particles generated by the pulsed laser beam irradiation are received by the detectors 36 and 39, respectively, converted to electric signals, and are output by the optical detecting section 3 as a forward light signal and a backward light signal (Step S15). These outputs are amplified by the preamplifier (Step S16) and converted to digital signals in the signal processing circuit 5 (see FIG. 9) and at the same time, subjected to the predetermined waveform processing (Step S17), and are transmitted to the personal computer 6 via data transfer 56. Then, raw data of the carbonaceous particles are generated in the personal computer 6 (Step S18) and at the same time, intensity and sizing diagrams (fluid samples) or images (cells and tissues) are generated based on the data (Step S19). Further, the number of carbonaceous particles is counted for every data set (Step S21) based on the performed algorithm analysis (Step S20). Results of the measurements obtained as mentioned above are displayed on a display which is a display means of the personal computer 6 (Step S22).

FIG. 2A illustrates the relationship between absorption wavelength and absorbance for different exemplary carbonaceous particles in solution. As examples four types of carbonaceous particles (CBs) were used: ultrafine carbon black nanopowder (ufPL; PlasmaChem GmbH, Germany), ultrafine Printex 90 (ufP90; Orion Engineered Carbons, Germany), conductive carbon black nanopowder (CCB; US Research Nanomaterials, USA) and mesoporous fine carbon nanopowder (fCB; Sigma-Aldrich, Belgium). The mean aerodynamic diameters as provided by the manufactures were 13, 14, 150 and 300 nm for ufPL, ufP90, CCB and fCB, respectively. Aqueous stock suspensions (2 mg/mL) were prepared, ultrasonicated for 30 min and stored at 4° C. in the dark until further use. Immediately before use, stock suspensions were ultrasonicated for 20 min prior to dilution in either water, phosphate buffered saline (PBS) or Iscove's Modified Dulbecco's Medium (IMDM; Life Technologies, Belgium) supplemented with 10% fetal bovine serum (FBS; Biochrom AG, Germany), 100 U/mL penicillin, and 100 µg/mL streptomycin. The absorption spectra of the CB solutions were measured with a Lambda 950 UV/Vis/NIR spectrometer (Perkin Elmer, Waltham, USA) double beam, double monochromator, ratio recording UV/Vis/NIR spectrophotometer. The suspensions were prepared as described and measured in a quartz cuvette (1 cm optical path length) immediately after preparation to minimize sedimentation. Single scans were recorded in the visible spectral wavelength range between 400 and 800 nm with a scanning speed of 0.25 nm/s and a slit width of 5 nm. The extinction spectra of aqueous suspensions of the CB particles considered here cover the whole visible range, presumably die to a continuum of electronic states in the amorphous carbon. The slight increase of the extinction towards lower wavelengths for the two smaller particles (ufPL and ufP90) is likely due to increased light scattering.

FIG. 30 shows the temporal response of CB and/or BC particles dried on glass and in aqueous suspension measured by time correlated single photon counting timing. The instrument response function (IRF) is also shown. Following femtosecond illumination (810 nm, 80 MHz, 5 mW) of CBs suspended in ultrapure water or dried on a cover glass, the temporal response of the emitted signal was detected using a GaAsP photomultiplier tube (PMT; 7422, Hamamatsu, Germany) after spectral filtering using a dichroic mirror KP 650, a KP 685 short-pass filter and a 450-650 band-pass (BP) filter. The PMT was connected to a SPC830 card (Becker and Hickl, Germany) which was synchronized to the pulse train of the laser. Recordings of the 256×256 pixel images with a pixel size of 0.11 µm were performed using a pixel dwell time of 6.4 µs. This experimental result shows the instantaneous nature of the emitted signal by carbonaceous particles.

FIG. 3A is a graphical illustration of normalized emission spectra of aqueous CB and/or BC particle suspensions using femtosecond laser illumination with pulse duration <200 femtoseconds. CB suspensions were contained in optical chambers fabricated by two glass cover slides held together by double sided adhesive tape (8153LE, 3M, Belgium) with a central punched hole of 5 mm. These CB suspensions or CB particles dried on a cover glass (were excited with a conventional femtosecond titanium-sapphire laser (810 nm, 150 fs, 80 MHz, MaiTai, Spectra Physics, USA). The illumination power was set to 8 mW after a 60×/0.95 air objective (CFI Plan Apo Lambda 60×/0.95, Nikon, Japan). A 750 nm short pass dichroic filter was separating the visible emission from the near infrared illumination. The emitted light was focused onto a pinhole and then imaged onto a spectrograph with an attached EM-CCD camera (ImagEM Enhanced C9100-13, Hamamatsu, Japan). An additional short pass filter blocked any fundamental laser light. Integration times of 45 s were sufficient to generate spectra with high signal-to-noise ratio (>100). From these experimental results it can be seen that the illumination of carbonaceous particles with femtosecond pulsed light generates a strong, feature-less light emission stretching over a large part of the spectrum.

FIG. 3B is a graphical illustration of the normalized emission spectra of a CB and/or BC particle suspension recorded at different wavelengths using a femtosecond laser with <200 femtosecond pulse duration in the focus of an objective with numerical aperture of 0.9. This experimental result shows that the emission by the carbonaceous particles is independent of the illumination wavelength within the tested range of 780 to 900 nm for a constant power of 8 mW at the sample.

FIG. 13 is an exemplary result of ultrapure water linearly spiked with CB and/or BC particles and measured using the presented invented method of measuring carbonaceous particles. The solutions were prepared using the same ultrasonication steps as described before and the dried sample was made by air drying a droplet of CCB in ultrapure water on a cover glass. The images were collected using a Zeiss LSM510 META NLO (Carl Zeiss) mounted on an Axiovert 200 M equipped with a femtosecond pulsed laser (MaiTai, Spectra Physics, 150 fs, CA, USA) tuned to a central wavelength of 810 nm with a 5 or 10 mW radiant power at the sample position and using a 40×/1.1 water immersion objective (LD C-Apochromat 40×/1.1 W Korr UV-Vis-IR, Carl Zeiss). All images were taken 300 µm above the cover glass to reduce variation between samples and in total 10 images were acquired for analysis. To count the number of carbonaceous particles in these images, a simple peak-find algorithm in Matlab (Matlab 2010, MathWorks) was used that counts connected pixels above a threshold value. A threshold value of 15% lower than the highest intensity value was chosen which gave highly reproducible values. As one image reflects only the amount of particles in a specific volume, this was recalculated to a total amount of particles detected per mL. From this result it is clear that there is a linear relation between the added concentration of carbonaceous particles in ultrapure water and the amount of particles detected per mL ultrapure water. The data (N=3) are plotted linearly ($R^2$=0.99).

FIG. 14 is an exemplary result of CB and/or BC particle (600 µg/mL) imaging in ultrapure water, ethanol and glycerol at room temperature upon illumination with 5 mW average laser power at the sample (excitation 810 nm, 80 MHz). Scale bars: 15 µm. Emission band: 450-650 nm. CCB particles were dispersed at a concentration of 600 µg/mL in ultrapure water, ethanol (Ethanol absolute, VWR Chemicals, Belgium), glycerol (Glycerol BioXtra≥99%, Sigma-Aldrich, Belgium), and microscope oil (Immersol™ 518 F, Carl Zeiss, Germany). The solutions were prepared using the same ultrasonication steps as described before. The images were collected using a Zeiss LSM510 META NLO (Carl Zeiss, Germany) mounted on an Axiovert 200 M equipped with a femtosecond pulsed laser (810 nm, 150 fs, 80 MHz, MaiTai, Spectra Physics, USA) tuned to a central wavelength of 810 nm with a 5 or 10 mW radiant power at the sample position and using a 40×/1.1 water immersion objective (LD C-Apochromat 40×/1.1 W Korr UV-Vis-IR, Carl Zeiss). The resulting 1024×1024 images with a pixel size of 0.22 µm were recorded with a 1.6 µs pixel dwell time at room temperature. It can be seen from these results that depending on the suspension medium, the laser power needs to be adjusted to generate similar emission intensity: in glycerol and immersion oil the illumination power was about twice that of the experiment in ethanol or water. Note the horizontal smearing of the carbonaceous particles (pixel dwell time of 1.60 µs, pixel size of 220 nm). This, phenomenon is observed at all combinations of scan speeds and zooms (data not shown), suggesting susceptibility of the particles to optical trapping under these conditions. This hypothesis is further supported by the illumination of CB particles in polydimethylsiloxane (FIG. 19) where no horizontal smearing is observed.

FIG. 15 is an exemplary result obtained by imaging CB and/or BC particles in the body fluid urine at room temperature [22° C. see below] upon illumination with 5 mW average laser power at the sample (excitation 810 nm, 80 MHz). Scale bar: 50 µm. Emission band: 450-650 nm. Urine samples were collected using designated metal-free sample jars (Yvsolab, Belgium) and placed at 4° C. until long-term storage at −80° C. A 40×/1.1 water immersion objective (LD C-Apochromat 40×/1.1 W Korr UV-Vis-IR, Carl Zeiss) was used and the laser was tuned to a central wavelength of 810 nm with a ~9.7 mW radiant power at the sample position. Carbonaceous particle emission was detected via analogue photomultiplier detection in epi-configuration in non-descanned mode after the signal passed through a 400-410 nm band pass filter. The resulting images had a 512×512 pixel resolution, a 0.44 µm pixel size, and a 3.2 µs pixel dwell time. All data were recorded at room temperature (22° C.). From these data it can be concluded that it is possible to measure low concentrations of carbonaceous particles in fluids and more specific in body fluids.

FIG. 16 is an exemplary result obtained by imaging CB and/or BC particles in polydimethylsiloxane at room temperature upon illumination with 5 mW average laser power at the sample (excitation 810 nm, 80 MHz). Scale bar: 50 µm. Emission band: 450-650 nm. Carbonaceous particles were dispersed at a concentration of 600 µg/mL in a 10:1 weight-ratio mixture of polydimethylsiloxane (PDMS) base polymer and curing agent (Dow Corning, Germany) degassed at 0.55 Bar and cured for 30 minutes at 70° C. The solutions were prepared using the same ultrasonication steps as described before. The images were collected using a Zeiss LSM510 META NLO (Carl Zeiss, Germany) mounted on an Axiovert 200 M equipped with a femtosecond pulsed laser (810 nm, 150 fs, 80 MHz, MaiTai, Spectra Physics, USA) tuned to a central wavelength of 810 nm with a 5 mW radiant power at the sample position and using a 40×/1.1 water immersion objective (LD C-Apochromat 40×/1.1 W Korr UV-Vis-IR, Carl Zeiss). The resulting 1024×1024 images with a pixel size of 0.22 µm were recorded with a 1.6 µs pixel dwell time at room temperature. It can be seen that in this polymer no optical trapping is observed but that it is possible to detect carbonaceous particles and image them.

FIG. 17 is an exemplary result obtained by imaging cellular compartments of fixed human lung fibroblast cell (MRC-5 cell line) which had engulfed CB and/or BC particles when exposed to 5 µg/cm² particles at 37° C. prior to imaging. Emission of the carbonaceous particles has been probed at 400-410 nm upon illumination with 5 mW average laser power at the sample (excitation 810 nm, 80 MHz). Scale bar: 20 µm. Human fetal lung fibroblast (MRC-5 cell line, ATCC CCL-171, LGC Standards, France) cells were maintained (37° C., 5% CO2) in Minimum Essential Medium (MEM) supplemented with 10% FBS, 100 U/mL penicillin, and 100 µg/mL streptomycin. When 80-90% confluency was reached, cells were routinely subcultured. Cells for imaging were seeded on 96-well culture plates at a density of 10,000 cells/well and incubated overnight to allow for cell adherence. After washing three times with PBS, cells were treated with a concentration of different 5 µg/cm² carbonaceous particles. Cells without CBs were used as controls. After exposure for 4 h, the cells were washed three times with IMDM and fixed using 4% paraformaldehyde containing 4% sucrose in PBS for 20 min. Permeabilization and blocking was performed for 2 h using 0.3% Triton X-100, for 30 min followed by a 1 h block with 12% bovine serum albumin (BSA, Sigma-Aldrich, Belgium) and 10% goat serum (Merck Millipore, Belgium) in PBS containing 0.3 M glycine (VWR Chemicals, Belgium) and 5% sucrose. Antibodies were diluted in a blocking buffer consisting of 1% BSA and 0.1% Triton X-100 in PBS. The primary antibodies were monoclonal mouse anti-α-tubulin (1:1,000 for 1 h at room temperature, Sigma-Aldrich, Belgium), monoclonal rat anti-human vimentin (10 µg/mL for 3 h at room temperature, Bio-Techne, UK), and monoclonal rabbit anti-paxillin (1:100 overnight at 4° C., Abcam, UK). The secondary antibodies were donkey anti-mouse Alexa Fluor 488, goat anti-rat Alexa Fluor 555, and goat anti-rabbit Alexa Fluor 647 (1:250, 1 h, Life Technologies, Belgium). In addition, actin stain phalloidin Alexa Fluor 647 (1:40, 1 h, Life Technologies, Belgium). All washes were done three times with PBS for at least 5 min. Before confocal imaging, all wells were aspired and 200 µL Immu-Mount (Thermo Scientific Shandon™ Immu-Mount™, Thermo Fisher Scientific, Germany) was added. All images were collected at room temperature using a Zeiss LSM510 META NLO scan head mounted on an inverted laser scanning microscope (Zeiss Axiovert 200 M, Germany) and a 40×/1.1 water immersion objective. CB particles were illuminated with a femtosecond laser pulse train and 4 mW average laser power at the sample (810 nm, 150 fs, 80 MHz, MaiTai, Spectra Physics, USA). Emission of the particles in the non-descanned mode was observed after spectral separation and filtering of the signal and a 400-410 nm BP (Band Pass) filter was used to additionally filter the emission light. In the descanned mode, the emitted signal was detected with a BP 650-710. The pinhole was opened completely. To avoid cross-talk of the white light emission of the carbonaceous particles when imaging structures labelled with fluorophores, subsequent imaging is necessary. For imaging the tubulin cytoskeleton of the cells, the microscope was coupled to a 30 mW air-cooled Argon ion laser (LASOS Lasertechnik GmbH, Germany) emitting at 488 nm (~3 μW maximum radiant power at the sample). The band-pass filter 500-530 was used for filtering the emission signal. For imaging both the actin cytoskeleton and the whole cell, excitation at 543 nm was performed using a 5 mW Helium Neon laser (LASOS Lasertechnik GmbH, Germany, ~3 μW maximum radiant power at the sample). The band-pass filter 565-615 was used for filtering the emission signal. The resulting 1024×1024 images with a pixel size of 0.06 μm were recorded using a pixel dwell time of 14.2 μs. A fixed pinhole size of 100 μm was used. Images were captured using the AIM 4.2 software (Carl Zeiss, Germany) and processed with the image processing package Fiji (ImageJ v1.47, Open source software, http://fiji.sc/Fiji). As a result of the broad emission by carbonaceous particles under femtosecond pulsed illumination, the signal of the particles can easily be combined with various conventional contrast-enhancing fluorophores used to visualize biological features. This simultaneous detection enables unequivocally localization of the particles inside the cells and puts the CB location directly into its biological context.

FIG. 18 is an exemplary result obtained by imaging living human lung fibroblast cell (MRC-5 cell line) exposed to 5 μg/cm$^2$ particles at 37° C. Emission of the CB and/or BC particles has been probed at 400-410 nm upon illumination with 5 mW average laser power at the sample (excitation 810 nm, 80 MHz). Scale bar: 20 μm. This result shows that besides fixed cells imaging is possible of living cells which engulfed carbonaceous particles.

FIG. 19 is an exemplary result obtained by imaging CB and/or BC particles in the biological tissue placenta at room temperature upon illumination with 5 mW average laser power at the sample (excitation 810 nm, 80 MHz). Scale bar: 25 μm. Emission band: 450-650 nm. This shows that it is possible to detect carbonaceous particles taken up by biological tissues and more precise human tissue.

FIG. 20 is an exemplary result obtained by imaging CB and/or BC particles in the biological plant tissue ivy leafs at room temperature upon illumination with 5 mW average laser power at the sample (excitation 810 nm, 80 MHz). Scale bar: 50 μm. Emission band: 450-650 nm. This shows that it is possible to detect carbonaceous particles taken up by biological tissues and more precise plant tissue.

FIG. 21 is a depiction of the flowchart of an optimized experimental protocol for BC detection in urine. Each urine sample is aliquoted at 200 μL/well in a Ibidi μ-slide 8 well and images are taken 300 μm above the cover glass of the well plate (A). The samples are illuminated using a two-photon femtosecond pulsed laser tuned to a central wavelength of 810 nm (~9.7 mW radiant power at the sample position) and the white light generated by the BC particles naturally present in the urine is detected via analogue photomultiplier detection in epi-configuration in non-descanned mode using a 40×/1.1 water immersion objective at room temperature (B). 10 consecutive images are taken on one identical location in the same well. The resulting images have a field of view of 225×225 μm$^2$ with a 512×512 pixel resolution (0.44×0.44 μm$^2$ pixel size) and a pixel dwell time of 3.2 μs (C). In total, 120 images are obtained by recording 10-frame time lapses at three different locations in four different aliquots of one individual (ID) resulting in highly reproducible results (<5% coefficient of variation) (D). To determine the number of BC particles in the images, a peak-find algorithm counting connected pixels above a threshold value (15% lower than the highest intensity value) was used (E). The average amount of particles detected in the different time lapses is normalized to the image volume using the focal volume estimated from the point spread function of the optical system. Finally, the result is expressed as the total relative number, i.e. the number of detected BC particles per milliliter urine. All images of each individual are analyzed in this way to retrieve a number of detected BC particles per milliliter urine sample (F).

FIG. 22 is an exemplary result obtained by imaging BC particles in urine of a child. Aggregates are indicated by arrow heads and particles <300 nm (smaller than one pixel) are indicated by arrows. The BC particles were visualized by femtosecond pulsed laser excitation at 810 nm and observation at 400-410 nm. This shows that it is possible to detect CB and/or BC particles in a body fluid and more specifically in urine.

According to one embodiment a method is provided for detecting the presence of or quantification of carbonaceous particles or its aggregates in a sample or carrier medium comprising the step of non-incandescence related emission generation from carbonaceous particles or its aggregates under illumination with pulsed light having a pulse duration sufficiently short to trigger an instantaneous temporal sample response without emission of heat-induced sample incandescence. In this method the sample or carrier medium can be fluids (for instance body fluid, for instance of a mammal), cells or tissues or other complex environments of biological or non biological origin. It is desirable to use an ultrafast femtosecond laser light source to illuminate the sample or carrier medium. This laser light that is focused on the sample can be from a stationary or scanning beam delivery. It is desirable the ultrafast femtosecond laser light source to illuminate the sample or carrier medium has wavelengths from 750 to 950 nm or in the range of 700 to 1200 nm. Particularly suitable are pulse durations shorter than 500 femtoseconds. It is desirable to use an ultrafast femtosecond laser light source to illuminate the sample or carrier medium, whereby the repetition rate is above 1 MHz and more above 80 MHz. It is also desirable that the illumination light which focused on the sample preferably has an average power of 4-6 mW or at least with an average power below 20 mW and above 2 mW. These embodiment of the invention advantageously comprise that carbonaceous particles or its aggregates to be detected and/or analysed are in carrier media at a temperature below 90° C., preferable between 1° C. and 80° C. and more preferable between 10° C. and 50° C. and that the method is suitable to detect the presence of or to quantify carbonaceous particles or its aggregates are used without labelling or any pre-treatment and in particular of carbon black (CB) and black carbon (BC) particles or its aggregates.

This invention can be used in conjunction with detecting the emission light with any kind of non-imaging or imaging photodetector such as a photomultiplier, avalanche diode, CCD array or sufficiently sensitive diode. Moreover this invention can be used in conjunction with detecting the emission strength by photomultiplier or a laser microscope, such as a laser scanning microscope, or a flow cytometer.

In another aspect, the present invention provides an apparatus to carry out these methods described hereinabove, whereby the apparatus is comprising:

a. A measurement specimen distribution section configured to distribute a liquid control sample and a predefined aliquot of liquid sample;

b. An optical detecting section comprising:
  i. A light source configured to emit a light that illuminates the measurement specimen as specified in here above,
  ii. A forward light receiving element configured to detect forward light emitted from the specimen, and further configured to output a forward light output signal,
  iii. A backward light receiving element configured to detect forward light emitted from the specimen, and further configured to output a backward light output signal c. A computer, comprising a central processing unit (CPU), which comprises a computer executable program, configured to detect and analyse carbonaceous particles or its aggregates in fluids, cells, and tissues of biological and non-biological carrier media origin based on:
  i. A detected forward light signal amount derived from the forward light output signal and,
  ii. A detected backward light signal amount derived from the backward light output signal, wherein, when executed by the CPU, the computer executable program causes the computer to generate an intensity and sizing diagram or an image of the detected carbonaceous particles.

FIG. 1A. Schematic schematic representation of the illumination and emission process of CB particles for the presented detection method. FIG. 1B. TEM image of an ufPL aggregate. Scale bar: 300 nm. FIG. 1C. CCB (600 µg/mL) imaging in ultrapure water, ethanol and glycerol at room temperature upon illumination with 5 or 10 mW average laser power at the sample (excitation 810 nm, 80 MHz). Scale bars: 15 µm. Emission band: 450-650 nm.

FIG. 2A. Extinction spectra of aqueous CB suspensions. FIG. 2B. Two-dimensional excitation-emission plot of ufPL particles in water under single photon excitation with a false black-white map based on the emission intensity in arbitrary units. The arrow points towards the Raman line of water.

FIG. 3A. Normalized WL emission spectra of aqueous CB particle suspensions using femtosecond 810 nm laser illumination (8 mW, 150 fs, 80 MHz). FIG. 3B. Normalized WL emission spectra of aqueous ufP90 suspensions recorded at different femtosecond illumination wavelengths (from 780 (1) to 900 nm (7), with an interval of 20 nm). FIG. 3C. Temporal response of aqueous carbon suspension measured by femtosecond photoluminescence up-conversion experiments. Also shown is the instrument response function, (dashed line).

FIG. 4. Imaging of cellular compartments of fixed MRC-5 cells stained with commonly utilized fluorophores and in combination with the detection of CCB particles (4 h incubation of 5 µg/cm$^2$CCB at 37° C. prior to imaging). Emission of the carbonaceous particles can be probed at different wavelengths, here shown (FIG. 4A) 400-410 nm in the non-descanned mode and (FIG. 4B) 650-710 nm in descanned mode (4 mW average laser power at the stage). From left to right: CCB particles, tubulin cytoskeleton (Ex/Em 495/519 nm, ~3 µW radiant power at the sample), vimentin which is an intermediate filament protein of the cytoskeleton (Ex/Em 555/565 nm, ~3 µW radiant power at the sample), paxillin expressed at focal adhesions (Ex/Em 650/665 nm, ~3 µW radiant power at the sample), and overlay image. Scale bars: 25 µm.

FIG. 5. Tubulin cytoskeleton (green, Ex/Em 495/519 nm, ~3 µW radiant power at the sample) of normal human lung fibroblasts incubated with 5 µg/cm$^2$ CCB particles (red, 4 mW average laser power at the sample, emission detection: 400-410 nm in non-descanned mode) at 37° C. FIG. 5A. Control cells. FIG. 5B. 4 h incubation. FIG. 5C. 8 h incubation. FIG. 5D. 24 h incubation. Scale bars: 30 µm. Arrow heads: some locations of very small, engulfed CCB particles.

FIG. 6 is a perspective view explaining one embodiment of an apparatus for analysing carbonaceous particles in fluids, cells or tissues of biological and carrier media of non-biological origin according to the present invention.

TABLE 1

Raman bands Lorentzian fits. Brackets indicate standard deviation around the mean, N = 3.

| | ufPL (13 nm) | | | fCB (500 nm) | | |
|---|---|---|---|---|---|---|
| | Position (cm$^{-1}$) | Width (cm$^{-1}$) | Area | Position (cm$^{-1}$) | Width (cm$^{-1}$) | Area |
| D-band | 1326 (10) | 288 (59) | 54 (16) | 1325 (19) | 484 (131) | 74 (55) |
| G-band | 1569 (3) | 95 (11) | 23 (8) | 1571 (6) | 148 (30) | 48 (12) |
| Bent SWCNT | 1695 | 65 | 3 | 1695 | 90 | 13 |

TABLE 2

Physico-chemical characteristics of the four considered types of carbon black particles.

| | Aerodynamic diameter (nm)[a] | Hydrodynamic diameter (nm) | | Zeta potential (mV) (Mean ± SD) | |
|---|---|---|---|---|---|
| | | Ultrapure water | Complete medium | KCl solution | Complete medium |
| ufPL | 13 | 112 | 171 | −12 ± 1 | −17 ± 2 |
| ufP90 | 14 | 156 | 218 | +29 ± 6 | −22.45 ± 0.01 |
| CCB | 150 | 165 | 226 | −48 ± 2 | −24 ± 3 |
| fCB | <500 | 387 | 585 | −26 ± 3 | −21 ± 6 |

[a]Manufacturer's data

BRIEF DESCRIPTION OF THE DRAWINGS

The present invention will become more fully understood from the detailed description given herein below and the accompanying drawings which are given by way of illustration only, and thus are not limitative of the present invention, and wherein.

REFERENCES TO THE APPLICATION

Figure 1:
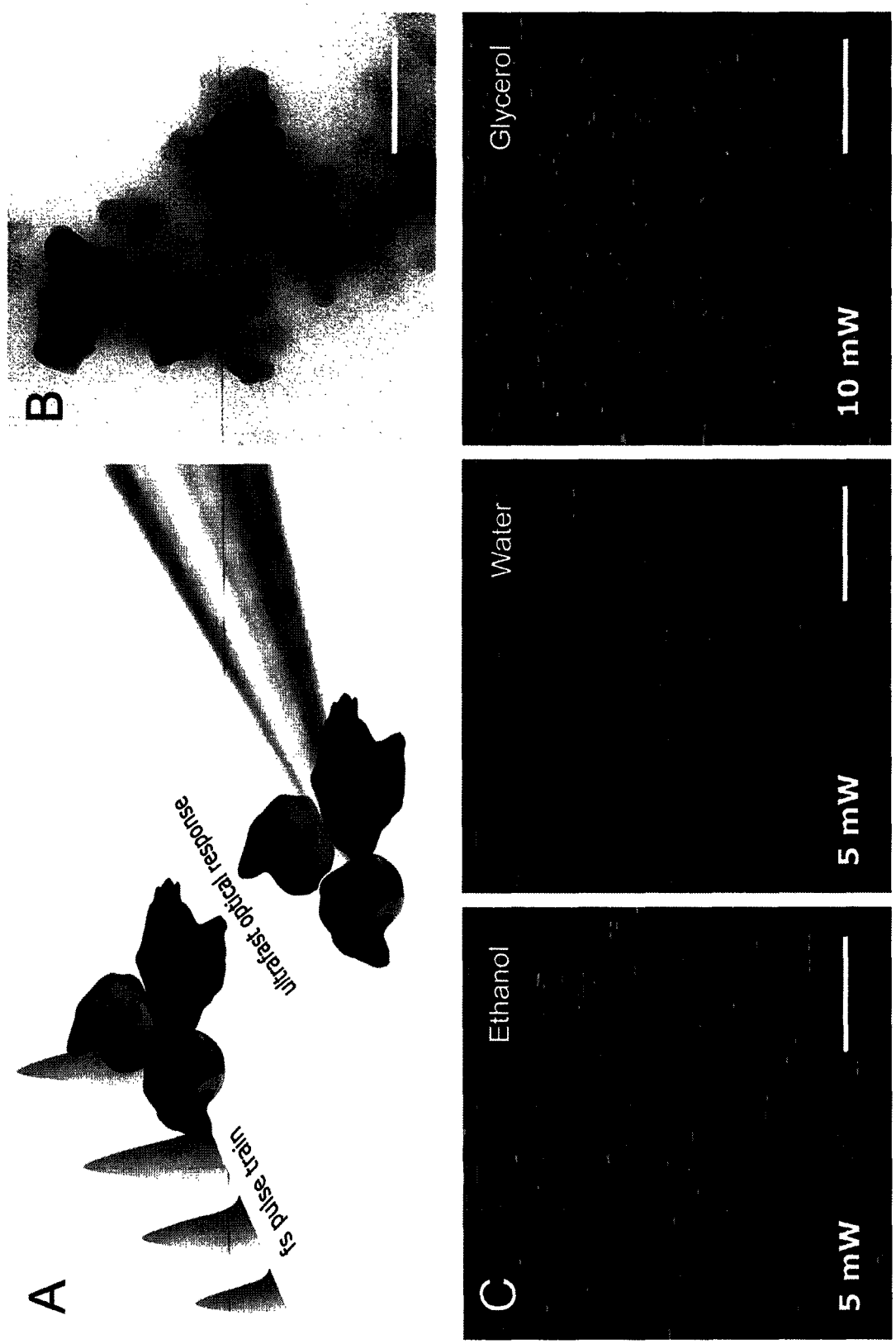
Figure 2:
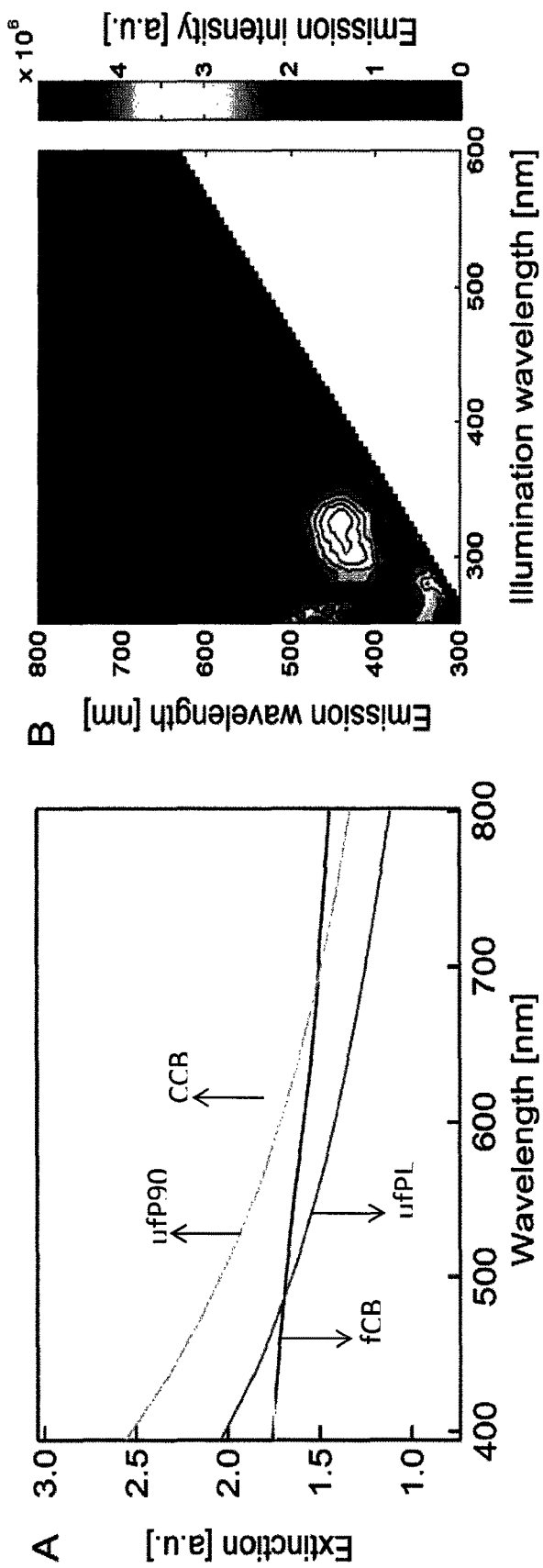
Figure 3:
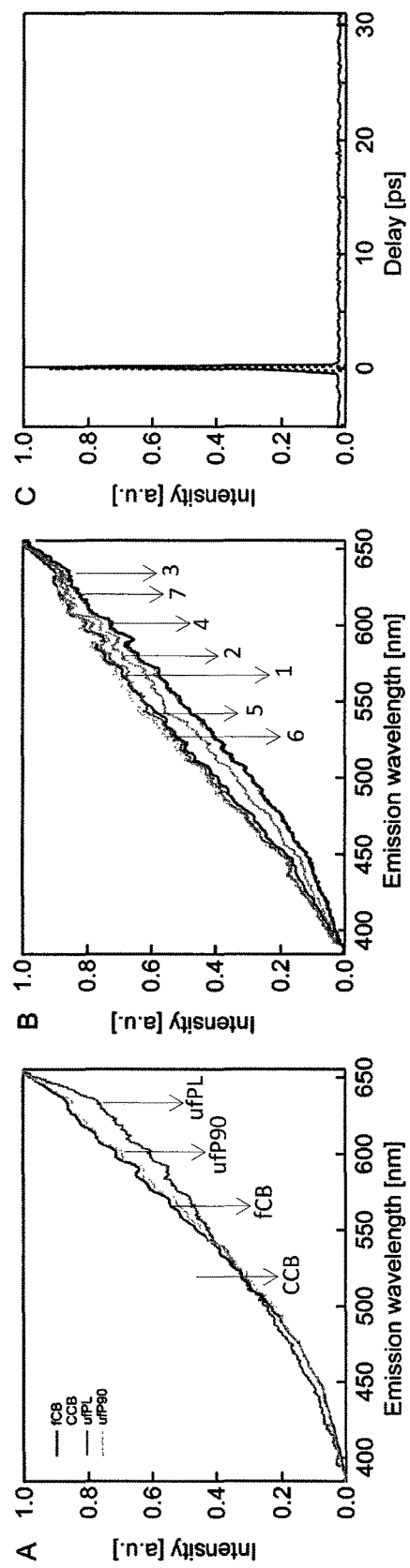
Figure 4:
Figure 5:
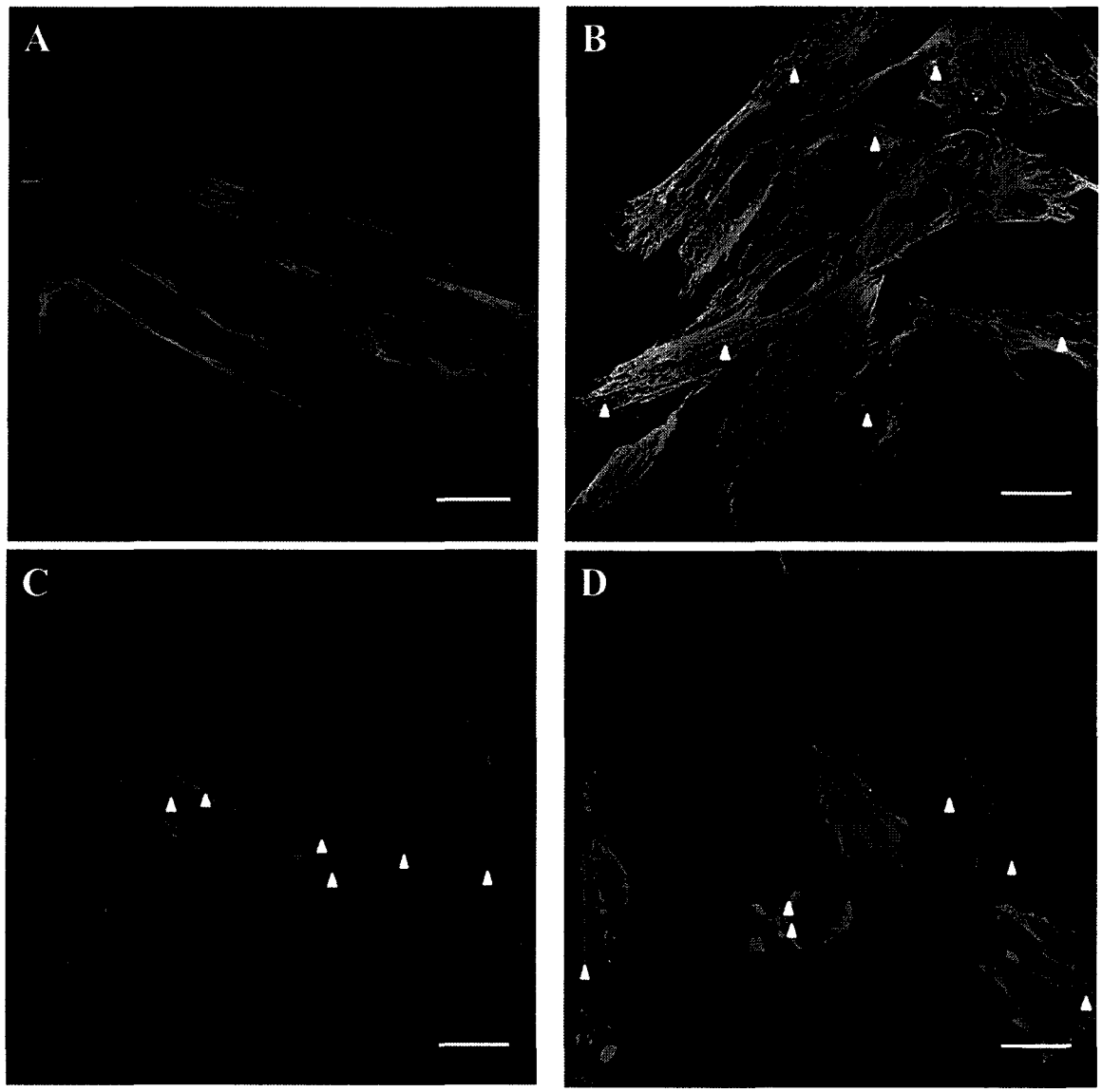
Figure 6:
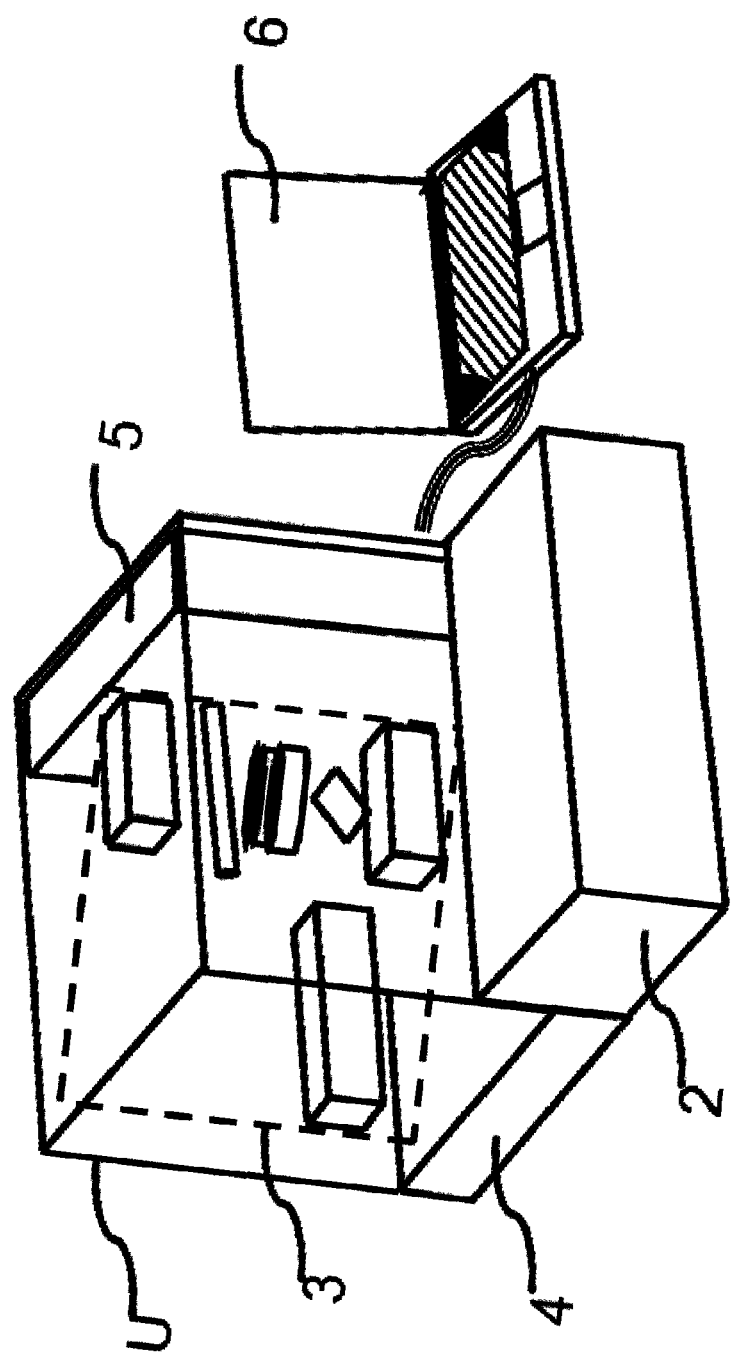
Figure 7A:
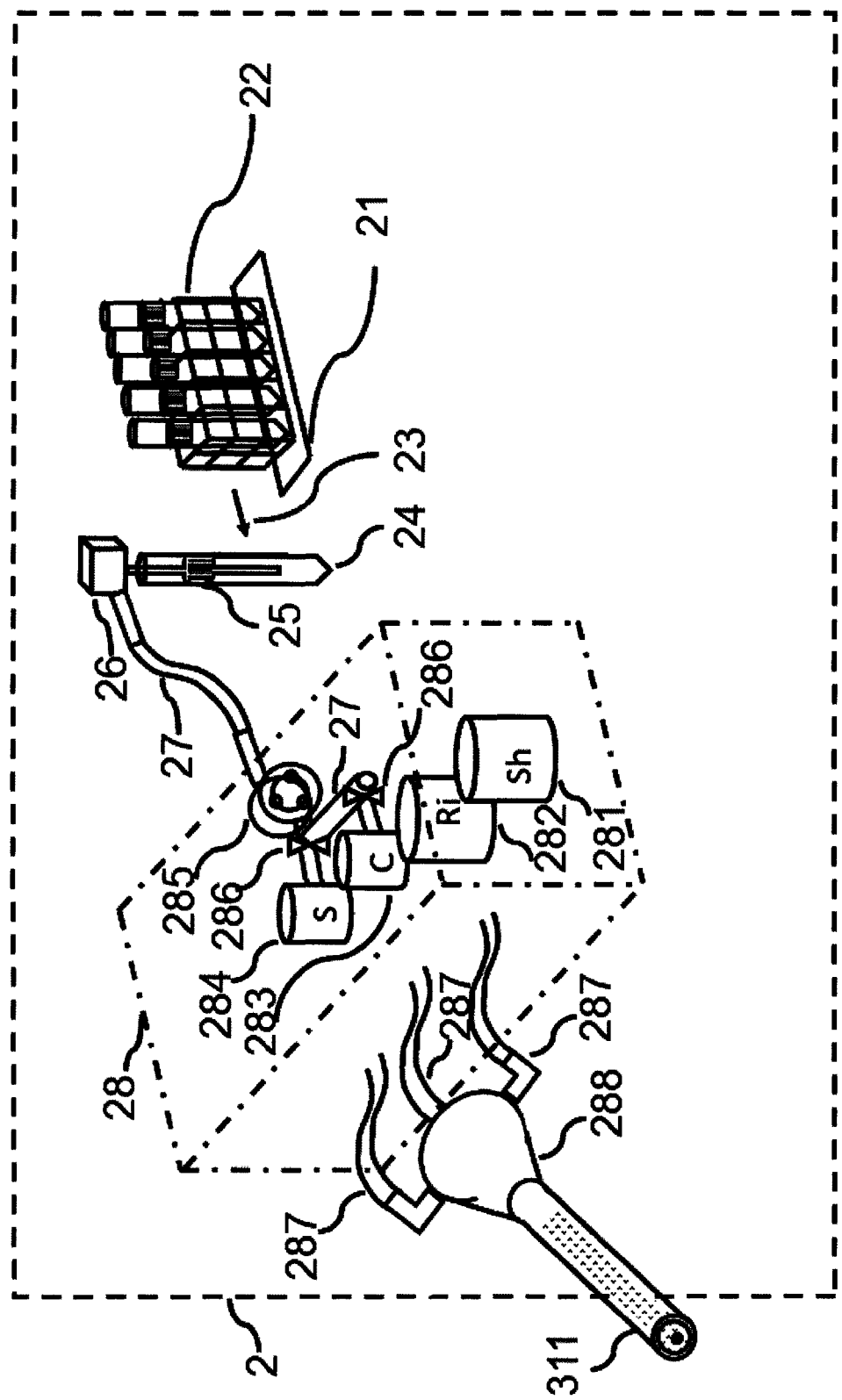
FIGS. 7A, 7B and 7C are drawings showing an outline of a functional composition of a specimen distribution section of the apparatus for detecting and analysing particles in fluids.
Figure 7B:
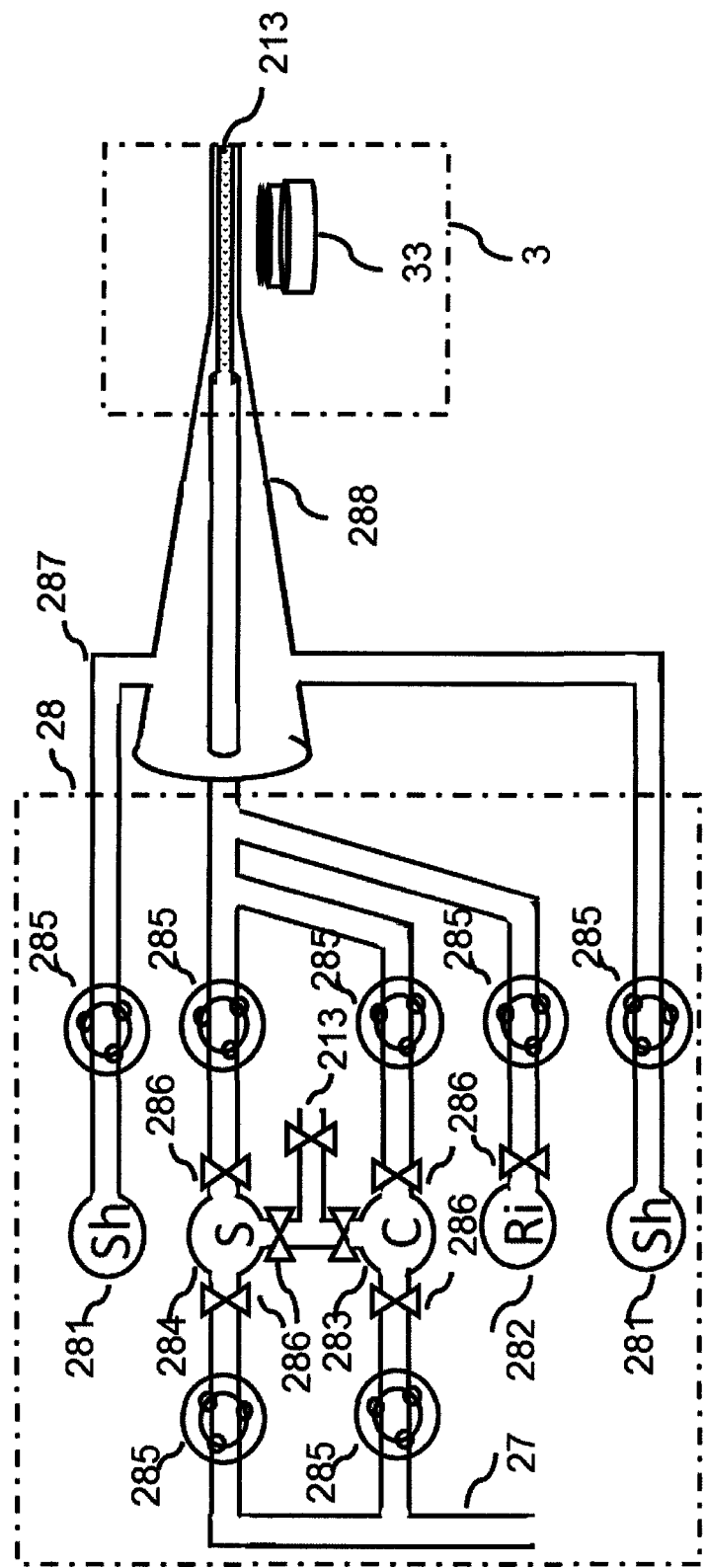
Figure 7C:
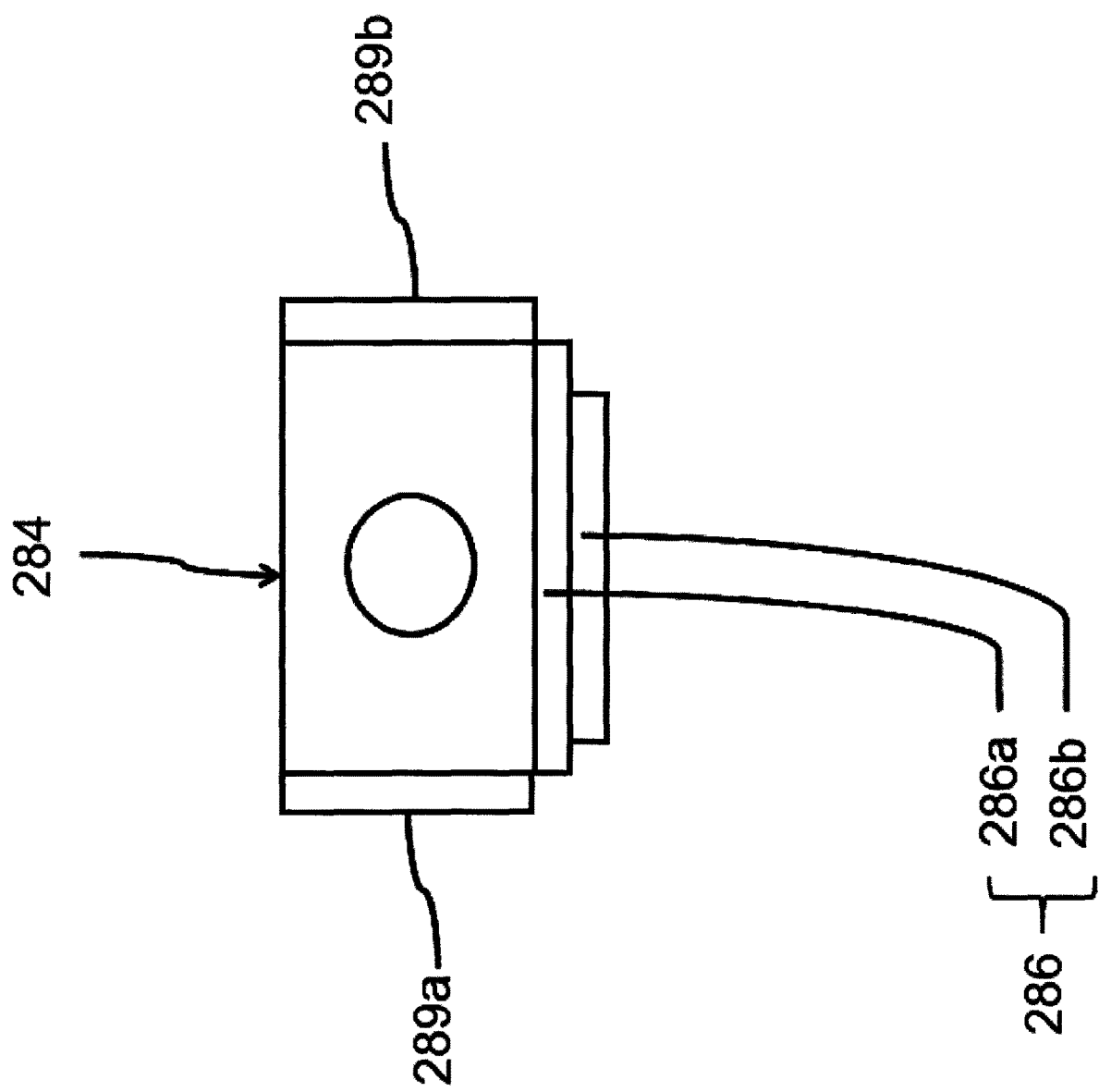
Figure 8:
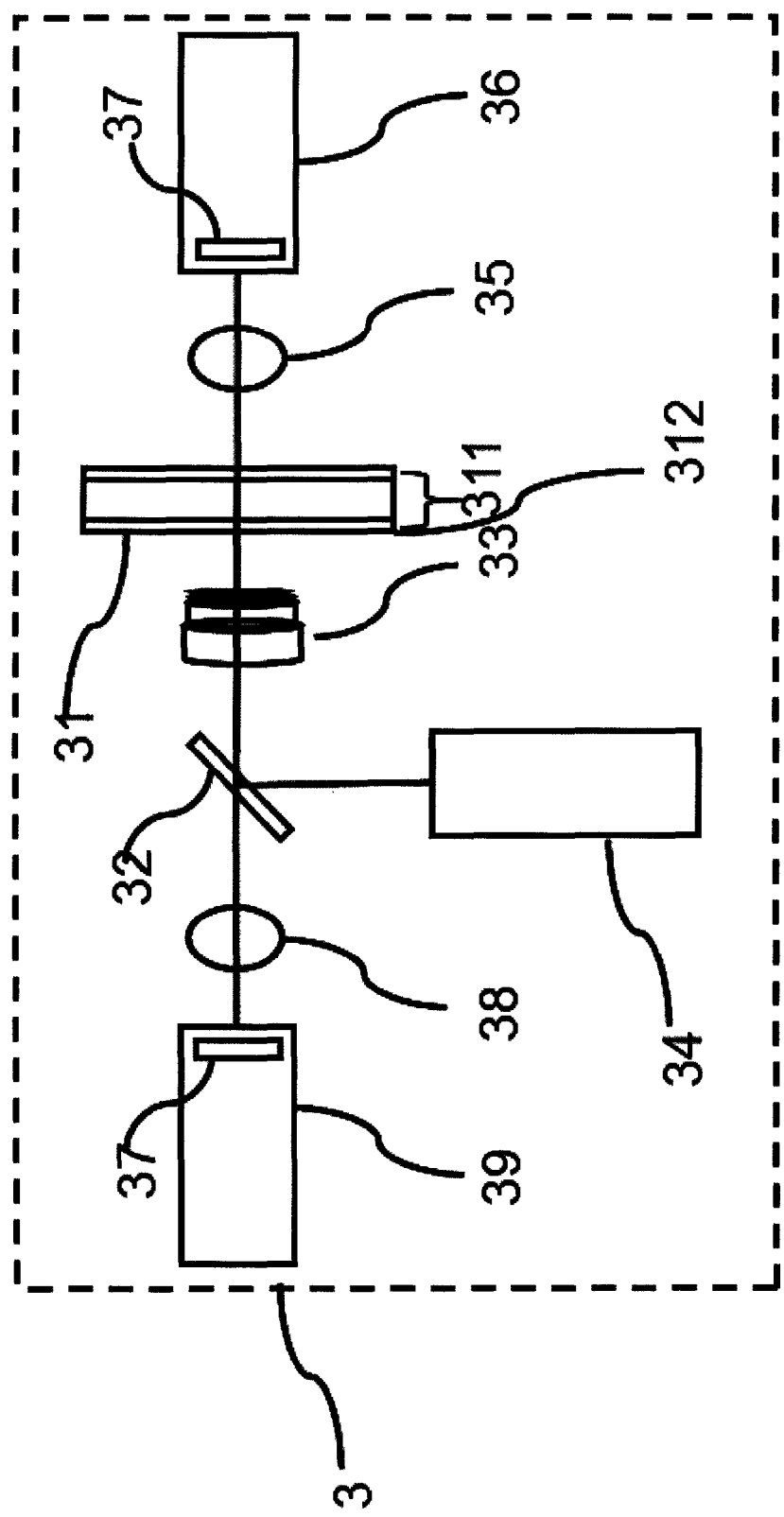
FIG. 8 is a drawing showing a composition of the optical detection section for detecting and analysing carbonaceous particles in air, fluids, cells or tissues of biological and carrier media of non-biological origin.
Figure 9:
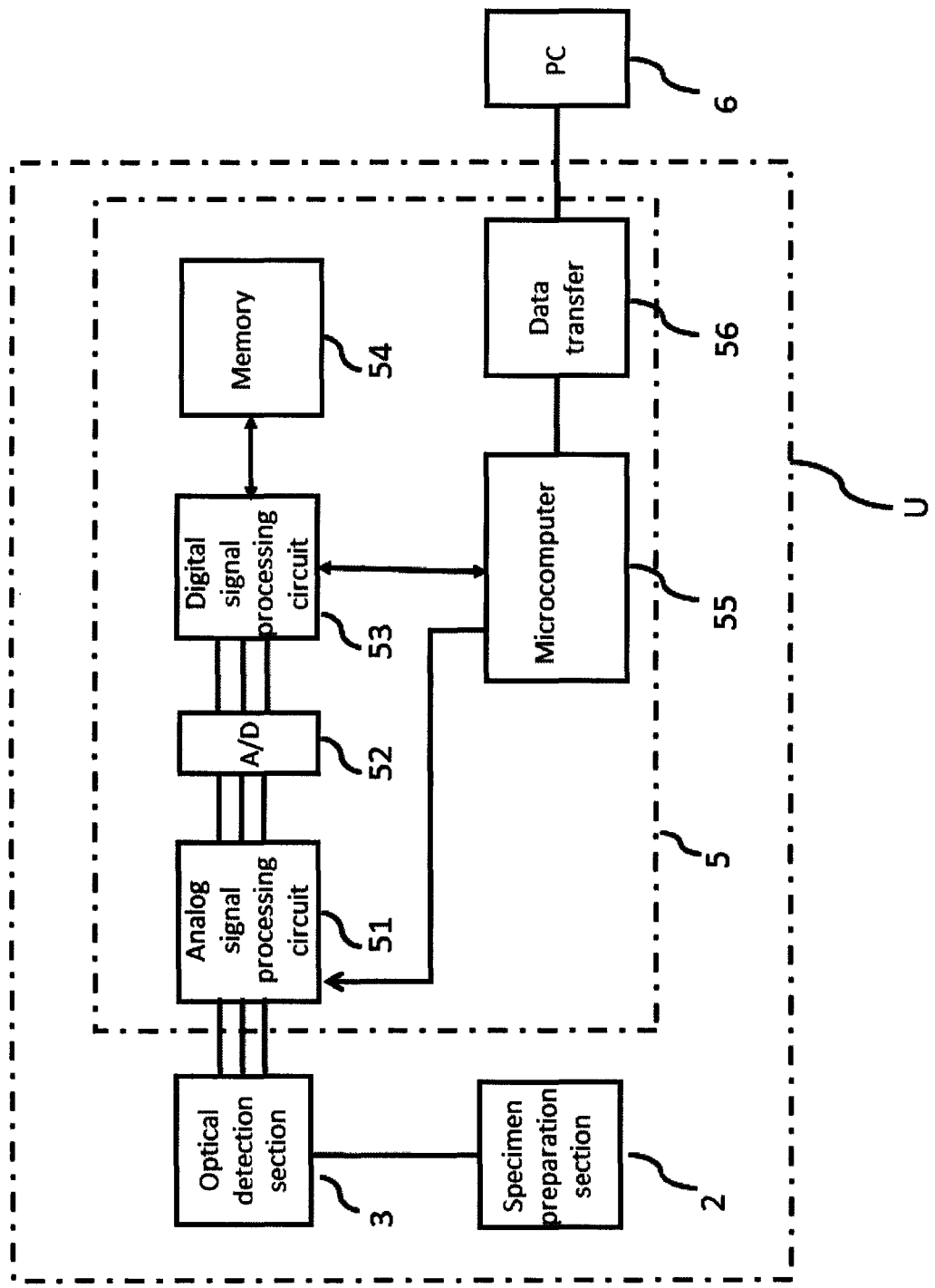
FIG. 9 is a block diagram showing a whole composition of the apparatus for analyzing particles in fluids, cells or tissues of biological and carrier media of non-biological origin shown in FIG. 6.
Figure 10:
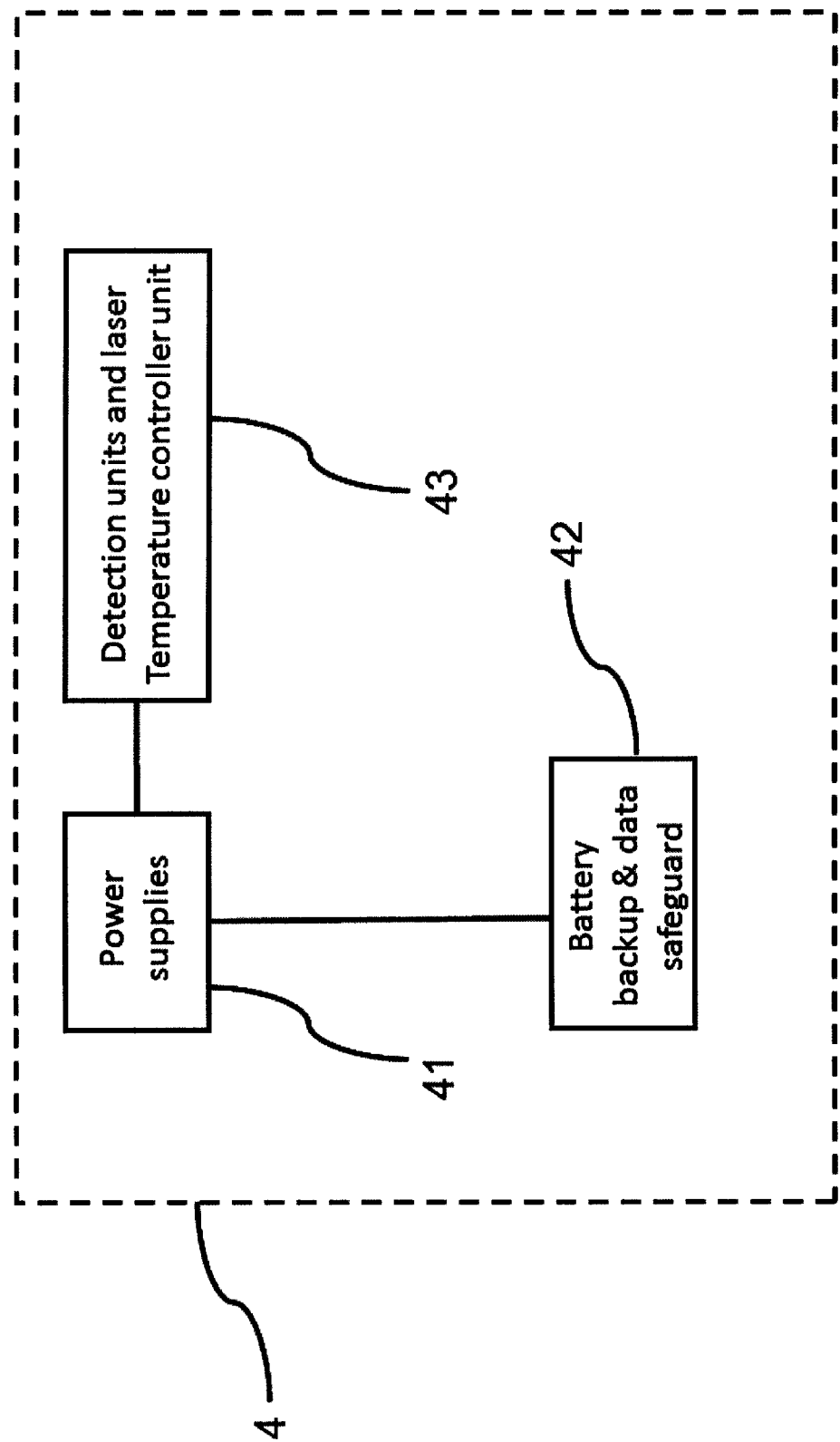
FIG. 10 is a drawing showing a composition of the battery and temperature controller section of the apparatus for detecting and analyzing carbonaceous particles.
Figure 11:
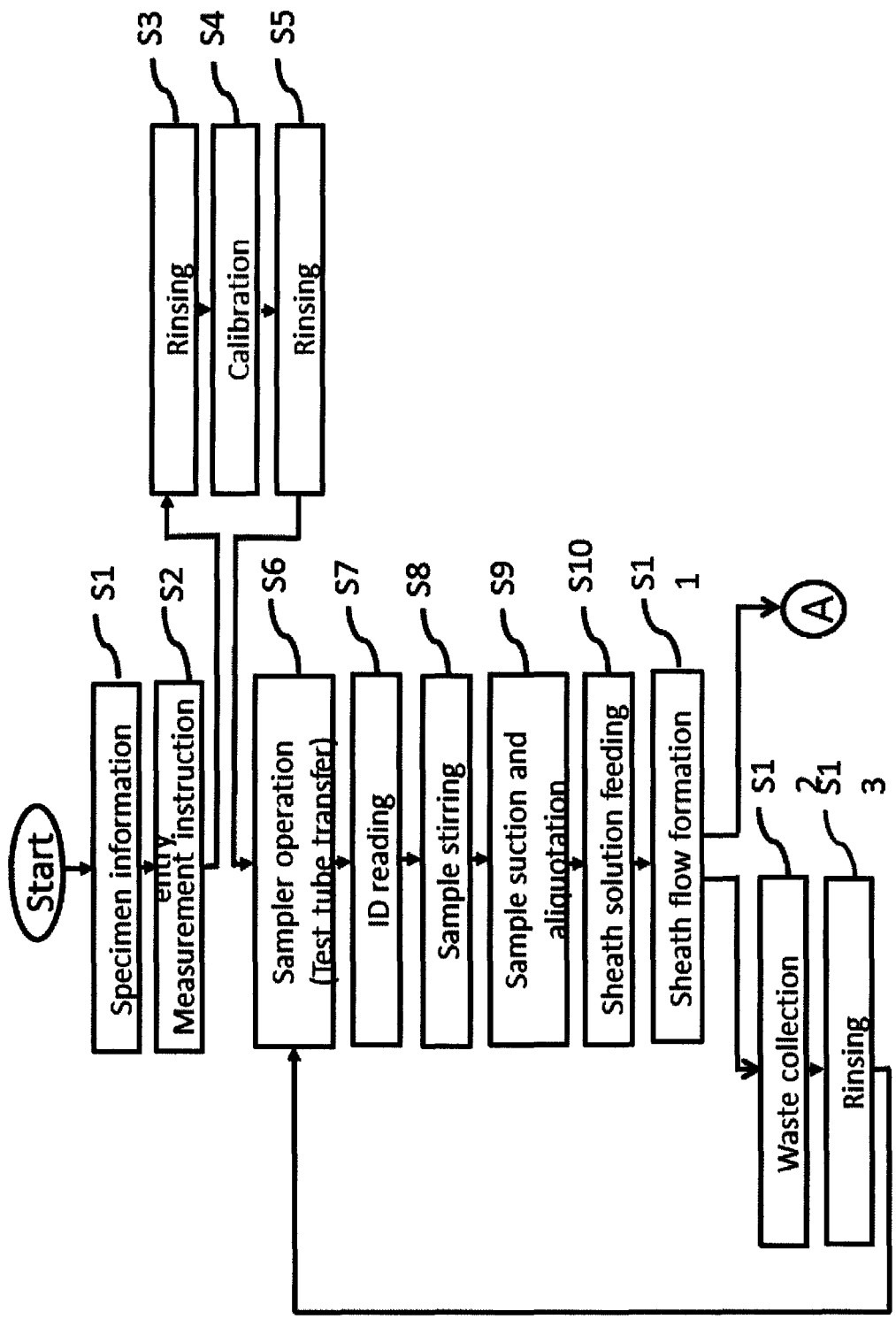
FIG. 11 is a flowchart (first half) showing urine analysis procedures using the apparatus for analysing particles in urine relating to one embodiment according to the present invention.
Figure 12:
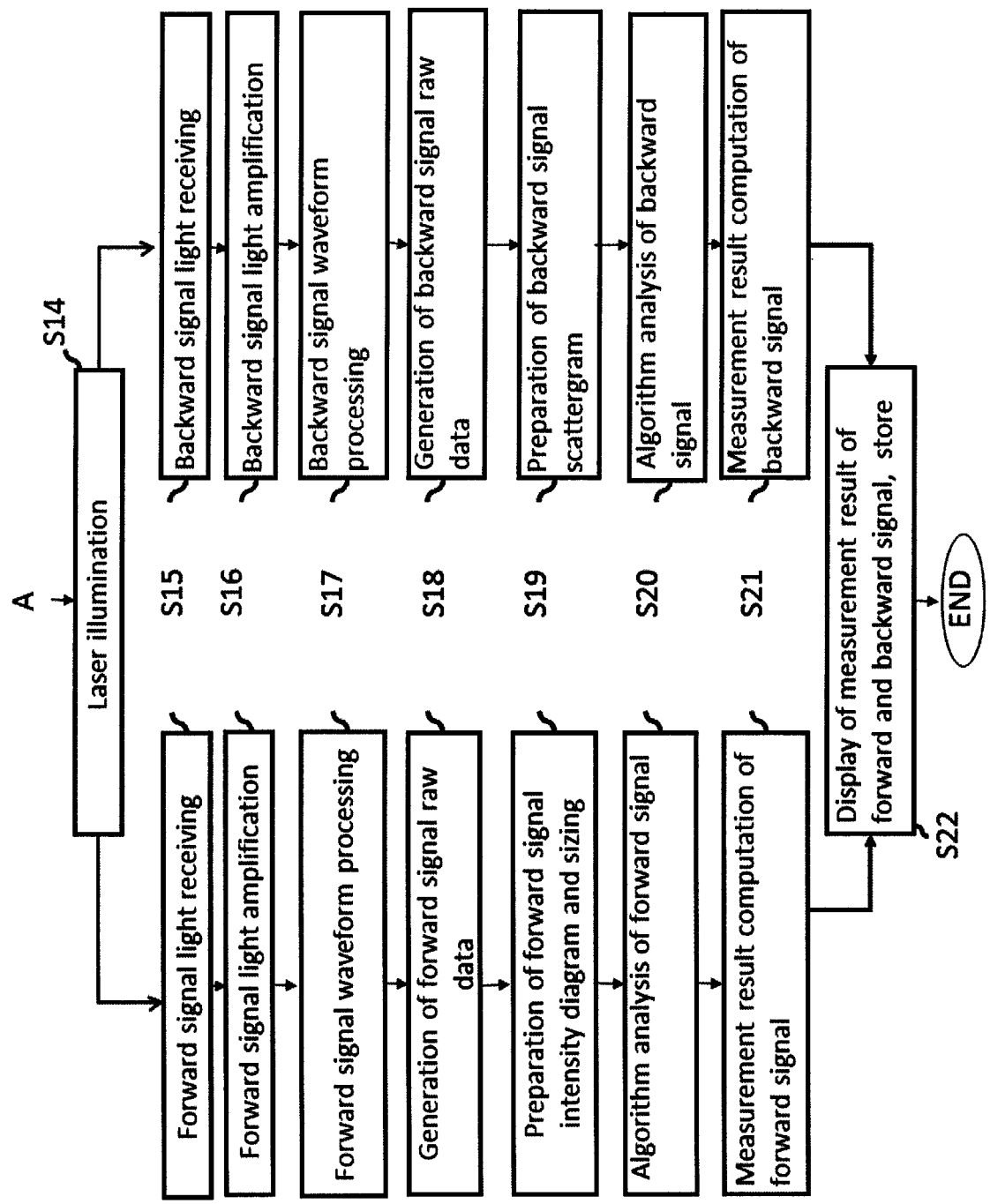
FIG. 12 is a flowchart (second half) showing urine analysis procedures using the apparatus for analysing particles in urine relating to one embodiment according to the present invention.
Figure 13:
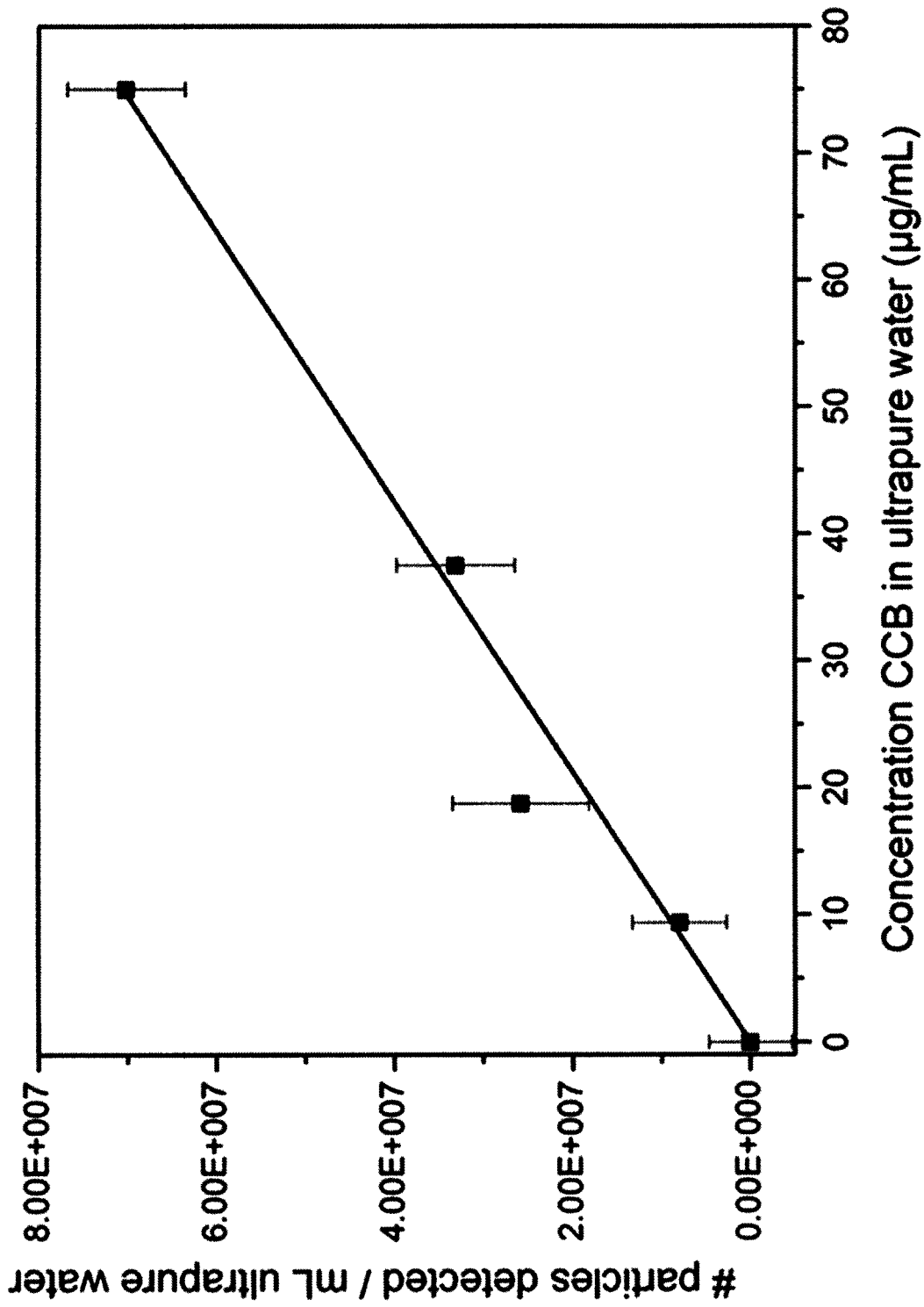
FIG. 13 is an exemplary result of ultrapure water linearly spiked with carbonaceous particles and measured using the presented invented method of measuring carbonaceous particles. There is a linear relation between the added concentration of carbonaceous particles in ultrapure water and the amount of particles detected per mL ultrapure water. The data (N=3) are plotted linearly ($R^2$=0.99).
Figure 14:
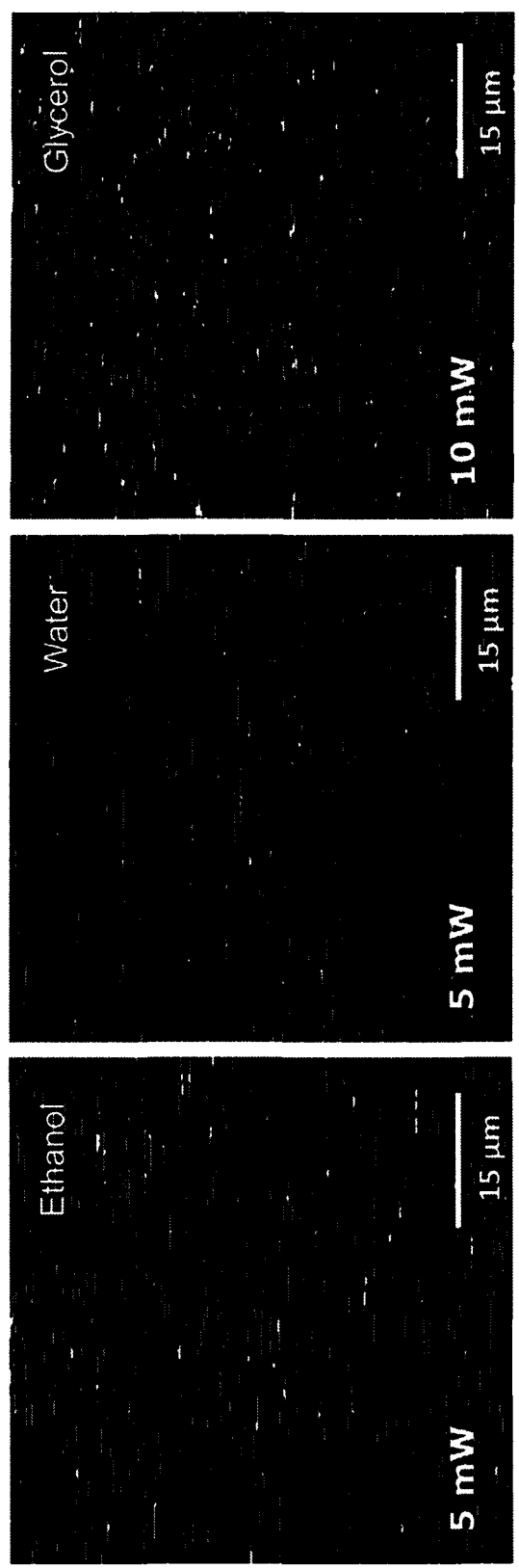
FIG. 14 is an example of carbonaceous particle (600 μg/mL) imaging in ultrapure water, ethanol and glycerol (room temperature) upon illumination with 5 mW average laser power at the sample (excitation 810 nm, 80 MHz). Scale bars: 15 μm. Emission band: 450-650 nm.
Figure 15:
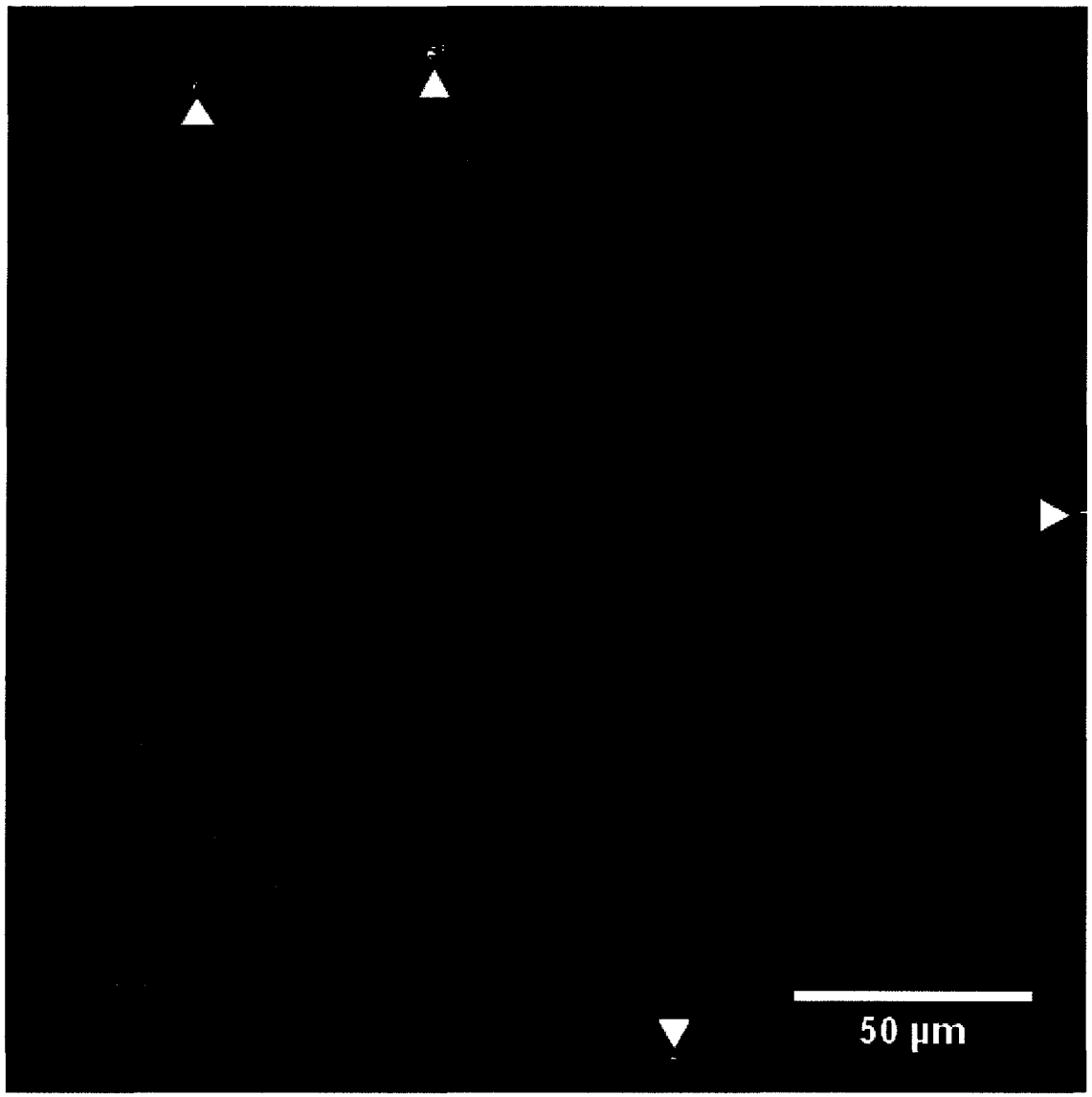
FIG. 15 is an exemplary result obtained by imaging carbonaceous particles in the body fluid urine at room temperature upon illumination with 5 mW average laser power at the sample (excitation 810 nm, 80 MHz). Scale bar: 50 μm. Emission band: 450-650 nm.
Figure 16:
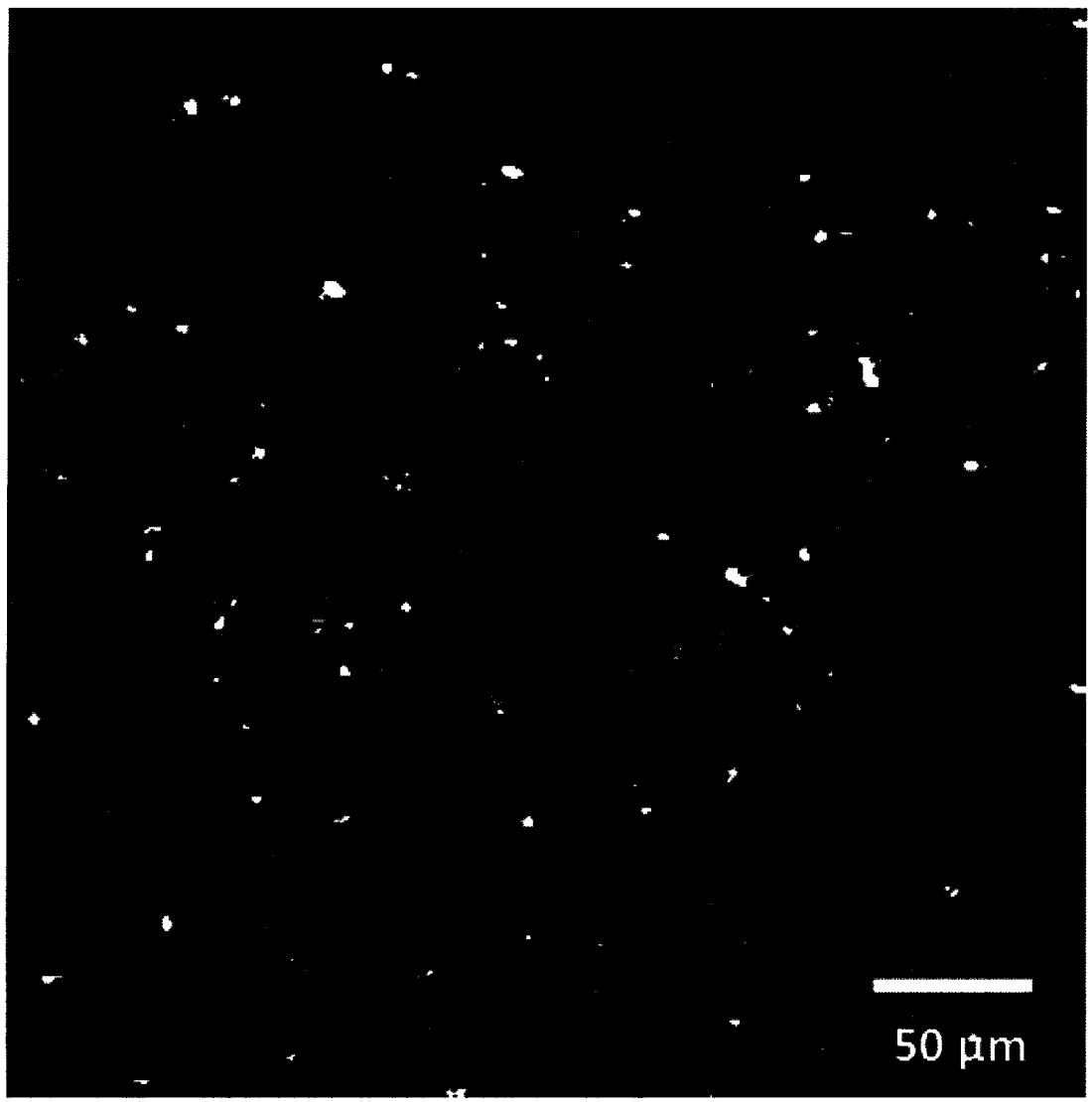
FIG. 16 is an exemplary result obtained by imaging carbonaceous particles in non-biological carrier medium polydimethylsiloxane at room temperature upon illumination with 5 mW average laser power at the sample (excitation 810 nm, 80 MHz). Scale bar: 50 μm. Emission band: 450-650 nm.
Figure 17:
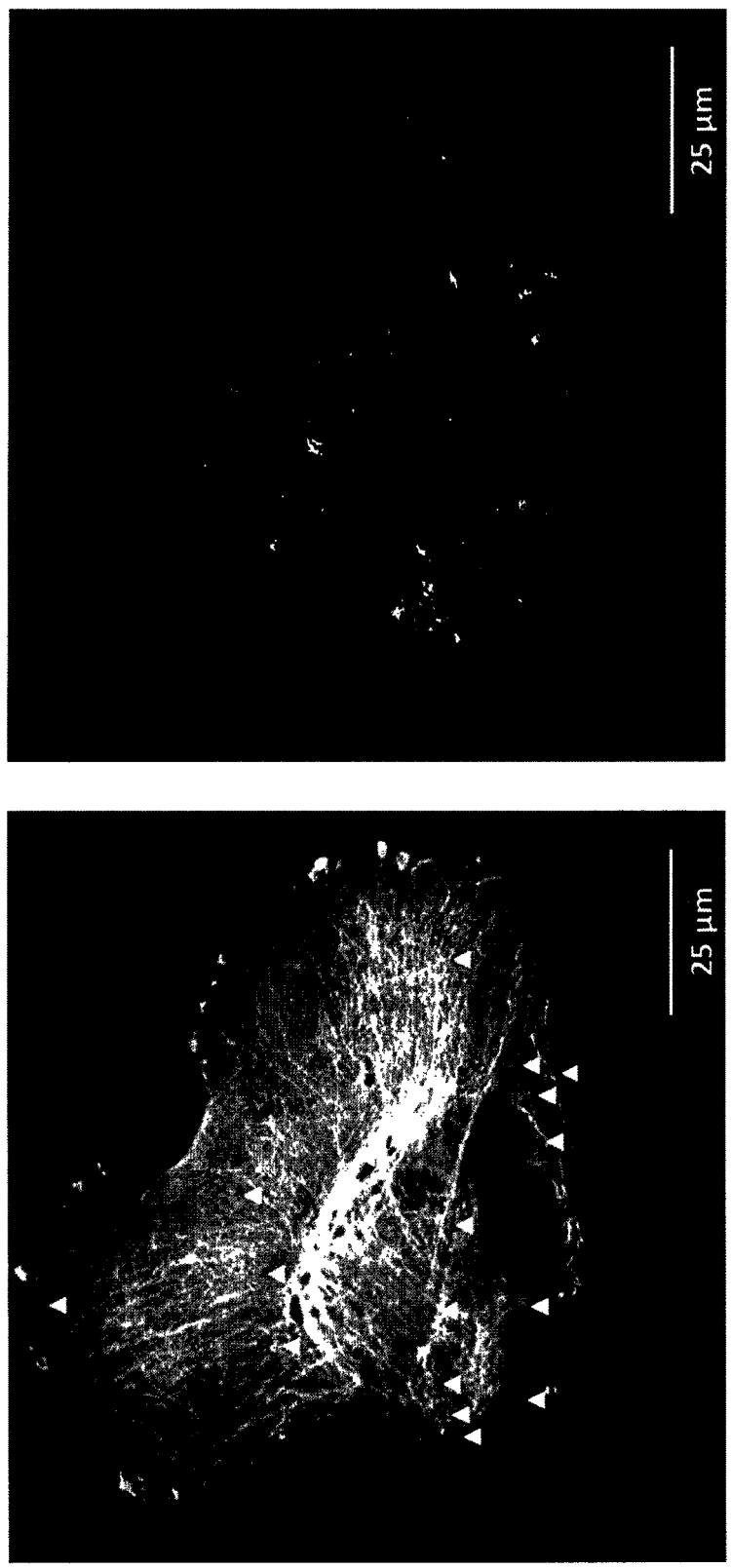
FIG. 17 is an exemplary result obtained by imaging cellular compartments of fixed human lung fibroblast cell (MRC-5 cell line) which had engulfed carbonaceous particles when exposed to 5 μg/cm² particles at 37° C. prior to imaging. Emission of the carbonaceous particles has been probed at 400-410 nm upon illumination with 5 mW average laser power at the sample (excitation 810 nm, 80 MHz). Scale bar: 20 μm.
Figure 18:
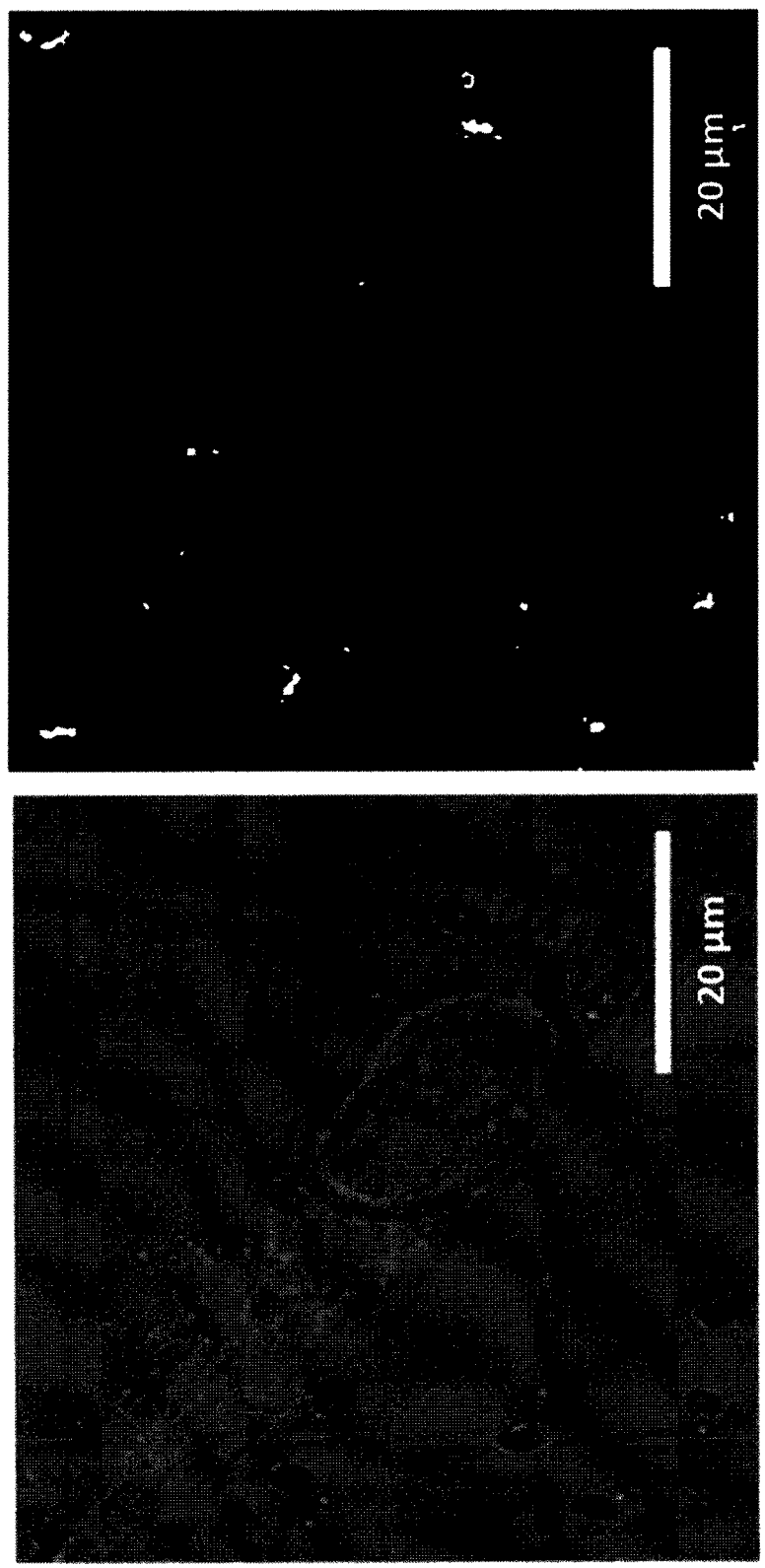
FIG. 18 is an exemplary result obtained by imaging living human lung fibroblast cell (MRC-5 cell line) exposed to 5 μg/cm² particles at 37° C. Emission of the carbonaceous particles has been probed at 400-410 nm upon illumination with 5 mW average laser power at the sample (excitation 810 nm, 80 MHz). Scale bar: 20 μm.
Figure 19:
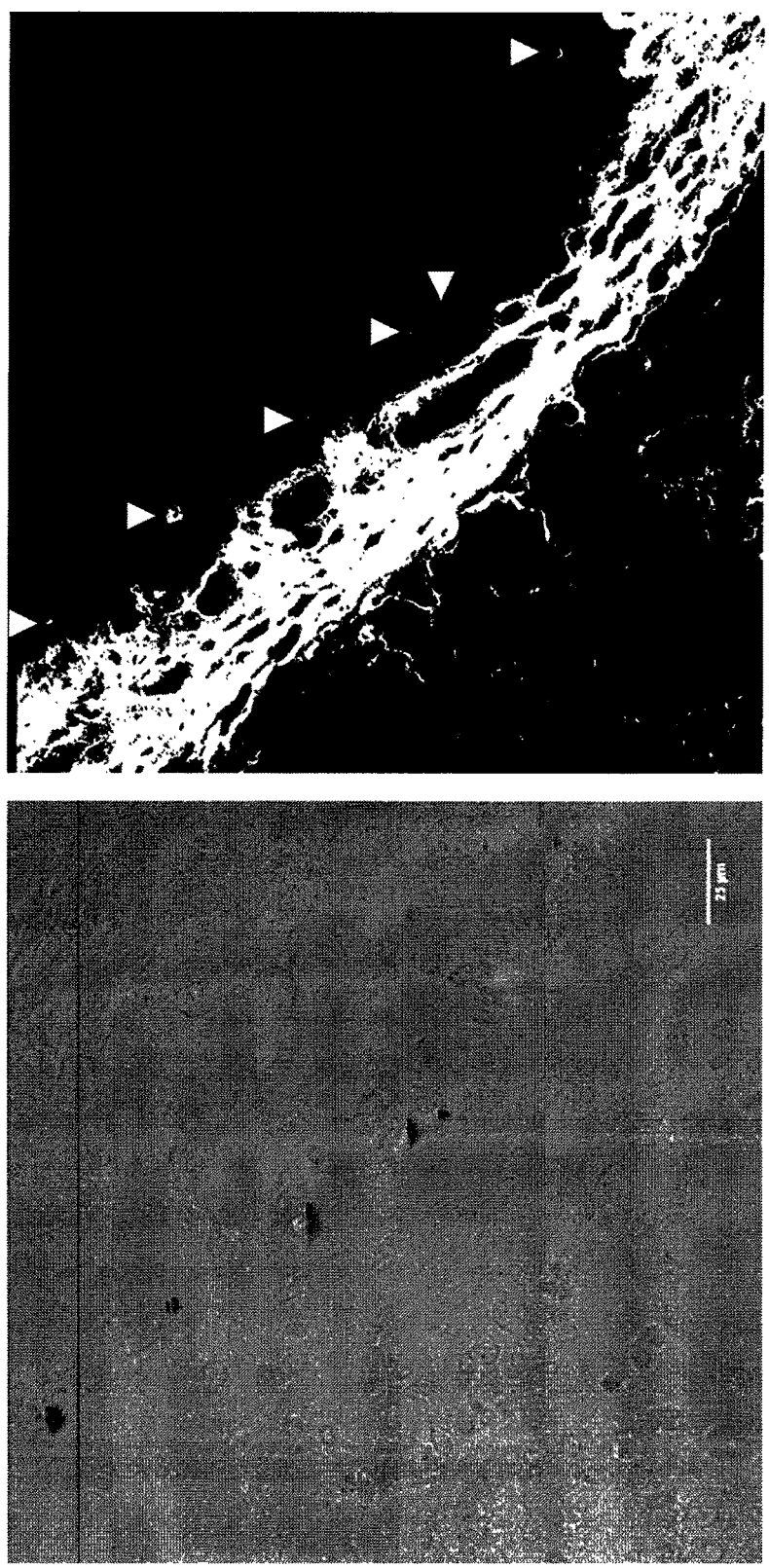
FIG. 19 is an exemplary result obtained by imaging carbonaceous particles in the biological tissue placenta at room temperature upon illumination with 5 mW average laser power at the sample (excitation 810 nm, 80 MHz). Scale bar: 25 μm. Emission band: 450-650 nm.
Figure 20:
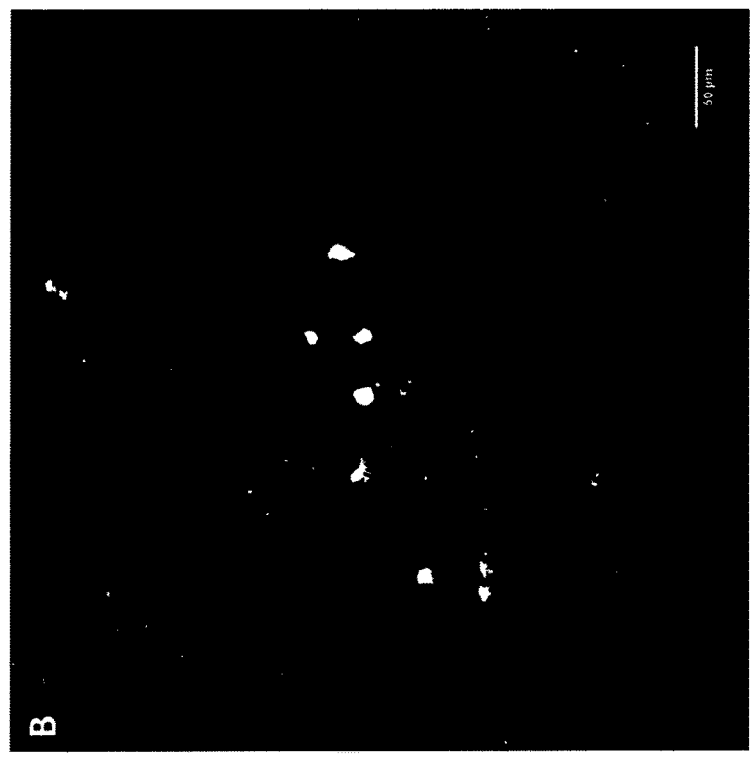
FIG. 20 is an exemplary result obtained by imaging carbonaceous particles in the biological plant tissue ivy leafs at room temperature upon illumination with 5 mW average laser power at the sample (excitation 810 nm, 80 MHz). Scale bar: 50 μm. Emission band: 450-650 nm.
Figure 20:
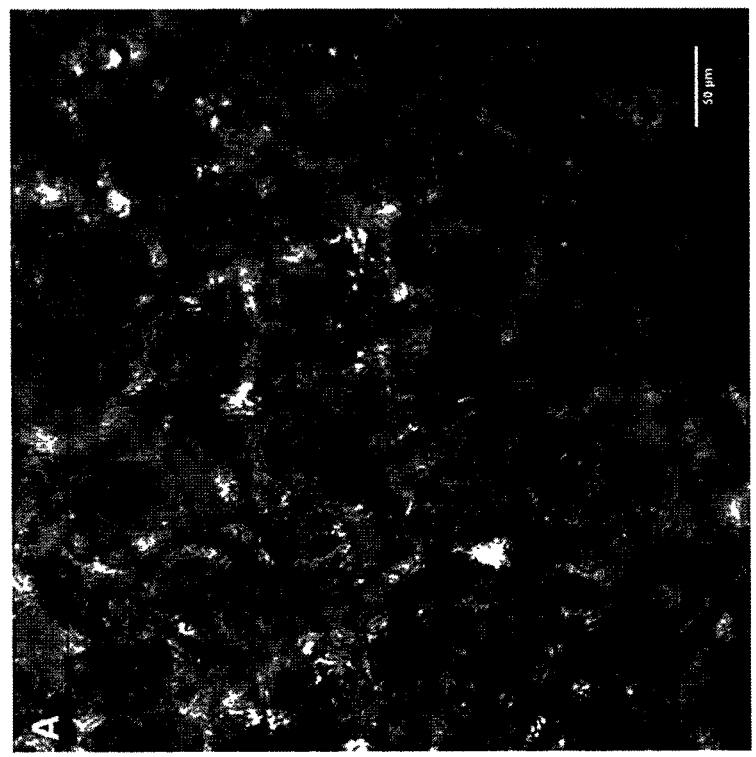
Figure 21:
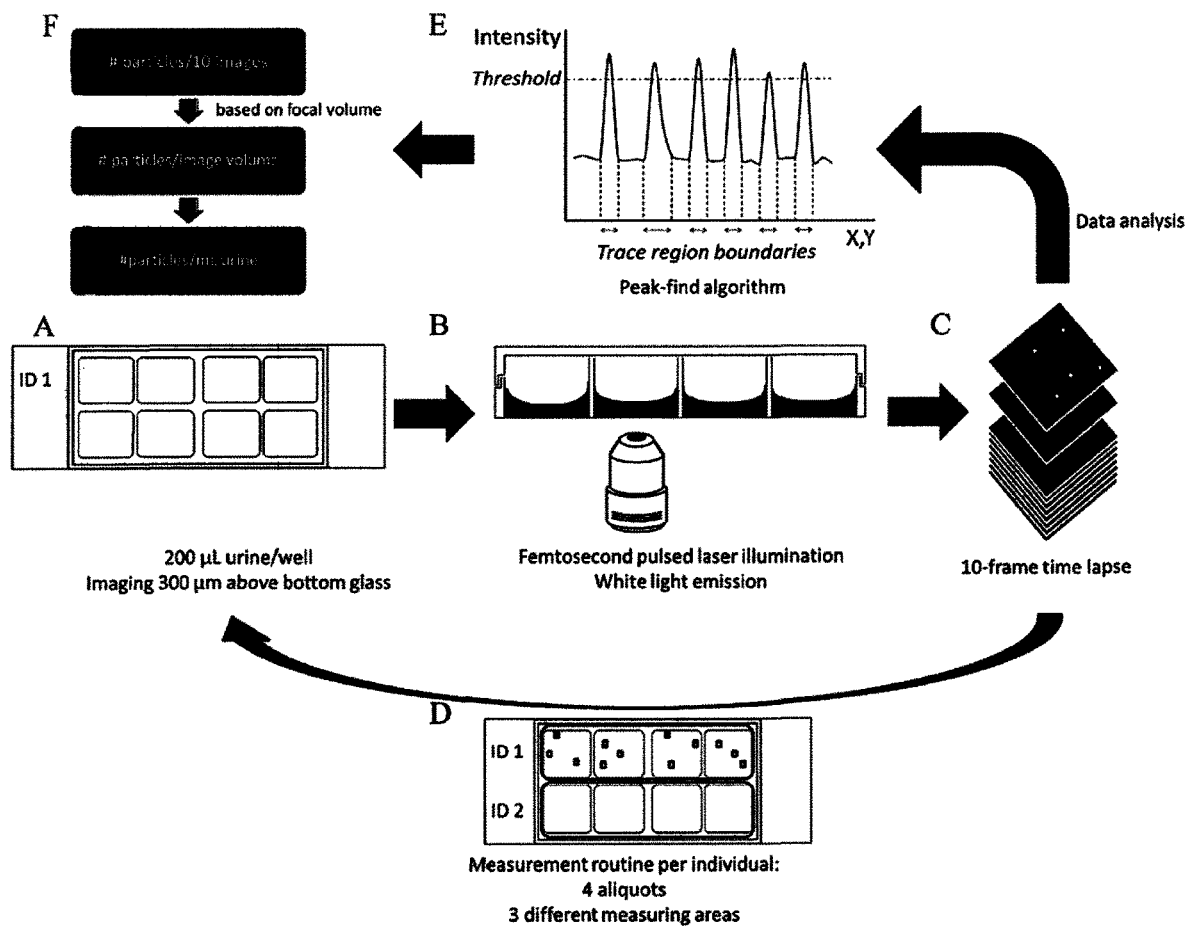
FIG. 21 is a schematic depiction of the flowchart of an optimized experimental protocol for BC detection in urine.
Figure 22:
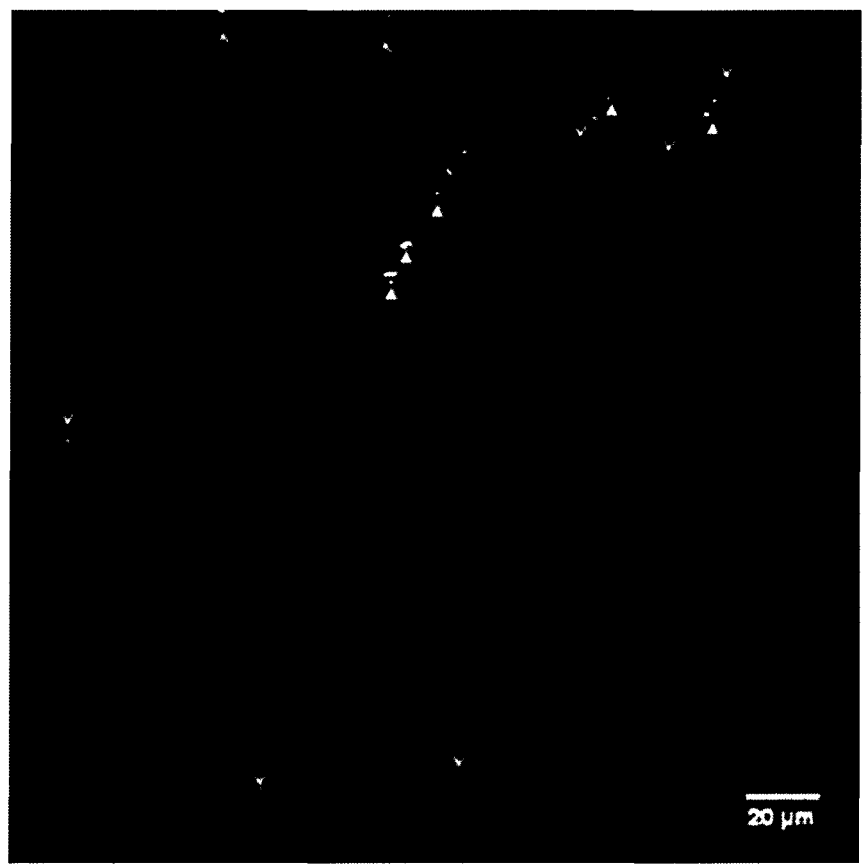
FIG. 22 is an exemplary result obtained by imaging CB and/or BC particles in urine at room temperature upon illumination with 9.7 mW average laser power at the sample (excitation 810 nm) (using the procedure as depicted in FIG. 25). Scale bar: 20 μm. Emission band: 400-410 nm.
Figure 23:
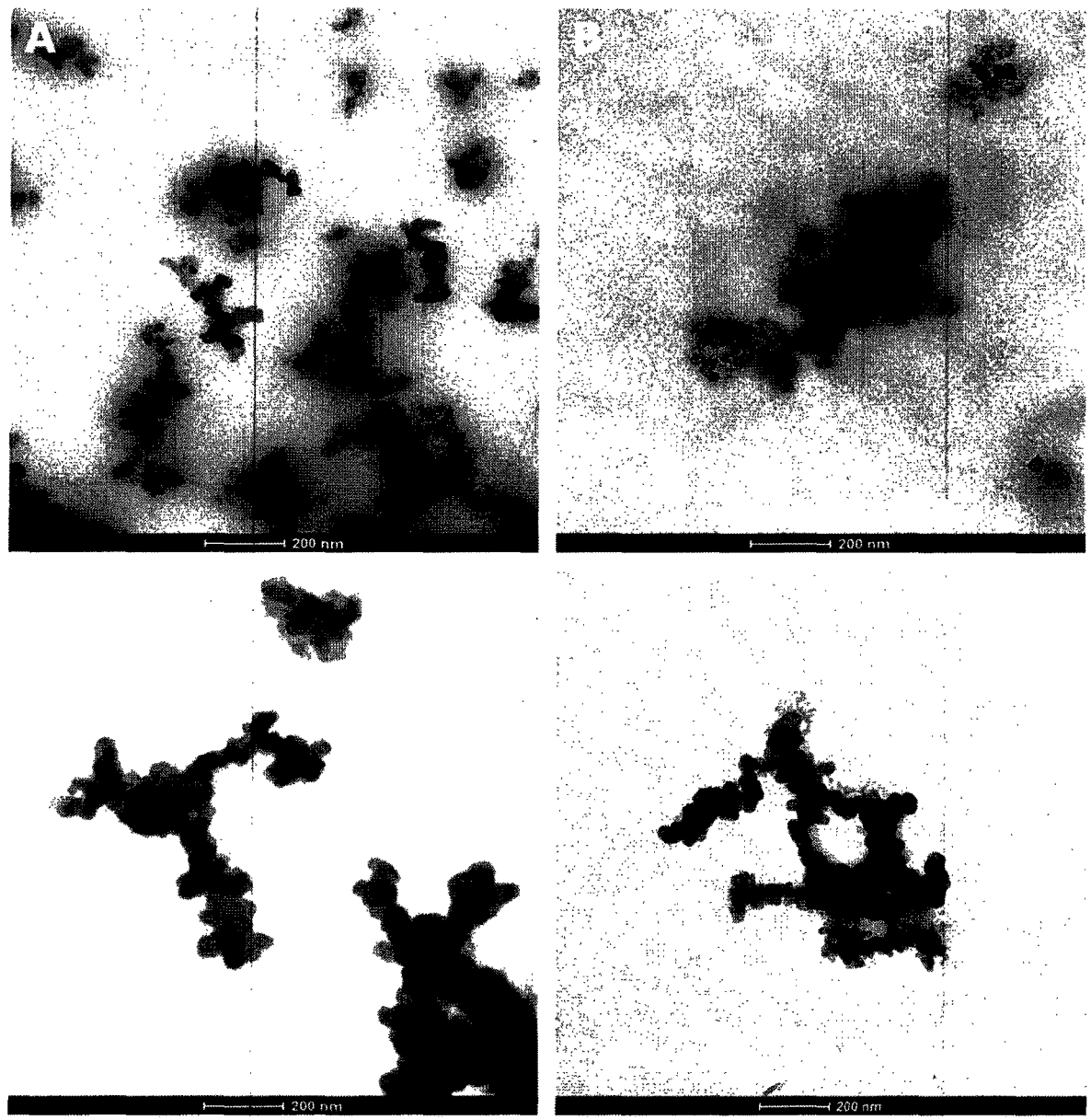
FIG. 23. TEM images of the four different types of carbon black particles. Upper Left (ufPL), Upper Right (ufP90), Lower Left (CCB), and Lower Right (fCB). Scale bar: 200 nm.
Figure 24:
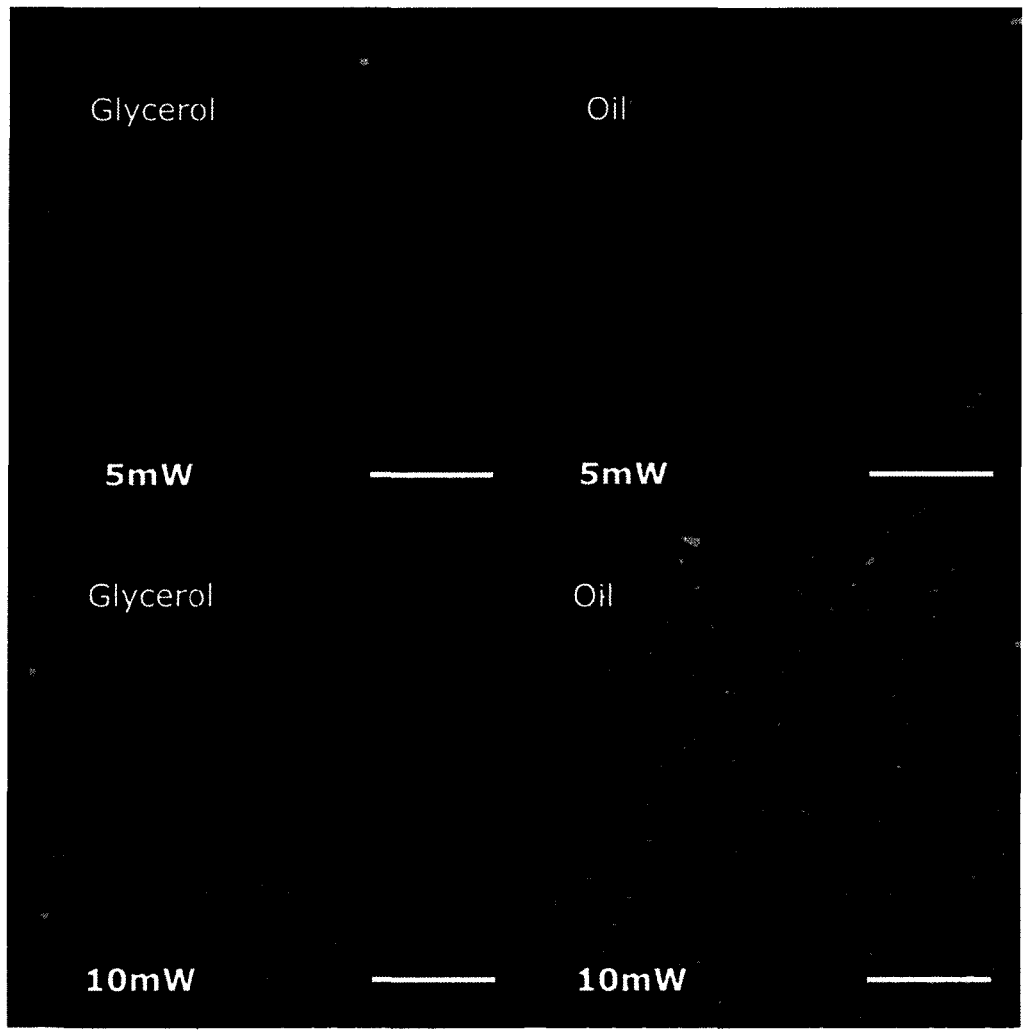
FIG. 24. CCB imaging in glycerol and immersion oil using two different illumination powers of 5 and 10 mW at the sample (810 nm, 150 fs, 80 MHz, MaiTai laser, Spectra Physics, USA). Scale bars: 50 μm. Emission band: 450-650 nm.
Figure 25:
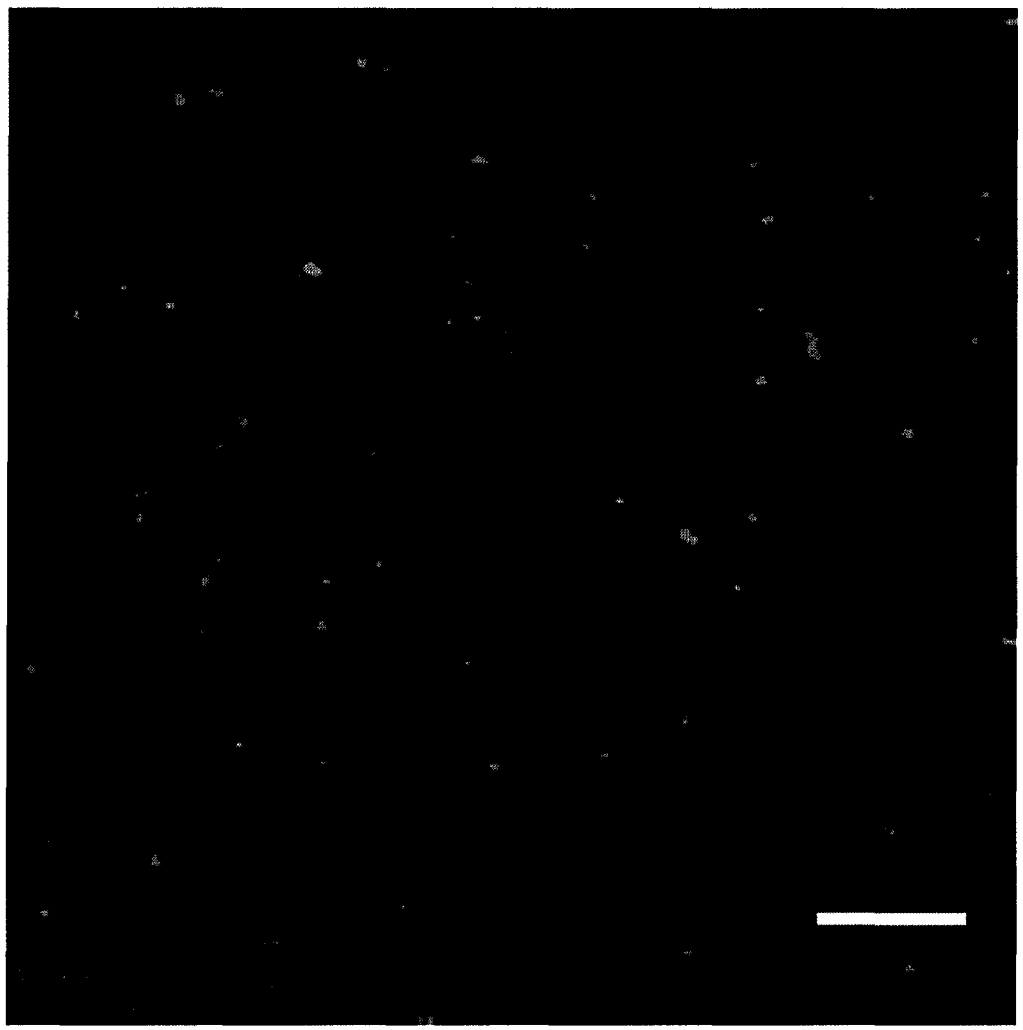
FIG. 25. CCB imaging in PDMS at room temperature upon illumination with 5 mW average laser power at the sample (excitation 810 nm, 80 MHz). Scale bars: 50 μm. Emission band: 450-650 nm.
Figure 26:
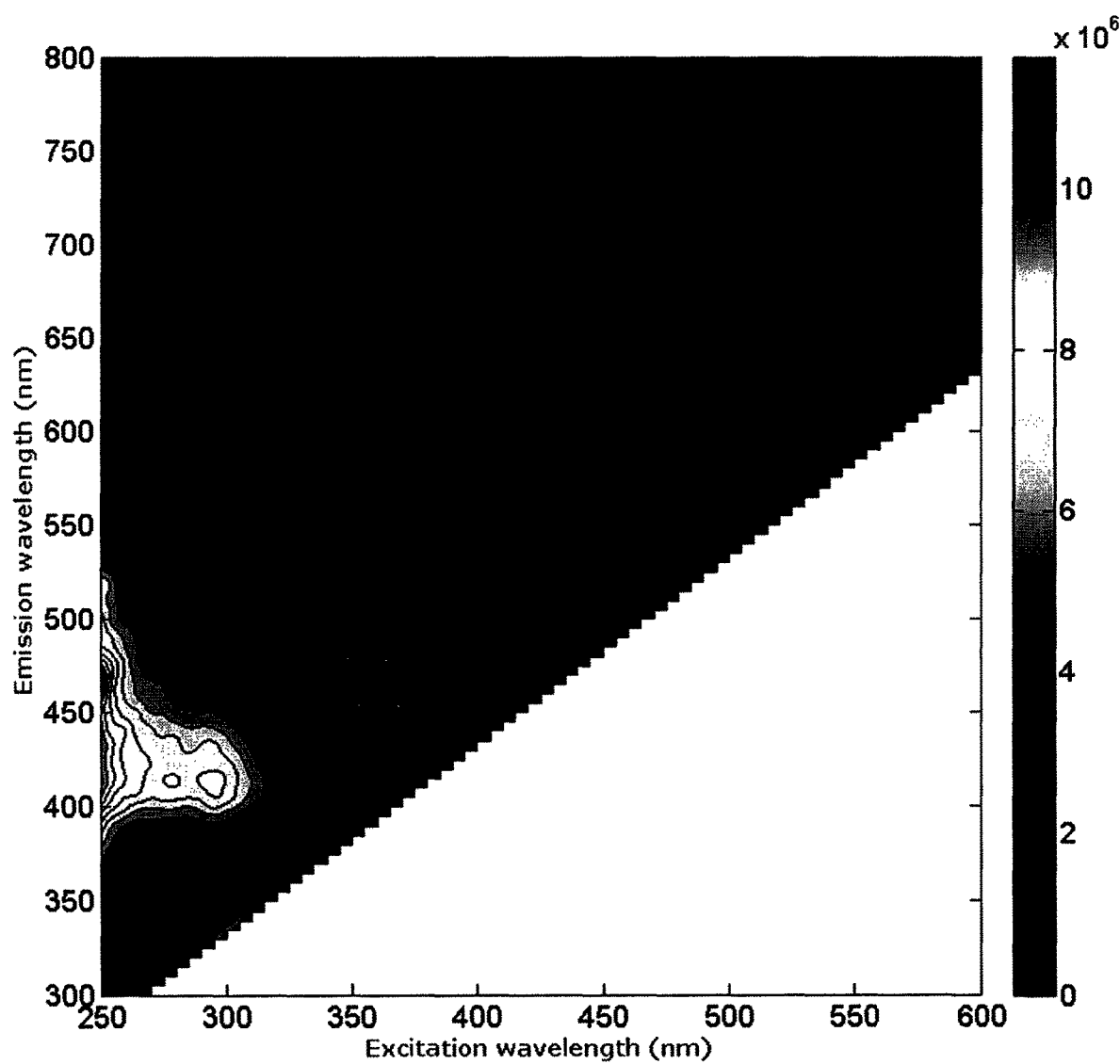
FIG. 26. Two-dimensional excitation-emission plot (similar to FIG. 2B) of fCB particles in water under single photon excitation. Each vertical slice corresponds to an emission spectrum at the excitation wavelength.
Figure 27:
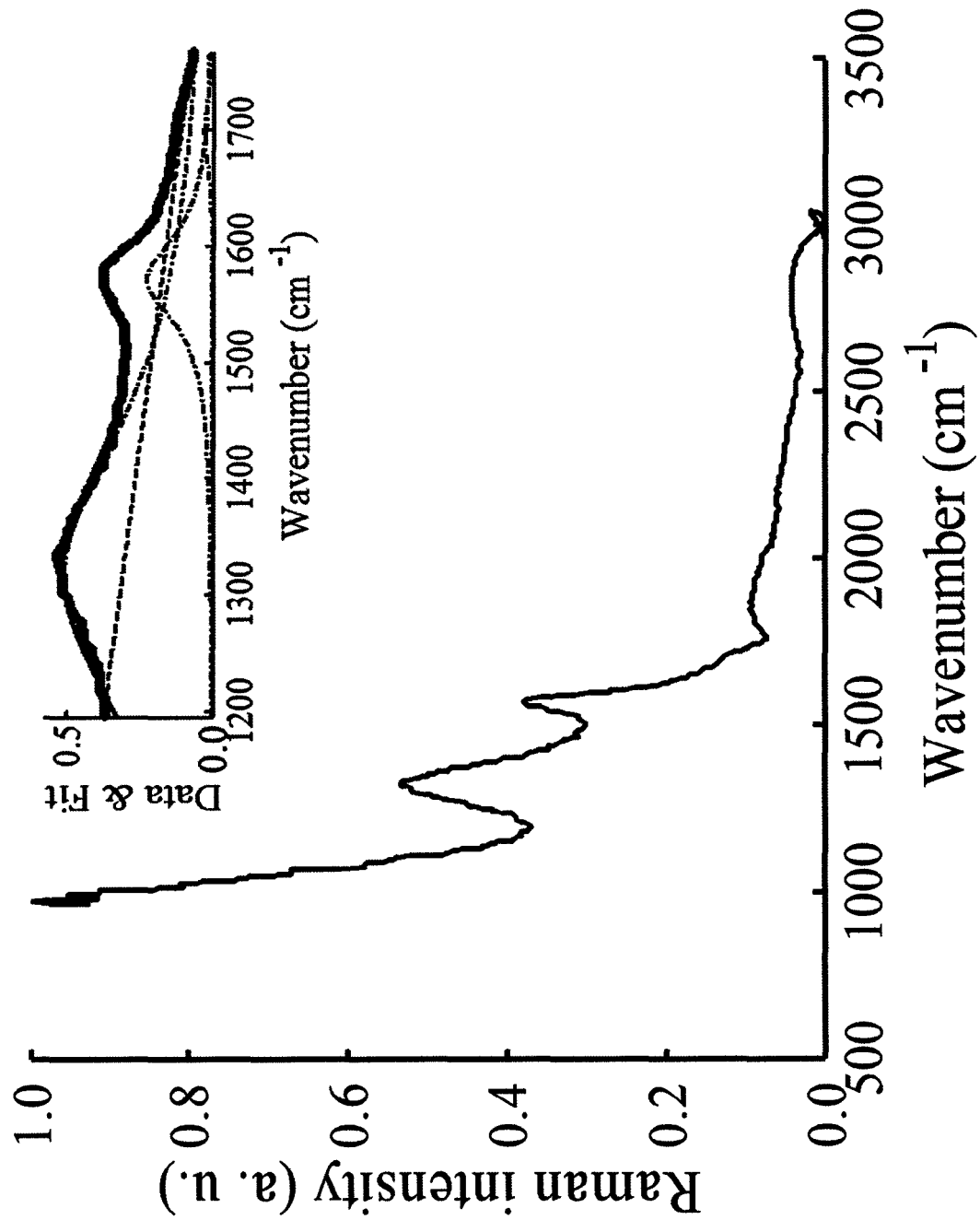
FIG. 27. Raman data of ufPL superposed on a reasonable luminescence background. Insert shows data typical for amorphous carbon (blue), triple Lorentzian line fit (red), baseline correction (blue, dashed line), spectral components (black, dash dot) fit results for D- and G-bands. For clarity two components are displayed shifted vertically.
Figure 28:
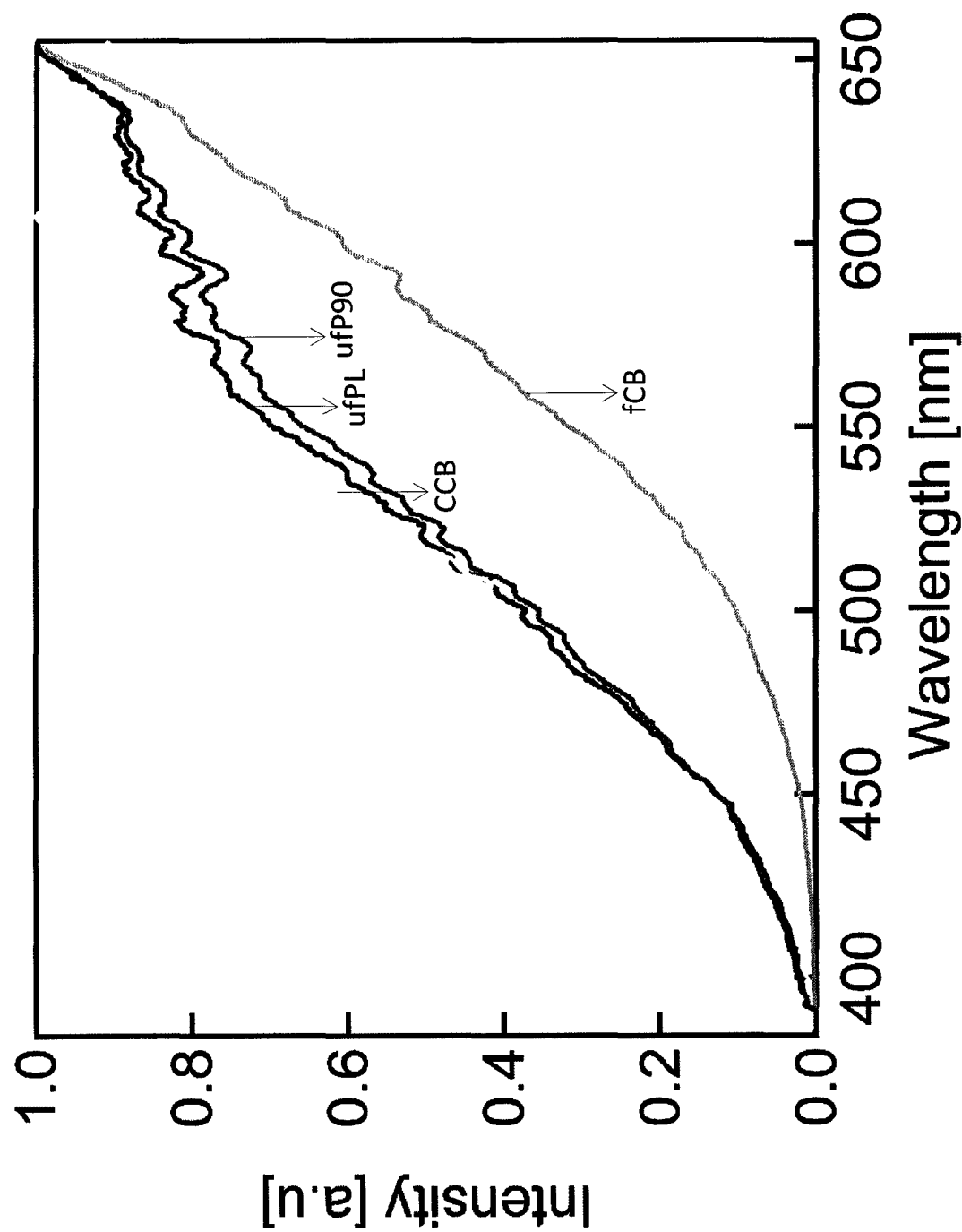
FIG. 28. Normalized white light spectra of various dry carbonaceous particles deposited on a cover glass. Droplets of CB suspensions were dried on cover glasses and illuminated using a femtosecond laser (810 nm, 150 fs, 80 MHz repetition rate, MaiTai, Spectra Physics, USA).
Figure 29:
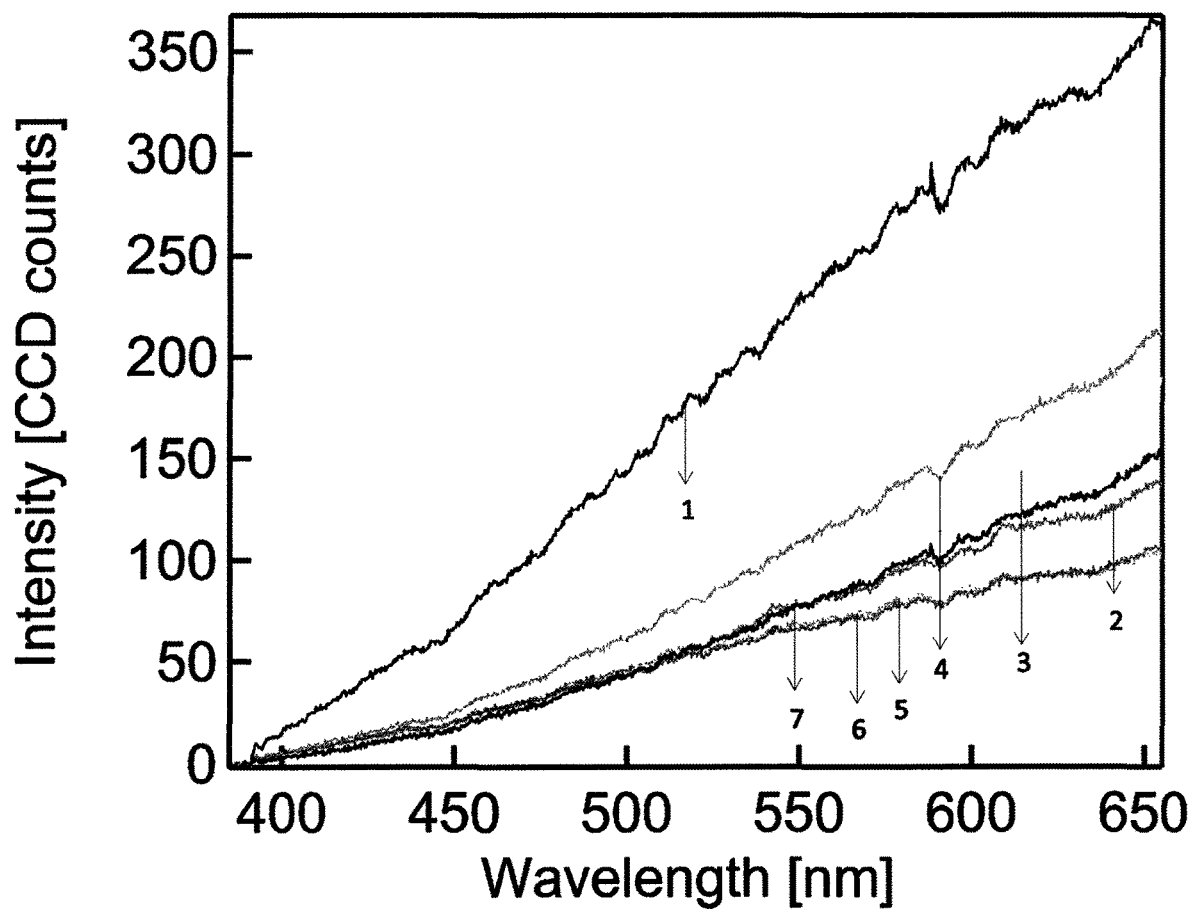
FIG. 29. Raw data of FIG. 3B. WL emission spectra of aqueous ufP90 suspensions recorded at different femtosecond illumination wavelengths (from 780 (1) to 900 nm (7), with an interval of 20 nm).
Figure 30:
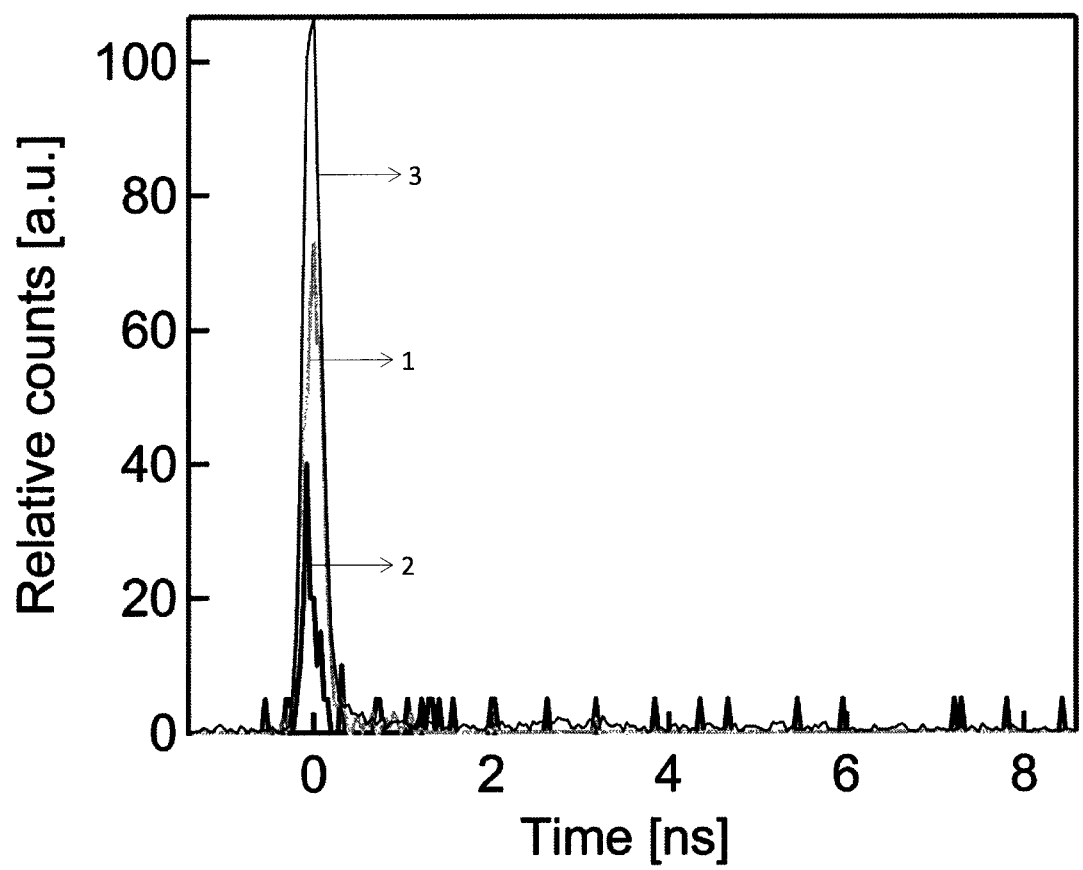
FIG. 30. Temporal response of CCB particles dried on glass (1) and in aqueous suspension (2) measured by time correlated single photon counting timing. The instrument response function (IRF) is overlaid (3). The relative strength of the signal cannot be deduced from the relative peak values of the curves as different particle concentrations were used when performing the experiment in dry and aqueous state.
Figure 31:
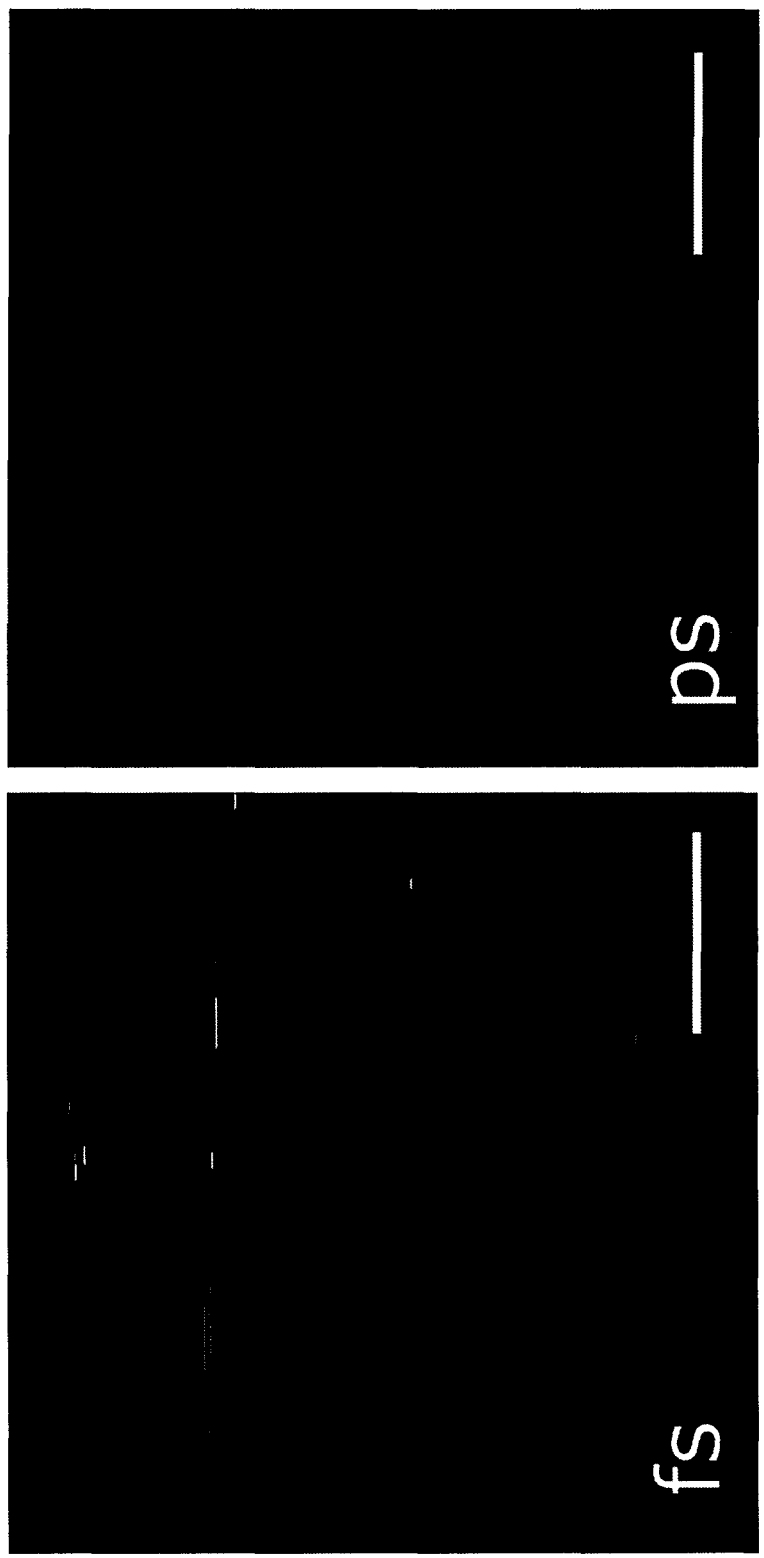
FIG. 31. Comparison of femtosecond and picosecond illumination of CB particles at 810 nm. 10 mW average laser power at the sample was applied to fCB similar to the experimental conditions above. The same area was consecutively imaged with a seven picosecond laser system (Levante OPO, APE, Berlin pumped by a 532 nm pulse train from a Picotrain laser, HighQ, Austria) and a femtosecond laser (810 nm, 150 fs, 80 MHz, MaiTai, Spectra Physics, USA). The lasers were switched between individual frames. Scale bars: 5 μm.
Figure 32:
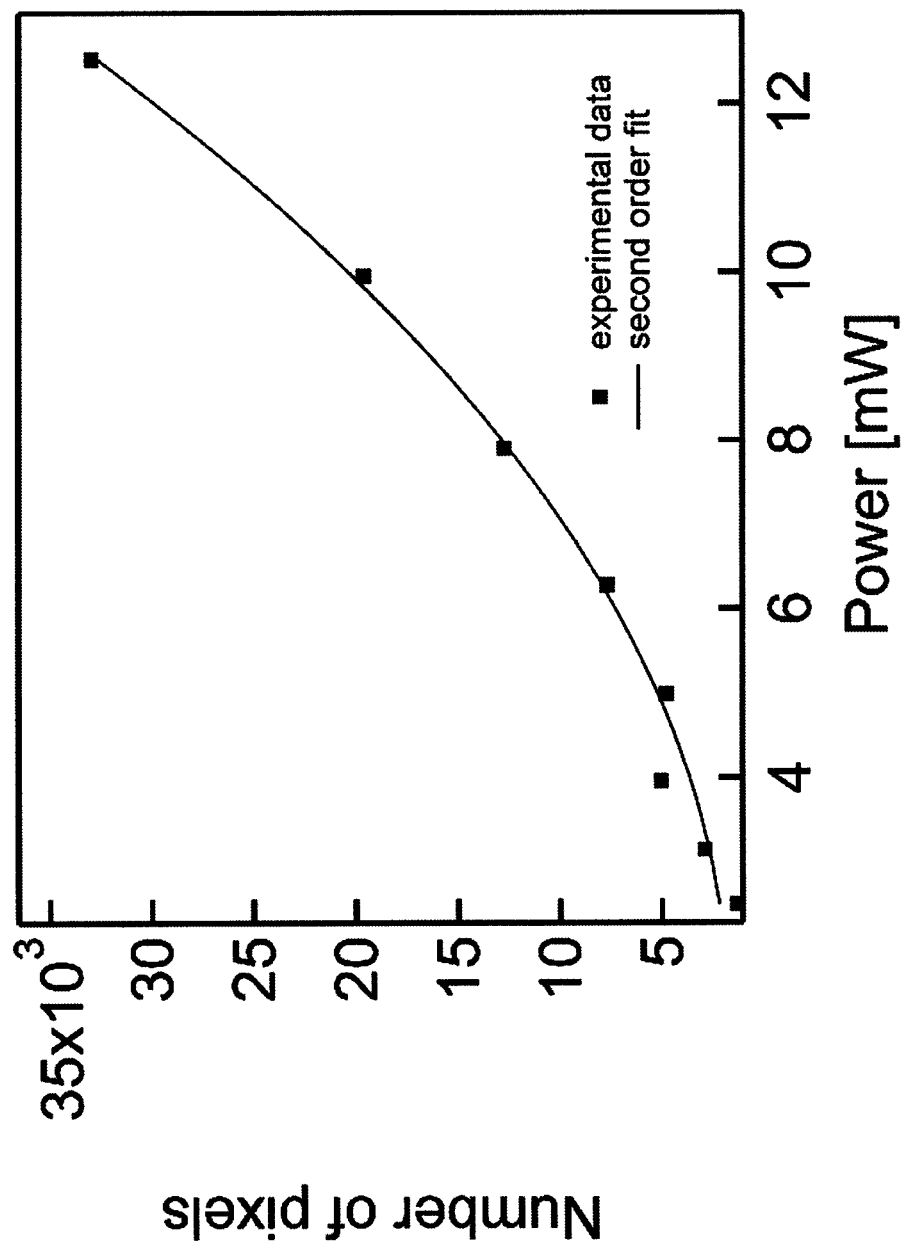
FIG. 32. Emission power dependence of a sample of immersed ufPL particles. Power spectra were recorded by using a multiphoton microscope with 800 nm excitation by a femtosecond laser (810 nm, 150 fs, 80 MHz repetition rate, MaiTai, Spectra Physics, USA) and a 1.05 NA Objective (Olympus, Japan). As the photomultiplier tubes were quickly saturated on CB emission, the effective number of pixels visible in a scan was measured. Therefore a constant threshold was set and the number of pixels calculated by means of a MATLAB routine.
Figure 33:
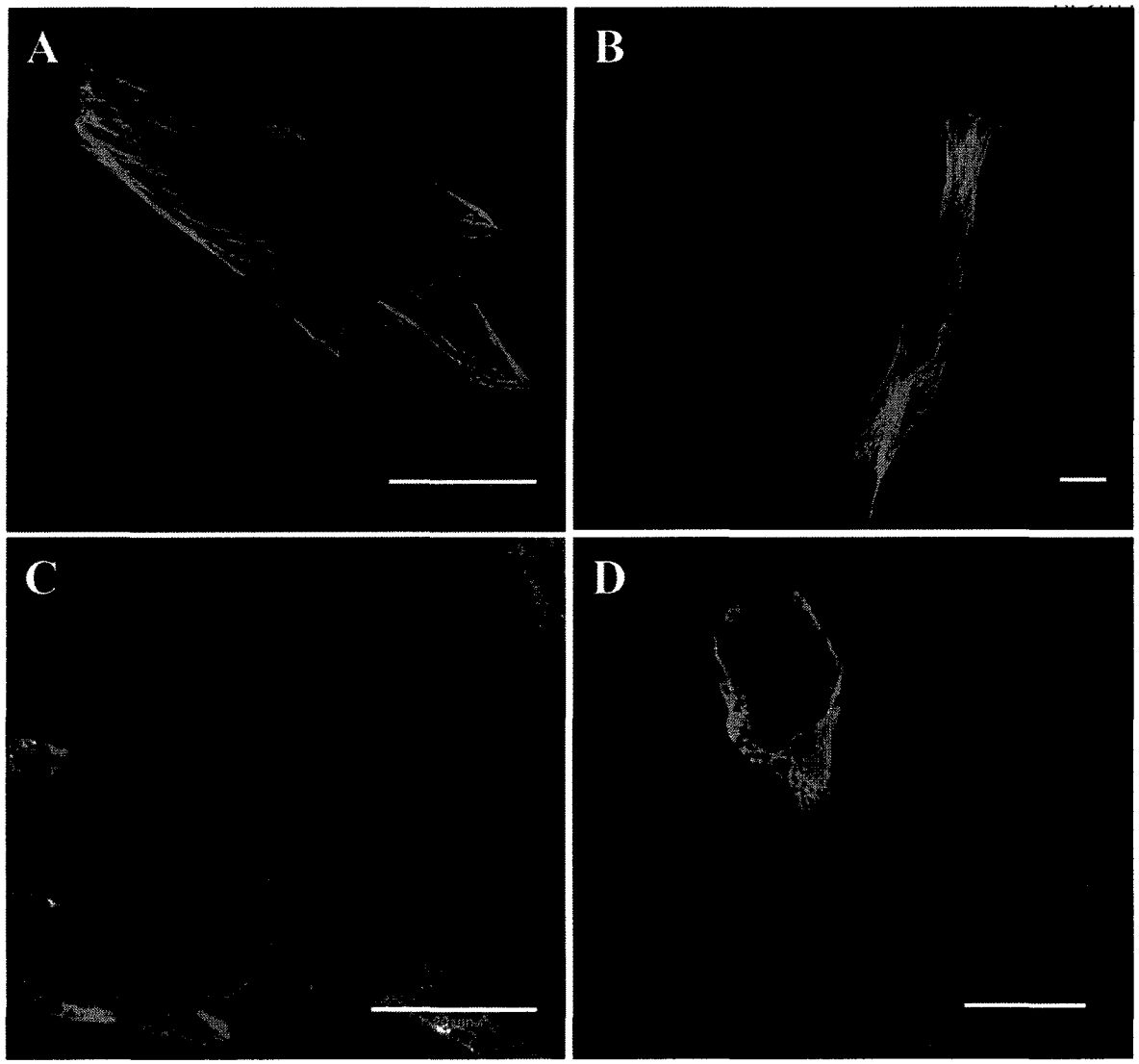
FIG. 33. Tubulin cytoskeleton (ex/em 495/519 nm) of fixed normal human lung fibroblasts (MRC-5 cell line) incubated at 37° C. with 5 µg/cm² ufP90 particles (red, 4 mW average illumination power at the samples at 810 nm, emission band detection: 400-410 nm in non-descanned mode). (A) Control cells. (B) 4 h incubation. (C) 8 h incubation. (D) 24 h incubation. Scale bar: 20 µm.

ASTM, *American Society for Testing Materials D3053-13a, Standard on Terminology Relating to Carbon Black*. ASTM International: West Conshohocken, Pa., 2013.
Castro, L.; Pio, C.; Harrison, R. M.; Smith, D. Atmos. Environ. 1999, 33, (17), 2771-2781.
Arnal, C.; Alzueta, M.; Millera, A.; Bilbao, R. Combust. Sci. Technol. 2012, 184, (7-8), 1191-1206.
Wang, R., Global Emission Inventory and Atmospheric Transport of Black Carbon: Evaluation of the Associated Exposure. Springer Theses: Beijing, China, 2015.
J. C. G. Esteves da Silva and H. M. R. Goncalves, Trends Anal. Chem., 2011, 30, 1327
Chow, J. C.; Watson, J. G.; Doraiswamy, P.; Chen, L.-W. A.; Sodeman, D. A.; Lowenthal, D. H.; Park, K.; Arnott, W. P.; Motallebi, N. Atmos. Res. 2009, 93, (4), 874-887.
Nemmar, A.; Hoet, P. M.; Vanquickenborne, B.; Dinsdale, D.; Thomeer, M.; Hoylaerts, M.; Vanbilloen, H.; Mortelmans, L.; Nemery, B. Circulation 2002, 105, (4), 411-414.
Ferrari, A.; Meyer, J.; Scardaci, V.; Casiraghi, C.; Lazzeri, M.; Mauri, F.; Piscanec, S.; Jiang, D.; Novoselov, K.; Roth, S. Phys. Rev. Lett. 2006, 97, (18), 187401.
Belousova, I.; Mironova, N.; Scobelev, A.; Yur'ev, M. Opt. Commun. 2004, 235, (4), 445-452.
Zelensky, S. Semicond. Phys. Quantum Electron. Optoelectron. 2004, 7, (2), 190-194.
Rulik, J. J.; Mikhailenko, N.; Zelensky, S.; Kolesnik, A. Semicond. Phys. Quantum Electron.
Optoelectron. 2007, 10, (2), 6-10.
Strek, W.; Cichy, B.; Radosinski, L.; Gluchowski, P.; Marciniak, L.; Lukaszewicz, M.; Hreniak, D. Light Sci. Appl. 2015, 4, (1), e237.
Hamilton, B.; Rimmer, J.; Anderson, M.; Leigh, D. Adv. Mater. 1993, 5, (7-8), 583-585.
Imholt, T.; Dyke, C. A.; Hasslacher, B.; Perez, J. M.; Price, D.; Roberts, J. A.; Scott, J.; Wadhawan, A.; Ye, Z.; Tour, J. M. Chem. Mater. 2003, 15, (21), 3969-3970.
Fougeanet, F.; Fabre, J.-C. In Nonlinear mechanisms in carbon-black suspension in a limiting geometry, MRS Proceedings, 1997; Cambridge Univ. Press: p 293.
Li, H.; Kang, Z.; Liu, Y.; Lee, S.-T. J. Mater. Chem. 2012, 22, (46), 24230-24253.
Ghosh, S.; Chizhik, A. M.; Karedla, N.; Dekaliuk, M. O.; Gregor, I.; Schuhmann, H.; Seibt, M.; Bodensiek, K.; Schaap, I. A.; Schulz, O. Nano Lett. 2014, 14, (10), 5656-5661.
Usman, A.; Chiang, W. Y.; Masuhara, H. Sci. Prog. 2013, 96, (Pt 1), 1-18.
Usman, A.; Chiang, W.-Y.; Masuhara, H. In Femtosecond trapping efficiency enhanced for nano-sized silica spheres, 2012; pp 845833-845833-7.

The invention claimed is:

1. A method for quantification of carbon black and/or black carbon in a sample or carrier medium, the method comprising:
providing the sample or carrier medium without labelling of the carbon black and/or black carbon particles and without pre-treatment of the carbon black and/or black carbon particles;
illuminating the sample or carrier medium at a temperature below 90° C. by a pulsed light with a pulse duration below 500 femtoseconds, a repetition rate above 1 MHz with an average power below 20 mW, and a wavelength of a femtosecond laser pulse ranging from 700 to 1200 nm, to generate non-incandescence related light emission from the carbon black and/or black carbon particles; and
analysis of the light emission to quantify the carbon black and/or black carbon in the sample or carrier medium.

2. The method according to claim 1, wherein the illumination is performed with a femtosecond laser focused on the sample using a stationary or scanning beam delivery.

3. The method according to claim 1, wherein the average power of the pulsed light is between 4 and 5 mW.

4. The method according to claim 1, wherein the sample or carrier medium comprises a material or compound with autofluorescence properties.

5. The method according to claim 1, wherein the sample or carrier medium comprises a compound selected from the group consisting of mitochondria, lysosomes, flavins, extracellular matrix, collagen, elastin, NAD(P)H, chlorophyll, retinol, cholecalciferol, folic acid, pyridoxine, tyrosine, dityrosine, excimer-like aggregate, glycation adduct, indolamine, lipofuscin, polyphenol, tryptophan, and melanin, or a combination thereof.

6. The method according to claim 1, wherein the intensity and/or wavelength of the pulsed light is varied until emission from the carbon black and/or black carbon particles is distinguishable from emission noise from the sample.

7. The method according to claim 1, wherein the pulsed light intensity and/or wavelength is modulated to reach near infrared emission.

8. The method according to claim 7, wherein shorter emission wavelengths than the near infrared emission are filtered out by a wave length filter to distinguish carbon black and/or black carbon particles emission from background noise emission.

9. The method according to claim 1, wherein the sample or carrier medium is illuminated at a temperature between 1° C. and 80° C.

10. The method according to claim 1 wherein the sample or carrier medium is illuminated at a temperature between 10° C. and 50° C.

11. The method according to claim 1, wherein the sample is blood or urine.

12. The method according to claim 1, wherein the sample is a liquid sample, cell sample or tissue sample of biological origin, wherein the cells in the cell sample or tissue sample have an intracellular water content greater than 40%.

13. The method according to claim 1, wherein the method comprises quantification of black carbon particles without labelling of the black carbon particles and without pre-treatment of the black carbon particles.

14. The method according to claim 13, wherein the black carbon particles are aggregated black carbon particles.

15. The method according to claim 1, wherein the sample or carrier medium comprises carbon black or black carbon particles from environmental or industrial pollution.

* * * * *